United States Patent
Shi et al.

(10) Patent No.: US 10,973,067 B2
(45) Date of Patent: Apr. 6, 2021

(54) BEARER SETUP METHOD, RELATED APPARATUS, AND SYSTEM

(71) Applicant: HUAWEI TECHNOLOGIES CO., LTD., Guangdong (CN)

(72) Inventors: Xiaoli Shi, Shanghai (CN); Hongzhuo Zhang, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 11 days.

(21) Appl. No.: 16/255,807

(22) Filed: Jan. 23, 2019

(65) Prior Publication Data
US 2019/0159273 A1 May 23, 2019

Related U.S. Application Data

(63) Continuation of application No. PCT/CN2016/091698, filed on Jul. 26, 2016.

(51) Int. Cl.
*H04W 76/15* (2018.01)
*H04W 76/12* (2018.01)
*H04W 92/20* (2009.01)
*H04W 88/16* (2009.01)

(52) U.S. Cl.
CPC .......... *H04W 76/15* (2018.02); *H04W 76/12* (2018.02); *H04W 88/16* (2013.01); *H04W 92/20* (2013.01)

(58) Field of Classification Search
CPC ..... H04W 76/15; H04W 76/12; H04W 88/16; H04W 92/20; H04W 76/16
See application file for complete search history.

(56) References Cited

U.S. PATENT DOCUMENTS

| | | | |
|---|---|---|---|
| 2012/0287873 A1 | 11/2012 | Liu et al. | |
| 2015/0304916 A1 | 10/2015 | Wang et al. | |
| 2015/0334577 A1* | 11/2015 | Xu | H04W 72/042 370/254 |
| 2015/0373699 A1* | 12/2015 | Xu | H04W 80/045 370/329 |
| 2016/0174285 A1 | 6/2016 | Ke et al. | |

FOREIGN PATENT DOCUMENTS

| | | |
|---|---|---|
| CN | 101873716 A | 10/2010 |
| CN | 102149214 A | 8/2011 |
| CN | 103874151 A | 6/2014 |
| EP | 2916612 A1 | 9/2015 |
| EP | 2947936 A1 | 11/2015 |

* cited by examiner

*Primary Examiner* — Peter P Chau
(74) *Attorney, Agent, or Firm* — Womble Bond Dickinson (US) LLP

(57) ABSTRACT

Embodiments of the present disclosure disclose a bearer setup method, a related apparatus, and a system. A first base station receives a first bearer setup request message initiated by UE; sends a first tunnel endpoint to a core network device, where the first tunnel endpoint includes a first TEID and a first transport layer address, and the first tunnel endpoint is allocated by the first base station; receives a second tunnel endpoint sent by the core network device, where the second tunnel endpoint includes a second TEID and a second transport layer address, and the second tunnel endpoint is allocated by the core network device; and completes setup of the first bearer with the core network device, for transmitting uplink data and transmitting downlink data.

4 Claims, 46 Drawing Sheets

BEARER SETUP METHOD, RELATED APPARATUS, AND SYSTEM

CROSS-REFERENCE TO RELATED APPLICATIONS

This application is a continuation of International Application No. PCT/CN2016/091698, filed on Jul. 26, 2016, the disclosure of which is hereby incorporated by reference in its entirety.

TECHNICAL FIELD

The present disclosure relates to wireless communications technologies, and in particular, to a bearer setup method, a related apparatus, and a system.

BACKGROUND

Currently, a 5G access technology (5th-Generation New radio access technology, 5G New RAT) is referred to as a new radio access technology, and may be implemented by evolution from a 4th generation mobile communications (4th Generation mobile communications, 4G) technology.

For example, a 4G network may be a Long Term Evolution (LTE) network. In evolution from 4G to 5G, evolution from a 4G core network (i.e., Evolved Packet Core, EPC) to a new core network (i.e., new core) may undergo two phases sequentially. LTE and the new radio access technology (New RAT) of two standards evolve to a 5G new core in two different manners respectively. The standard refers to a radio access technology, and different standards are used for different radio access technologies.

For LTE, in phase 1, LTE-NR supports close 4G-5G interworking by using a dual connectivity (DC) solution. In the DC solution, user equipment (UE) may use radio resources of at least two different network nodes. To be specific, the UE performs access from LTE network and transmits one part of data, and uses NR to transmit another part of data. In phase 2, evolved LTE (eLTE) supports both an S1 interface in connecting to the EPC and a next generation network (NG) interface in connecting to the new core. For the NR, the NR in phase 1 is in non-standalone (non-standalone) mode. where non-standalone indicates that the NR does not have a 5G core network and needs to connect to the 4G core network by using a 4G base station, that is, the NR connects to the EPC by using LTE. The NR in phase 2 is in standalone (standalone) mode, where standalone indicates that the NR has a 5G core network, that is, the NR directly connects to the new core and comprehensively supports all 5G functions.

Currently, the LTE and the NR in phase 1 are described using an architecture as an example. FIG. 1 is a schematic diagram of an architecture for multi-connectivity transmission in the prior art. UE uses the 5G new RAT, and connects to an evolved base station (eNB) via a new radio access technology base station (New RAT Base Station, NR BS) by using a new interface X5; the eNB sets up a connection to an LTE core network, where the LTE core network includes a mobility management entity (MME) and a serving gateway (SGW); and a data plane connection may also be set up between the NR BS and the LTE core network. Based on the foregoing architecture, when the UE transmits data, the data needs to be split into two data streams for transmission. For one data stream, a connection is directly set up to the 4G core network via the eNB. For the other data stream, the 5G new RAT is used, and a connection is set up to the eNB via the NR BS by using the new interface X5. For the UE, radio resources of two different network nodes are used, and therefore the UE may transmit data in DC mode.

FIG. 2 is a schematic diagram of a control plane protocol stack for multilink transmission in the prior art. The UE performs access from an LTE network and then transmits a part of data by using the NR BS. A control plane (CP) anchor and a user plane (UP) anchor are at an LTE Packet Data Convergence Protocol (PDCP) layer. The NR BS has a radio link control (RLC) layer, a Media Access Control (MAC) layer, and a physical (PHY) layer. DC means that a CP sends data to the UE through the LTE PDCP layer via the RLC layer, the MAC layer, and the PHY layer, and the CP may be a radio resource control (RRC) layer. A UP also sends data to the UE through the LTE PDCP layer via the RLC layer, the MAC layer, and the PHY layer. FIG. 3 is a schematic diagram of a user plane protocol stack for multilink transmission in the prior art. As shown in the figure, the UP may be an Internet Protocol (Internet Protocol, IP) layer.

However, the UE connects to the eNB via the NR BS by using the new interface X5. The new interface X5 is classified into an ideal backhaul interface and a non-ideal backhaul interface, where the ideal backhaul interface may be implemented using an optical fiber and has no latency, and the non-ideal backhaul interface has a latency. Currently, most used interfaces are non-ideal backhaul X5 interfaces. Because backhaul network quality needs to be considered when data traffic is transmitted between two network elements by using a non-ideal backhaul X5 interface, the backhaul network quality is related to factors such as a transmission medium and a bandwidth resource. However, due to the factors, the non-ideal backhaul X5 interface may cause an additional latency to a bearer on a 5G network.

SUMMARY

Embodiments of the present disclosure provide a bearer setup method, a related apparatus, and a system to set up a bearer between an NR BS and a 4G core network and transmit data directly by using the bearer, without first connecting to a 4G base station via the NR BS by using a new interface X5 and then connecting to the 4G core network via the 4G base station. Therefore, a latency caused by the new interface X5 is shortened, and bandwidth of the new interface X5 is saved.

A first aspect of the embodiments of the present disclosure provides a bearer setup method, including:

first, a first base station receives a first bearer setup request message initiated by UE, where the first bearer setup request message is mainly used to indicate that the UE currently needs to set up a first bearer;

then the first base station sends a first tunnel endpoint to a core network device based on the first bearer setup request message, where the first tunnel endpoint includes a first tunnel endpoint identifier (TEID) and a first transport layer address, the first tunnel endpoint is allocated by the first base station, and the first tunnel endpoint is mainly used to indicate a destination of data transmitted in a downlink data transmission path of the first bearer, that is, a receiver of the transmitted downlink data is the first base station, and the first bearer may be specifically a default bearer;

then the first base station receives a second tunnel endpoint sent by the core network device, where the second tunnel endpoint includes a second TEID and a second transport layer address, the second tunnel endpoint is allocated by the core network device, and the second tunnel endpoint is mainly used to indicate a destination of data transmitted in an uplink data transmission path of the first bearer, that is, a receiver of the transmitted uplink data is the first base station; and finally, the first base station may complete setup of the first bearer with the core network device by using the first tunnel endpoint and the second tunnel endpoint, where after the setup, the first bearer may be used to transmit the uplink data and transmit the downlink data.

In the technical solution provided in the embodiments of the present disclosure, a bearer setup method is provided. In one embodiment, the first base station receives the first bearer setup request message initiated by the UE; then the first base station sends the first tunnel endpoint to the core network device based on the first bearer setup request message, where the first tunnel endpoint includes the first tunnel endpoint identifier (TEID) and the first transport layer address, the first tunnel endpoint is allocated by the first base station, and the first tunnel endpoint is used to indicate the destination of the data transmitted in the downlink data transmission path of the first bearer; then the first base station receives the second tunnel endpoint sent by the core network device, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In one embodiment, that the first base station sends a first tunnel endpoint to a core network device may include:

the first base station sends an RRC connection setup complete message to a second base station by using an X5-C interface, where the RRC connection setup complete message is used to instruct the second base station to send an initial UE message to the core network device, where both the RRC connection setup complete message and the initial UE message carry the first tunnel endpoint.

In one embodiment, the first base station transmits the first TEID and the first transport layer address to the core network device by using the RRC connection setup complete message and the initial UE message. In the foregoing manner, the first tunnel endpoint may be transmitted to set up a downlink bearer between the first base station and the core network device, so that feasibility of the solution is enhanced.

In one embodiment, that the first base station receives a second tunnel endpoint sent by the core network device may include:

the first base station receives a first RRC connection reconfiguration message sent by the second base station, where the first RRC connection reconfiguration message is sent after the second base station receives an initial context setup request, and the initial context setup request is sent by the core network device to the second base station, where both the initial context setup request and the first RRC connection reconfiguration message carry the second tunnel endpoint.

In one embodiment, the core network device transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

In one embodiment, after the first base station receives the second tunnel endpoint sent by the core network device, the method may further include the following operations:

the first base station forwards the first RRC connection reconfiguration message in an LTE format to the UE, where the first RRC connection reconfiguration message is used to request the UE to configure an air interface resource; and the first base station receives a first RRC connection reconfiguration complete message sent by the UE, where the first RRC connection reconfiguration complete message is used to indicate that the UE has completed configuration of the air interface resource.

Further, in one embodiment, after setting up the uplink bearer with the core network device, the first base station may send the first RRC connection reconfiguration message to the UE, to request configuration of the air interface resource. Therefore, the air interface resource can be provided properly when the uplink data is transmitted, and practical applicability of the solution is enhanced.

In one embodiment, after the first base station receives the first RRC connection reconfiguration complete message sent by the UE, the method may further include:

first, the first base station forwards the first RRC connection reconfiguration complete message to the second base station, so that the second base station sends an initial context setup response message to the core network device based on the first RRC connection reconfiguration complete message, where the initial context setup response message is used to instruct the core network device to modify the first bearer.

Still further, in one embodiment, the first base station sends the first RRC connection reconfiguration complete message to the second base station, so that the second base station sends the initial context setup response message to the core network device, where the initial context setup response message is used to instruct the core network device to modify the first bearer; and finally, the core network device receives the initial context setup response message sent by the second base station, to set up the first bearer from the first base station to the core network device, so that feasibility and practical applicability of the solution are enhanced.

In one embodiment, after the first base station completes setup of the first bearer with the core network device, the method may further include the following operations:

first, the first base station receives a third tunnel endpoint sent by the core network device, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer;

then the first base station sends a fourth tunnel endpoint to the core network device, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and finally, the first base station completes setup of the second bearer with the core network device.

In the technical solution provided in the embodiments of the present disclosure, a bearer setup method is provided. In one embodiment, the first base station receives the first bearer setup request message initiated by the UE; then the core network device sends the second tunnel endpoint to the first base station, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; then the first base station sends the first tunnel endpoint to the core network device, where the first tunnel endpoint includes the first TEID and the first transport layer address, the first tunnel endpoint is allocated by the first base station, and the first tunnel endpoint is used to indicate the destination of the data transmitted in the downlink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In one embodiment, that the first base station receives a third tunnel endpoint sent by the core network device may include:

the first base station receives a second RRC connection reconfiguration message sent by the second base station, where the second RRC connection reconfiguration message is sent after the second base station receives an eRAB setup request sent by the core network device, where both the eRAB setup request and the second RRC connection reconfiguration message carry the third tunnel endpoint.

In one embodiment, the core network device sends the initial context setup request to the second base station, where the initial context setup request is used to instruct the second base station to send the first RRC connection reconfiguration message to the first base station, and the core network device transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

In one embodiment, that the first base station sends a fourth tunnel endpoint to the core network device may include:

the first base station sends a second RRC connection reconfiguration complete message to the second base station, where the second RRC connection reconfiguration complete message is used to instruct the second base station to send an eRAB setup response message to the core network device, where both the second RRC connection reconfiguration complete message and the eRAB setup response message carry the fourth tunnel endpoint.

In one embodiment, the first base station needs to transmit the first TEID and the first transport layer address to the core network device by using the first RRC connection reconfiguration complete message and the initial context setup response message. In the foregoing manner, the first tunnel endpoint may be transmitted to set up a downlink bearer of the first bearer between the first base station and the core network device, so that feasibility of the solution is enhanced.

In one embodiment, after the first base station receives the second RRC connection reconfiguration message sent by the second base station, the method may further include the following operations:

the first base station sends the second RRC connection reconfiguration message to the UE, where the second RRC connection reconfiguration message is used to request the UE to configure an air interface resource; and the first base station receives the second RRC connection reconfiguration complete message sent by the UE, where the second RRC connection reconfiguration complete message is used to indicate that the UE has completed configuration of the air interface resource.

Further, in one embodiment, after setting up the downlink bearer with the core network device, the first base station may send the first RRC connection reconfiguration message to the UE, to request configuration of the air interface resource. Therefore, the air interface resource can be provided properly when the uplink data is transmitted, and practical applicability of the solution is enhanced.

A second aspect of the embodiments of the present disclosure provides a bearer setup method, including:

a core network device receives a first tunnel endpoint sent by a first base station, where the first tunnel endpoint includes a first TEID and a first transport layer address, the first tunnel endpoint is allocated by the first base station, and the first tunnel endpoint is used to indicate a destination of data transmitted in a downlink data transmission path of a first bearer;

the core network device sends a second tunnel endpoint to the first base station, where the second tunnel endpoint includes a second TEID and a second transport layer address, the second tunnel endpoint is allocated by the core network device, and the second tunnel endpoint is used to indicate a destination of data transmitted in an uplink data transmission path of the first bearer; and the core network device completes setup of the first bearer with the first base station, for transmitting the uplink data and transmitting the downlink data.

In the technical solution provided in the embodiments of the present disclosure, a bearer setup method is provided. In one embodiment, the first base station receives a first bearer setup request message initiated by UE; then the first base station sends the first tunnel endpoint to the core network device based on the first bearer setup request message, where the first tunnel endpoint includes the first tunnel endpoint identifier (TEID) and the first transport layer address, the first tunnel endpoint is allocated by the first base station, and the first tunnel endpoint is used to indicate the destination of the data transmitted in the downlink data transmission path of the first bearer; then the first base station receives the second tunnel endpoint sent by the core network device, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In one embodiment, that a core network device receives a first tunnel endpoint sent by a first base station may include:

the core network device receives an initial UE message sent by a second base station, where the initial UE message is sent after the second base station receives an RRC connection setup complete message sent by the first base station, and the RRC connection setup complete message is sent by the first base station to the second base station based on a first bearer setup request message, where both the RRC connection setup complete message and the initial UE message carry the first tunnel endpoint.

In one embodiment, the first base station specifically transmits the first TEID and the first transport layer address to the core network device by using the RRC connection setup complete message and the initial UE message. In the foregoing manner, the first tunnel endpoint may be transmitted to set up a downlink bearer between the first base station and the core network device, so that feasibility of the solution is enhanced.

In one embodiment, that the core network device sends a second tunnel endpoint to the first base station may include:

the core network device sends an initial context setup request to the second base station, where the initial context setup request is used to instruct the second base station to send a first RRC connection reconfiguration message to the first base station, where both the initial context setup request and the first RRC connection reconfiguration message carry the second tunnel endpoint.

In one embodiment, the core network device specifically transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

In one embodiment, after the core network device sends the second tunnel endpoint to the first base station, the method may further include the following operation:

the core network device receives an initial context setup response message sent by the second base station, where the initial context setup response message is sent to the core network device after the second base station receives a first RRC connection reconfiguration complete message sent by the first base station, and the first RRC connection reconfiguration complete message is used to indicate that UE has completed configuration of an air interface resource.

Further, in one embodiment, after setting up the uplink bearer with the core network device, the first base station may send the first RRC connection reconfiguration message to the UE, to request configuration of the air interface resource. Therefore, the air interface resource can be provided properly when the uplink data is transmitted, and practical applicability of the solution is enhanced.

In one embodiment, before the core network device completes setup of the first bearer with the first base station, the method may further include the following operation:

the core network device modifies the first bearer.

Still further, in one embodiment, the first base station sends the first RRC connection reconfiguration complete message to the second base station, so that the second base station sends the initial context setup response message to the core network device, where the initial context setup response message is used to instruct the core network device to modify the first bearer; and finally, the core network device receives the initial context setup response message sent by the second base station, to set up the first bearer from the first base station to the core network device, so that feasibility and practical applicability of the solution are enhanced.

In one embodiment, after the core network device completes setup of the first bearer with the first base station, the method may further include:

the core network device sends a third tunnel endpoint to the first base station, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer, where the second bearer may be specifically a dedicated bearer;

the core network device receives a fourth tunnel endpoint sent by the first base station, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and the core network device completes setup of the second bearer with the first base station.

In one embodiment, the second bearer between the first base station and the core network device may be further set up provided that the first bearer is set up. Likewise, in the process of setting up the second bearer, there is no need to first connect to a 4G base station via an NR BS by using a new interface X5 and then connect to a 4G core network via the 4G base station. Therefore, a latency caused by the new interface X5 is shortened, and bandwidth of the new interface X5 is saved.

In one embodiment, that the core network device sends a third tunnel endpoint to the first base station may include:

the core network device sends an eRAB setup request to the second base station, where the eRAB setup request is used to instruct the second base station to send a second RRC connection reconfiguration message to the first base station, where the eRAB setup request and the second RRC connection reconfiguration message carry the third tunnel endpoint.

In one embodiment, the core network device needs to transmit the third TEID and the third transport layer address to the first base station by using the eRAB setup request and the second RRC connection reconfiguration message. In the foregoing manner, the third tunnel endpoint may be transmitted to set up an uplink bearer between the first base station and the core network device, so that feasibility of the solution is enhanced.

In one embodiment, that the core network device receives a fourth tunnel endpoint sent by the first base station may include:

the core network device receives an eRAB setup response message sent by the second base station, where the eRAB setup response message is sent to the core network device after the second base station receives a second RRC connection reconfiguration complete message sent by the first base station, and the second RRC connection reconfiguration complete message is used to indicate that the UE has completed configuration of an air interface resource, where both the second RRC connection reconfiguration complete message and the eRAB setup response message carry the fourth tunnel endpoint.

Further, in one embodiment, the first base station needs to transmit the fourth TEID and the fourth transport layer address to the core network device by using the second RRC connection reconfiguration complete message and the eRAB setup response message. In the foregoing manner, the fourth tunnel endpoint may be transmitted to set up a downlink bearer of the second bearer between the first base station and the core network device, so that feasibility of the solution is enhanced.

A third aspect of the embodiments of the present disclosure provides a bearer setup method, including:

a first base station receives a first bearer setup request message initiated by UE;

the first base station receives, based on the first bearer setup request message, a second tunnel endpoint sent by a core network device, where the second tunnel endpoint includes a second TEID and a second transport layer address, the second tunnel endpoint is allocated by the core network device, and the second tunnel endpoint is used to indicate a destination of data transmitted in an uplink data transmission path of a first bearer, where the first bearer may be specifically a default bearer;

the first base station sends a first tunnel endpoint to the core network device, where the first tunnel endpoint includes a first TEID and a first transport layer address, the first tunnel endpoint is allocated by the first base station, and the first tunnel endpoint is used to indicate a destination of data transmitted in a downlink data transmission path of the first bearer; and the first base station completes setup of the first bearer with the core network device, for transmitting the uplink data and transmitting the downlink data.

In the technical solution provided in the embodiments of the present disclosure, a bearer setup method is provided. In one embodiment, the first base station receives the first bearer setup request message initiated by the UE; then the core network device sends the second tunnel endpoint to the first base station, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; then the first base station sends the first tunnel endpoint to the core network device, where the first tunnel endpoint includes the first TEID and the first transport layer address, the first tunnel endpoint is allocated by the first base station, and the first tunnel endpoint is used to indicate the destination of the data transmitted in the downlink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In one embodiment, that the first base station receives a second tunnel endpoint sent by a core network device may include:

the first base station receives a first RRC connection reconfiguration message sent by a second base station, where the first RRC connection reconfiguration message is sent after the second base station receives an initial context setup request sent by the core network device, where the initial context setup request and the first RRC connection reconfiguration message carry the second tunnel endpoint.

In one embodiment, the core network device sends the initial context setup request to the second base station, where the initial context setup request is used to instruct the second base station to send the first RRC connection reconfiguration message to the first base station, and the core network device transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

In one embodiment, that the first base station sends a first tunnel endpoint to the core network device may include:

the first base station sends a first RRC connection reconfiguration complete message to the second base station, where the first RRC connection reconfiguration complete message is used to instruct the second base station to send an initial context setup response message to the core network device, where the first RRC connection reconfiguration complete message and the initial context setup response message carry the first tunnel endpoint.

In one embodiment, the first base station needs to transmit the first TEID and the first transport layer address to the core network device by using the first RRC connection reconfiguration complete message and the initial context setup response message. In the foregoing manner, the first tunnel endpoint may be transmitted to set up a downlink bearer of the first bearer between the first base station and the core network device, so that feasibility of the solution is enhanced.

In one embodiment, before the first base station sends the first RRC connection reconfiguration complete message to the second base station, the method may further include the following operations:

the first base station sends the first RRC connection reconfiguration message to the UE, where the first RRC connection reconfiguration message is used to request the UE to configure an air interface resource; and the first base station receives the first RRC connection reconfiguration complete message sent by the UE, where the first RRC connection reconfiguration complete message is used to indicate that the UE has completed configuration of the air interface resource.

Further, in one embodiment, after setting up the downlink bearer with the core network device, the first base station may send the first RRC connection reconfiguration message to the UE, to request configuration of the air interface resource. Therefore, the air interface resource can be provided properly when the uplink data is transmitted, and practical applicability of the solution is enhanced.

In one embodiment, after the first base station completes setup of the first bearer with the core network device, the method may further include:

the first base station receives a third tunnel endpoint sent by the core network device, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer, where the second bearer may be specifically a dedicated bearer;

the first base station sends a fourth tunnel endpoint to the core network device, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and the first base station completes setup of the second bearer with the core network device.

In one embodiment, the second bearer between the first base station and the core network device may be further set up provided that the first bearer is set up. Likewise, in the process of setting up the second bearer, there is no need to first connect to a 4G base station via an NR BS by using a new interface X5 and then connect to a 4G core network via the 4G base station. Therefore, a latency caused by the new interface X5 is shortened, and bandwidth of the new interface X5 is saved.

In one embodiment, that the first base station receives a third tunnel endpoint sent by the core network device may include:

the first base station receives a second RRC connection reconfiguration message sent by the second base station, where the second RRC connection reconfiguration message is sent after the second base station receives an eRAB setup request sent by the core network device, where the eRAB setup request and the second RRC connection reconfiguration message carry the third tunnel endpoint.

In one embodiment, the core network device needs to transmit the third TEID and the third transport layer address to the first base station by using the eRAB setup request and the second RRC connection reconfiguration message. In the foregoing manner, the third tunnel endpoint may be transmitted to set up an uplink bearer between the first base station and the core network device, so that feasibility of the solution is enhanced.

In one embodiment, that the first base station sends a fourth tunnel endpoint to the core network device may include:

the first base station sends a second RRC connection reconfiguration complete message to the second base station, where the second RRC connection reconfiguration complete message is used to instruct the second base station to send an eRAB setup response message to the core network device, where the second RRC connection reconfiguration complete message and the eRAB setup response message carry the fourth tunnel endpoint.

Further, in one embodiment, the first base station needs to transmit the fourth TEID and the fourth transport layer address to the core network device by using the second RRC connection reconfiguration complete message and the eRAB setup response message. In the foregoing manner, the fourth tunnel endpoint may be transmitted to set up a downlink bearer of the second bearer between the first base station and the core network device, so that feasibility of the solution is enhanced.

In one embodiment, after the first base station receives the second RRC connection reconfiguration message sent by the second base station, the method may further include the following operations:

the first base station sends the second RRC connection reconfiguration message to the UE, where the second RRC connection reconfiguration message is used to request the UE to configure an air interface resource; and the first base station receives the second RRC connection reconfiguration complete message sent by the UE, where the second RRC connection reconfiguration complete message is used to indicate that the UE has completed configuration of the air interface resource.

Still further, in one embodiment, after setting up the uplink bearer of the second bearer with the core network device, the first base station may send the second RRC connection reconfiguration message to the UE, to request configuration of the air interface resource. Therefore, the air interface resource can be provided properly when the uplink data is transmitted, and practical applicability of the solution is enhanced.

A fourth aspect of the embodiments of the present disclosure provides a bearer setup method, including:

a core network device sends a second tunnel endpoint to a first base station, where the second tunnel endpoint includes a second TEID and a second transport layer address, the second tunnel endpoint is allocated by the core network device, and the second tunnel endpoint is used to indicate a destination of data transmitted in an uplink data transmission path of a first bearer;

the core network device receives a first tunnel endpoint sent by the first base station, where the first tunnel endpoint includes a first TEID and a first transport layer address, the first tunnel endpoint is allocated by the first base station, and the first tunnel endpoint is used to indicate a destination of data transmitted in a downlink data transmission path of the first bearer; and the core network device completes setup of the first bearer with the first base station, for transmitting the uplink data and transmitting the downlink data.

In the technical solution provided in the embodiments of the present disclosure, a bearer setup method is provided. In one embodiment, the first base station receives a first bearer setup request message initiated by UE; then the core network device sends the second tunnel endpoint to the first base station, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; then the first base station sends the first tunnel endpoint to the core network device, where the first tunnel endpoint includes the first TEID and the first transport layer address, the first tunnel endpoint is allocated by the first base station, and the first tunnel endpoint is used to indicate the destination of the data transmitted in the downlink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In one embodiment, that a core network device sends a second tunnel endpoint to a first base station may include:

the core network device sends an initial context setup request to a second base station, where the initial context setup request is used to instruct the second base station to send a first radio resource control (RRC) connection reconfiguration message to the first base station, where the initial context setup request and the first RRC connection reconfiguration message carry the second tunnel endpoint.

In one embodiment, the core network device sends the initial context setup request to the second base station, where the initial context setup request is used to instruct the second base station to send the first RRC connection reconfiguration message to the first base station, and the core network device transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

In one embodiment, that the core network device receives a first tunnel endpoint sent by the first base station may include:

the core network device receives an initial context setup response message sent by the second base station, where the initial context setup response message is sent after the second base station receives a first RRC connection reconfiguration complete message sent by the first base station, and the first RRC connection reconfiguration complete message is used to indicate that UE has completed configuration of an air interface resource, where the first RRC connection reconfiguration complete message and the initial context setup response message carry the first tunnel endpoint.

In one embodiment, the first base station needs to transmit the first TEID and the first transport layer address to the core network device by using the first RRC connection reconfiguration complete message and the initial context setup response message. In the foregoing manner, the first tunnel endpoint may be transmitted to set up a downlink bearer of the first bearer between the first base station and the core network device, so that feasibility of the solution is enhanced.

In one embodiment, before the core network device completes setup of the first bearer with the first base station, the method may further include the following operation:

the core network device modifies the first bearer.

In one embodiment, the core network device may further modify the first bearer before completing setup of the first bearer with the first base station. This ensures that the first bearer has been modified, and therefore enhances feasibility and practical applicability of the solution.

In one embodiment, after the core network device completes setup of the first bearer with the first base station, the method may further include the following operations:

the core network device sends a third tunnel endpoint to the first base station, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer;

the core network device receives a fourth tunnel endpoint sent by the first base station, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and the core network device completes setup of the second bearer with the first base station.

In one embodiment, the second bearer between the first base station and the core network device may be further set up provided that the first bearer is set up. Likewise, in the process of setting up the second bearer, there is no need to first connect to a 4G base station via an NR BS by using a new interface X5 and then connect to a 4G core network via the 4G base station. Therefore, a latency caused by the new interface X5 is shortened, and bandwidth of the new interface X5 is saved.

In one embodiment, that the core network device sends a third tunnel endpoint to the first base station may include:

the core network device sends an eRAB setup request to the second base station, where the eRAB setup request is used to instruct the second base station to send a second RRC connection reconfiguration message to the first base station, where the eRAB setup request and the second RRC connection reconfiguration message carry the third tunnel endpoint.

In one embodiment, the core network device needs to transmit the third TEID and the third transport layer address to the first base station by using the eRAB setup request and the second RRC connection reconfiguration message. In the foregoing manner, the third tunnel endpoint may be transmitted to set up an uplink bearer between the first base station and the core network device, so that feasibility of the solution is enhanced.

In one embodiment, that the core network device receives a fourth tunnel endpoint sent by the first base station may include:

the core network device receives an eRAB setup response message sent by the second base station, where the eRAB setup response message is sent to the core network device after the second base station receives a second RRC connection reconfiguration complete message sent by the first base station, and the second RRC connection reconfiguration complete message is used to indicate that the UE has completed configuration of an air interface resource, where the second RRC connection reconfiguration complete message and the eRAB setup response message carry the fourth tunnel endpoint.

Further, in one embodiment, the first base station needs to transmit the fourth TEID and the fourth transport layer address to the core network device by using the second RRC connection reconfiguration complete message and the eRAB setup response message. In the foregoing manner, the fourth tunnel endpoint may be transmitted to set up a downlink bearer of the second bearer between the first base station and the core network device, so that feasibility of the solution is enhanced.

A fifth aspect of the embodiments of the present disclosure provides a first base station, including:

a first receiving module, configured to receive a first bearer setup request message initiated by UE;

a first sending module, configured to send a first tunnel endpoint to a core network device based on the first bearer setup request message received by the first receiving module, where the first tunnel endpoint includes a first TEID and a first transport layer address, the first tunnel endpoint is allocated by the first base station, and the first tunnel endpoint is used to indicate a destination of data transmitted in a downlink data transmission path of a first bearer;

a second receiving module, configured to receive a second tunnel endpoint sent by the core network device, where the second tunnel endpoint includes a second TEID and a second transport layer address, the second tunnel endpoint is allocated by the core network device, and the second tunnel endpoint is used to indicate a destination of data transmitted in an uplink data transmission path of the first bearer; and a first setup module, configured to complete setup of the first bearer with the core network device, for transmitting the uplink data and transmitting the downlink data.

In one embodiment, the first sending module includes:

a first sending unit, configured to send an RRC connection setup complete message to a second base station based on the first bearer setup request message, where the RRC connection setup complete message is used to instruct the second base station to send an initial UE message to the core network device, where the RRC connection setup complete message and the initial UE message carry the first tunnel endpoint.

In one embodiment, the second receiving module includes:

a first receiving unit, configured to receive a first RRC connection reconfiguration message sent by the second base station, where the first RRC connection reconfiguration message is sent after the second base station receives an initial context setup request, and the initial context setup request is sent by the core network device to the second base station, where the initial context setup request and the first RRC connection reconfiguration message carry the second tunnel endpoint.

In one embodiment, in a third implementation of the fifth aspect of the embodiments of the present disclosure, the first base station further includes:

a second sending module, configured to send the first RRC connection reconfiguration message to the UE after the second receiving module receives the second tunnel endpoint sent by the core network device, where the first RRC connection reconfiguration message is used to request the UE to configure an air interface resource; and a third receiving module, configured to receive a first RRC connection reconfiguration complete message sent by the UE, where the first RRC connection reconfiguration complete message is used to indicate that the UE has completed configuration of the air interface resource.

In one embodiment, the first base station further includes:

a third sending module, configured to send the first RRC connection reconfiguration complete message to the second base station after the third receiving module receives the first RRC connection reconfiguration complete message sent by the UE, so that the second base station sends an initial context setup response message to the core network device based on the first RRC connection reconfiguration complete message, where the initial context setup response message is used to instruct the core network device to modify the first bearer.

In one embodiment, the first base station further includes:

a fourth receiving module, configured to: after the first setup module completes setup of the first bearer with the core network device, receive a third tunnel endpoint sent by the core network device, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer;

a fourth sending module, configured to send a fourth tunnel endpoint to the core network device, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and a second setup module, configured to complete setup of the second bearer with the core network device.

In one embodiment, the fourth receiving module includes:

a second receiving unit, configured to receive a second RRC connection reconfiguration message sent by the second base station, where the second RRC connection reconfiguration message is sent after the second base station receives an eRAB setup request sent by the core network device, where the eRAB setup request and the second RRC connection reconfiguration message carry the third tunnel endpoint.

In one embodiment, the fourth sending module includes:

a second sending unit, configured to send a second RRC connection reconfiguration complete message to the second base station, where the second RRC connection reconfiguration complete message is used to instruct the second base station to send an eRAB setup response message to the core network device, where the second RRC connection reconfiguration complete message and the eRAB setup response message carry the fourth tunnel endpoint.

In one embodiment, the first base station further includes:

a fifth sending module, configured to send the second RRC connection reconfiguration message to the UE after the second receiving unit receives the second RRC connection reconfiguration message sent by the second base station, where the second RRC connection reconfiguration message is used to request the UE to configure an air interface resource; and a fifth receiving module, configured to receive the second RRC connection reconfiguration complete message sent by the UE, where the second RRC connection reconfiguration complete message is used to indicate that the UE has completed configuration of the air interface resource.

A sixth aspect of the embodiments of the present disclosure provides a core network device, including:

a first receiving module, configured to receive a first tunnel endpoint sent by a first base station, where the first tunnel endpoint includes a first TEID and a first transport layer address, the first tunnel endpoint is allocated by the first base station, and the first tunnel endpoint is used to indicate a destination of data transmitted in a downlink data transmission path of a first bearer;

a first sending module, configured to send a second tunnel endpoint to the first base station, where the second tunnel endpoint includes a second TEID and a second transport layer address, the second tunnel endpoint is allocated by the core network device, and the second tunnel endpoint is used to indicate a destination of data transmitted in an uplink data transmission path of the first bearer; and a first setup module, configured to complete setup of the first bearer with the first base station, for transmitting the uplink data and transmitting the downlink data.

In one embodiment, the first receiving module includes:

a first receiving unit, configured to receive an initial UE message sent by a second base station, where the initial UE message is sent after the second base station receives an RRC connection setup complete message sent by the first base station, and the RRC connection setup complete message is sent by the first base station to the second base station based on a first bearer setup request message, where the RRC connection setup complete message and the initial UE message carry the first tunnel endpoint.

In one embodiment, the first sending module includes:

a first sending unit, configured to send an initial context setup request to the second base station, where the initial context setup request is used to instruct the second base station to send a first RRC connection reconfiguration message to the first base station, where the initial context setup request and the first RRC connection reconfiguration message carry the second tunnel endpoint.

In one embodiment, the core network device further includes:

a second receiving module, configured to: after the first sending module sends the second tunnel endpoint to the first base station, receive an initial context setup response message sent by the second base station, where the initial context setup response message is sent to the core network device after the second base station receives a first RRC connection reconfiguration complete message sent by the first base station, and the first RRC connection reconfiguration complete message is used to indicate that UE has completed configuration of an air interface resource.

In one embodiment, the core network device further includes:

a modification module, configured to modify the first bearer before the first setup module completes setup of the first bearer with the first base station.

In one embodiment, the core network device further includes:

a second sending module, configured to send a third tunnel endpoint to the first base station after the first setup module completes setup of the first bearer with the first base station, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer;

a third receiving module, configured to receive a fourth tunnel endpoint sent by the first base station, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and a second setup module, configured to complete setup of the second bearer with the first base station.

In one embodiment, the second sending module includes:

a second sending unit, configured to send an eRAB setup request to the second base station, where the eRAB setup request is used to instruct the second base station to send a second RRC connection reconfiguration message to the first base station, where the eRAB setup request and the second RRC connection reconfiguration message carry the third tunnel endpoint.

In one embodiment, the third receiving module includes:

a second receiving unit, configured to receive an eRAB setup response message sent by the second base station, where the eRAB setup response message is sent to the core network device after the second base station receives a second RRC connection reconfiguration complete message sent by the first base station, and the second RRC connection reconfiguration complete message is used to indicate that the UE has completed configuration of an air interface resource, where the second RRC connection reconfiguration complete message and the eRAB setup response message carry the fourth tunnel endpoint.

A seventh aspect of the embodiments of the present disclosure provides a base station, including:

a first receiving module, configured to receive a first bearer setup request message initiated by UE;

a second receiving module, configured to receive, based on the first bearer setup request message received by the first receiving module, a second tunnel endpoint sent by a core network device, where the second tunnel endpoint includes a second TEID and a second transport layer address, the second tunnel endpoint is allocated by the core network device, and the second tunnel endpoint is used to indicate a destination of data transmitted in an uplink data transmission path of a first bearer;

a first sending module, configured to send a first tunnel endpoint to the core network device, where the first tunnel endpoint includes a first TEID and a first transport layer address, the first tunnel endpoint is allocated by the first base station, and the first tunnel endpoint is used to indicate a destination of data transmitted in a downlink data transmission path of the first bearer; and a first setup module, configured to complete setup of the first bearer with the core network device, for transmitting the uplink data and transmitting the downlink data.

In one embodiment, the second receiving module includes:

a first receiving unit, configured to receive a first RRC connection reconfiguration message sent by a second base station, where the first RRC connection reconfiguration message is sent after the second base station receives an initial context setup request sent by the core network device, where the initial context setup request and the first RRC connection reconfiguration message carry the second tunnel endpoint.

In one embodiment, the first sending module includes:

a first sending unit, configured to send a first RRC connection reconfiguration complete message to the second base station, where the first RRC connection reconfiguration complete message is used to instruct the second base station to send an initial context setup response message to the core network device, where the first RRC connection reconfiguration complete message and the initial context setup response message carry the first tunnel endpoint.

In one embodiment, the first base station further includes:

a second sending module, configured to send the first RRC connection reconfiguration message to the UE before the first sending unit sends the first RRC connection reconfiguration complete message to the second base station, where the first RRC connection reconfiguration message is used to request the UE to configure an air interface resource; and a third receiving module, configured to receive the first RRC connection reconfiguration complete message sent by the UE, where the first RRC connection reconfiguration complete message is used to indicate that the UE has completed configuration of the air interface resource.

In one embodiment, the first base station further includes:

a fourth receiving module, configured to: after the first setup module completes setup of the first bearer with the core network device, receive a third tunnel endpoint sent by the core network device, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer;

a third sending module, configured to send a fourth tunnel endpoint to the core network device, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and a second setup module, configured to complete setup of the second bearer with the core network device.

In one embodiment, the fourth receiving module includes:

a second receiving unit, configured to receive a second RRC connection reconfiguration message sent by the second base station, where the second RRC connection reconfiguration message is sent after the second base station receives an eRAB setup request sent by the core network device, where the eRAB setup request and the second RRC connection reconfiguration message carry the third tunnel endpoint.

In one embodiment, the third sending module includes:

a second sending unit, configured to send a second RRC connection reconfiguration complete message to the second base station, where the second RRC connection reconfiguration complete message is used to instruct the second base station to send an eRAB setup response message to the core network device, where the second RRC connection reconfiguration complete message and the eRAB setup response message carry the fourth tunnel endpoint.

In one embodiment, the first base station further includes:

a fourth sending module, configured to send the second RRC connection reconfiguration message to the UE after the second receiving unit receives the second RRC connection reconfiguration message sent by the second base station, where the second RRC connection reconfiguration message is used to request the UE to configure an air interface resource; and a fifth receiving module, configured to receive the second RRC connection reconfiguration complete message sent by the UE, where the second RRC connection reconfiguration complete message is used to indicate that the UE has completed configuration of the air interface resource.

An eighth aspect of the embodiments of the present disclosure provides a core network device, including:

a first sending module, configured to send a second tunnel endpoint to a first base station, where the second tunnel endpoint includes a second TEID and a second transport layer address, the second tunnel endpoint is allocated by the core network device, and the second tunnel endpoint is used to indicate a destination of data transmitted in an uplink data transmission path of a first bearer;

a first receiving module, configured to receive a first tunnel endpoint sent by the first base station, where the first tunnel endpoint includes a first tunnel endpoint identifier (TEID) and a first transport layer address, the first tunnel endpoint is allocated by the first base station, and the first tunnel endpoint is used to indicate a destination of data transmitted in a downlink data transmission path of the first bearer; and a first setup module, configured to complete setup of the first bearer with the first base station, for transmitting the uplink data and transmitting the downlink data.

In one embodiment, the first sending module includes:

a first sending unit, configured to send an initial context setup request to a second base station, where the initial context setup request is used to instruct the second base station to send a first RRC connection reconfiguration message to the first base station, where the initial context setup request and the first RRC connection reconfiguration message carry the second tunnel endpoint.

In one embodiment, the first receiving module includes:

a first receiving unit, configured to receive an initial context setup response message sent by the second base station, where the initial context setup response message is sent after the second base station receives a first RRC connection reconfiguration complete message sent by the first base station, and the first RRC connection reconfiguration complete message is used to indicate that UE has completed configuration of an air interface resource, where the first RRC connection reconfiguration complete message and the initial context setup response message carry the first tunnel endpoint.

In one embodiment, the core network device further includes:

a modification module, configured to modify the first bearer before the first setup module completes setup of the first bearer with the first base station.

In one embodiment, the core network device further includes:

a second sending module, configured to send a third tunnel endpoint to the first base station after the first setup module completes setup of the first bearer with the first base station, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer;

a second receiving module, configured to receive a fourth tunnel endpoint sent by the first base station, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and a second setup module, configured to complete setup of the second bearer with the first base station.

In one embodiment, the second sending module includes:

a second sending unit, configured to send an eRAB setup request to the second base station, where the eRAB setup request is used to instruct the second base station to send a second RRC connection reconfiguration message to the first base station, where the eRAB setup request and the second RRC connection reconfiguration message carry the third tunnel endpoint.

In one embodiment, the second receiving module includes:

a second receiving unit, configured to receive an eRAB setup response message sent by the second base station, where the eRAB setup response message is sent to the core network device after the second base station receives a second RRC connection reconfiguration complete message sent by the first base station, and the second RRC connection reconfiguration complete message is used to indicate that the UE has completed configuration of an air interface resource, where the second RRC connection reconfiguration complete message and the eRAB setup response message carry the fourth tunnel endpoint.

A ninth aspect of the embodiments of the present disclosure provides a first base station, including a memory, a transceiver, a processor, and a bus system, where the memory is configured to store a program; and the processor is configured to execute the program in the memory to specifically perform the following operations:

controlling the transceiver to receive a first bearer setup request message initiated by UE;

controlling, based on the first bearer setup request message, the transceiver to send a first tunnel endpoint to a core network device, where the first tunnel endpoint includes a first TEID and a first transport layer address, the first tunnel endpoint is allocated by the first base station, and the first tunnel endpoint is used to indicate a destination of data transmitted in a downlink data transmission path of a first bearer;

controlling the transceiver to receive a second tunnel endpoint sent by the core network device, where the second tunnel endpoint includes a second TEID and a second transport layer address, the second tunnel endpoint is allocated by the core network device, and the second tunnel endpoint is used to indicate a destination of data transmitted in an uplink data transmission path of the first bearer; and completing setup of the first bearer with the core network device, for transmitting the uplink data and transmitting the downlink data.

In one embodiment, the processor is configured to:

control the transceiver to send an RRC connection setup complete message to a second base station, where the RRC connection setup complete message is used to instruct the second base station to send an initial UE message to the core network device, where the RRC connection setup complete message and the initial UE message carry the first tunnel endpoint.

In one embodiment, the processor is configured to:

control the transceiver to receive a first RRC connection reconfiguration message sent by the second base station, where the first RRC connection reconfiguration message is sent after the second base station receives an initial context setup request, and the initial context setup request is sent by the core network device to the second base station, where the initial context setup request and the first RRC connection reconfiguration message carry the second tunnel endpoint.

In one embodiment, the processor is further configured to:

control the transceiver to send the first RRC connection reconfiguration message to the UE, where the first RRC connection reconfiguration message is used to request the UE to configure an air interface resource; and control the transceiver to receive a first RRC connection reconfiguration complete message sent by the UE, where the first RRC connection reconfiguration complete message is used to indicate that the UE has completed configuration of the air interface resource.

In one embodiment, the processor is further configured to:

control the transceiver to send the first RRC connection reconfiguration complete message to the second base station, so that the second base station sends an initial context setup response message to the core network device based on the first RRC connection reconfiguration complete message, where the initial context setup response message is used to instruct the core network device to modify the first bearer.

In one embodiment, the processor is further configured to:

control the transceiver to receive a third tunnel endpoint sent by the core network device, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer;

control the transceiver to send a fourth tunnel endpoint to the core network device, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and complete setup of the second bearer with the core network device.

In one embodiment, the processor is configured to:

control the transceiver to receive a second RRC connection reconfiguration message sent by the second base station, where the second RRC connection reconfiguration message is sent after the second base station receives an eRAB setup request sent by the core network device, where the eRAB setup request and the second RRC connection reconfiguration message carry the third tunnel endpoint.

In one embodiment, the processor is configured to:

control the transceiver to send a second RRC connection reconfiguration complete message to the second base station, where the second RRC connection reconfiguration complete message is used to instruct the second base station to send an eRAB setup response message to the core network device, where the second RRC connection reconfiguration complete message and the eRAB setup response message carry the fourth tunnel endpoint.

In one embodiment, the processor is further configured to:

control the transceiver to send the second RRC connection reconfiguration message to the UE, where the second RRC connection reconfiguration message is used to request the UE to configure an air interface resource; and control the transceiver to receive the second RRC connection reconfiguration complete message sent by the UE, where the second RRC connection reconfiguration complete message is used to indicate that the UE has completed configuration of the air interface resource.

A tenth aspect of the embodiments of the present disclosure provides a core network device, including a memory, a transceiver, a processor, and a bus system, where the memory is configured to store a program; and the processor is configured to execute the program in the memory to specifically perform the following operations:

controlling the transceiver to receive a first tunnel endpoint sent by a first base station, where the first tunnel endpoint includes a first TEID and a first transport layer address, the first tunnel endpoint is allocated by the first base station, and the first tunnel endpoint is used to indicate a destination of data transmitted in a downlink data transmission path of a first bearer;

controlling the transceiver to send a second tunnel endpoint to the first base station, where the second tunnel endpoint includes a second TEID and a second transport layer address, the second tunnel endpoint is allocated by the core network device, and the second tunnel endpoint is used to indicate a destination of data transmitted in an uplink data transmission path of the first bearer; and completing setup of the first bearer with the first base station, for transmitting the uplink data and transmitting the downlink data.

In one embodiment, the processor is configured to:

control the transceiver to receive an initial UE message sent by a second base station, where the initial UE message is sent after the second base station receives an RRC connection setup complete message sent by the first base station, and the RRC connection setup complete message is sent by the first base station to the second base station based on a first bearer setup request message, where the RRC connection setup complete message and the initial UE message carry the first tunnel endpoint.

In one embodiment, the processor is configured to:

control the transceiver to send an initial context setup request to the second base station, where the initial context setup request is used to instruct the second base station to send a first RRC connection reconfiguration message to the first base station, where the initial context setup request and the first RRC connection reconfiguration message carry the second tunnel endpoint.

In one embodiment, the processor is further configured to:

control the transceiver to receive an initial context setup response message sent by the second base station, where the initial context setup response message is sent to the core network device after the second base station receives a first RRC connection reconfiguration complete message sent by the first base station, and the first RRC connection reconfiguration complete message is used to indicate that UE has completed configuration of an air interface resource.

In one embodiment, the processor is further configured to:

modify the first bearer.

In one embodiment, the processor is further configured to:

control the transceiver to send a third tunnel endpoint to the first base station, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer;

control the transceiver to receive a fourth tunnel endpoint sent by the first base station, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and complete setup of the second bearer with the first base station.

In one embodiment, the processor is configured to:

control the transceiver to send an eRAB setup request to the second base station, where the eRAB setup request is used to instruct the second base station to send a second RRC connection reconfiguration message to the first base station, where the eRAB setup request and the second RRC connection reconfiguration message carry the third tunnel endpoint.

In one embodiment, the processor is configured to:

control the transceiver to receive an eRAB setup response message sent by the second base station, where the eRAB setup response message is sent to the core network device after the second base station receives a second RRC connection reconfiguration complete message sent by the first base station, and the second RRC connection reconfiguration complete message is used to indicate that the UE has completed configuration of an air interface resource, where the second RRC connection reconfiguration complete message and the eRAB setup response message carry the fourth tunnel endpoint.

An eleventh aspect of the embodiments of the present disclosure provides a first base station, including a memory, a transceiver, a processor, and a bus system, where the memory is configured to store a program; and the processor is configured to execute the program in the memory to perform the following operations:

controlling the transceiver to receive a first bearer setup request message initiated by UE;

controlling, based on the first bearer setup request message, the transceiver to receive a second tunnel endpoint sent by a core network device, where the second tunnel endpoint includes a second TEID and a second transport layer address, the second tunnel endpoint is allocated by the core network device, and the second tunnel endpoint is used to indicate a destination of data transmitted in an uplink data transmission path of a first bearer;

controlling the transceiver to send a first tunnel endpoint to the core network device, where the first tunnel endpoint includes a first TEID and a first transport layer address, the first tunnel endpoint is allocated by the first base station, and the first tunnel endpoint is used to indicate a destination of data transmitted in a downlink data transmission path of the first bearer; and completing setup of the first bearer with the core network device, for transmitting the uplink data and transmitting the downlink data.

In one embodiment, the processor is configured to:

control the transceiver to receive a first RRC connection reconfiguration message sent by a second base station, where the first RRC connection reconfiguration message is sent after the second base station receives an initial context setup request sent by the core network device, where the initial context setup request and the first RRC connection reconfiguration message carry the second tunnel endpoint.

In one embodiment, the processor is configured to:

control the transceiver to send a first RRC connection reconfiguration complete message to the second base station, where the first RRC connection reconfiguration complete message is used to instruct the second base station to send an initial context setup response message to the core network device, where the first RRC connection reconfiguration complete message and the initial context setup response message carry the first tunnel endpoint.

In one embodiment, the processor is further configured to:

control the transceiver to send the first RRC connection reconfiguration message to the UE, where the first RRC connection reconfiguration message is used to request the UE to configure an air interface resource; and control the transceiver to receive the first RRC connection reconfiguration complete message sent by the UE, where the first RRC connection reconfiguration complete message is used to indicate that the UE has completed configuration of the air interface resource.

In one embodiment, the processor is further configured to:

control the transceiver to receive a third tunnel endpoint sent by the core network device, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer;

control the transceiver to send a fourth tunnel endpoint to the core network device, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and complete, setup of the second bearer with the core network device.

In one embodiment, the processor is configured to:

control the transceiver to receive a second RRC connection reconfiguration message sent by the second base station, where the second RRC connection reconfiguration message is sent after the second base station receives an eRAB setup request sent by the core network device, where the eRAB setup request and the second RRC connection reconfiguration message carry the third tunnel endpoint.

In one embodiment, the processor is configured to:

control the transceiver to send a second RRC connection reconfiguration complete message to the second base station, where the second RRC connection reconfiguration complete message is used to instruct the second base station to send an eRAB setup response message to the core network device, where the second RRC connection reconfiguration complete message and the eRAB setup response message carry the fourth tunnel endpoint.

In one embodiment, the processor is further configured to:

control the transceiver to send the second RRC connection reconfiguration message to the UE, where the second RRC connection reconfiguration message is used to request the UE to configure an air interface resource; and control the transceiver to receive the second RRC connection reconfiguration complete message sent by the UE, where the second RRC connection reconfiguration complete message is used to indicate that the UE has completed configuration of the air interface resource.

A twelfth aspect of the embodiments of the present disclosure provides a core network device, including a memory, a transceiver, a processor, and a bus system, where the memory is configured to store a program; and the processor is configured to execute the program in the memory to specifically perform the following operations:

controlling the transceiver to send a second tunnel endpoint to a first base station, where the second tunnel endpoint includes a second TEID and a second transport layer address, the second tunnel endpoint is allocated by the core network device, and the second tunnel endpoint is used to indicate a destination of data transmitted in an uplink data transmission path of a first bearer;

controlling the transceiver to receive a first tunnel endpoint sent by the first base station, where the first tunnel endpoint includes a first TEID and a first transport layer address, the first tunnel endpoint is allocated by the first base station, and the first tunnel endpoint is used to indicate a destination of data transmitted in a downlink data transmission path of the first bearer; and completing setup of the first bearer with the first base station, for transmitting the uplink data and transmitting the downlink data.

In one embodiment, the processor is configured to:

control the transceiver to send an initial context setup request to a second base station, where the initial context setup request is used to instruct the second base station to send a first RRC connection reconfiguration message to the first base station, where the initial context setup request and the first RRC connection reconfiguration message carry the second tunnel endpoint.

In one embodiment, the processor is configured to:

control the transceiver to receive an initial context setup response message sent by the second base station, where the initial context setup response message is sent after the second base station receives a first RRC connection reconfiguration complete message sent by the first base station, and the first RRC connection reconfiguration complete message is used to indicate that UE has completed configuration of an air interface resource, where the first RRC connection reconfiguration complete message and the initial context setup response message carry the first tunnel endpoint.

In one embodiment, the processor is further configured to:

modify, the first bearer.

In one embodiment, the processor is further configured to:

control the transceiver to send a third tunnel endpoint to the first base station, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer;

control the transceiver to receive a fourth tunnel endpoint sent by the first base station, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and complete setup of the second bearer with the first base station.

In one embodiment, the processor is configured to:

control the transceiver to send an eRAB setup request to the second base station, where the eRAB setup request is used to instruct the second base station to send a second RRC connection reconfiguration message to the first base station, where the eRAB setup request and the second RRC connection reconfiguration message carry the third tunnel endpoint.

In one embodiment, the processor is configured to:

control the transceiver to receive an eRAB setup response message sent by the second base station, where the eRAB setup response message is sent to the core network device after the second base station receives a second RRC connection reconfiguration complete message sent by the first base station, and the second RRC connection reconfiguration complete message is used to indicate that the UE has completed configuration of an air interface resource, where the second RRC connection reconfiguration complete message and the eRAB setup response message carry the fourth tunnel endpoint.

A thirteenth aspect of the embodiments of the present disclosure provides a bearer setup system, including a base station and a core network device, where the base station is the base station according to any one of the fifth aspect and the first to the eighth possible implementations of the fifth aspect; and the core network device is the core network device according to any one of the sixth aspect and the first to the seventh possible implementations of the sixth aspect.

A fourteenth aspect of the embodiments of the present disclosure provides a bearer setup system, including a base station and a core network device, where the base station is the base station according to any one of the seventh aspect and the possible implementations of the seventh aspect; and the core network device is the core network device according to any one of the eighth aspect and the possible implementations of the eighth aspect.

In the technical solution provided in the embodiments of the present disclosure, a bearer setup method is provided. In one embodiment, the first base station receives the first bearer setup request message initiated by the UE; then the first base station sends the first tunnel endpoint to the core network device based on the first bearer setup request message, where the first tunnel endpoint includes the first tunnel endpoint identifier (TEID) and the first transport layer address, the first tunnel endpoint is allocated by the first base station, and the first tunnel endpoint is used to indicate the destination of the data transmitted in the downlink data transmission path of the first bearer; then the first base station receives the second tunnel endpoint sent by the core network device, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person skilled in the art may derive other drawings from these accompanying drawings without creative efforts.

DESCRIPTION OF EMBODIMENTS

Figure 1:
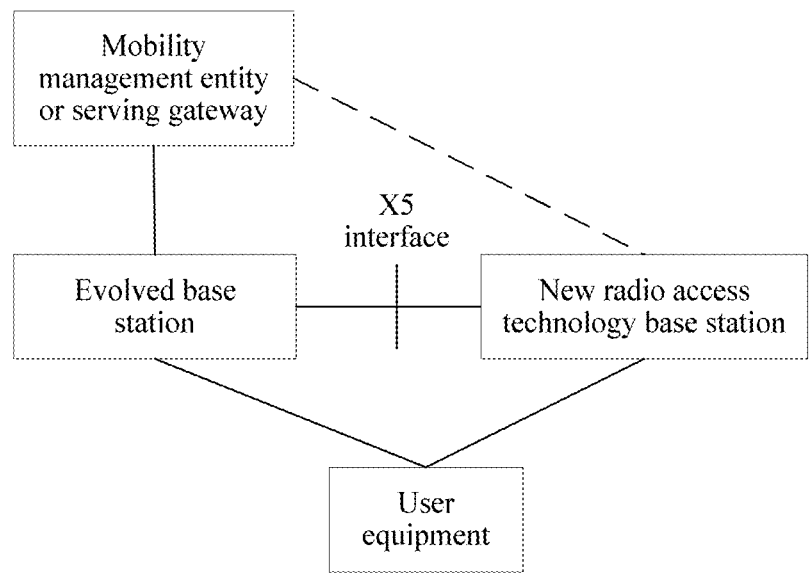
FIG. 1 is a schematic diagram of an architecture for multilink transmission in the prior art.
Figure 2:
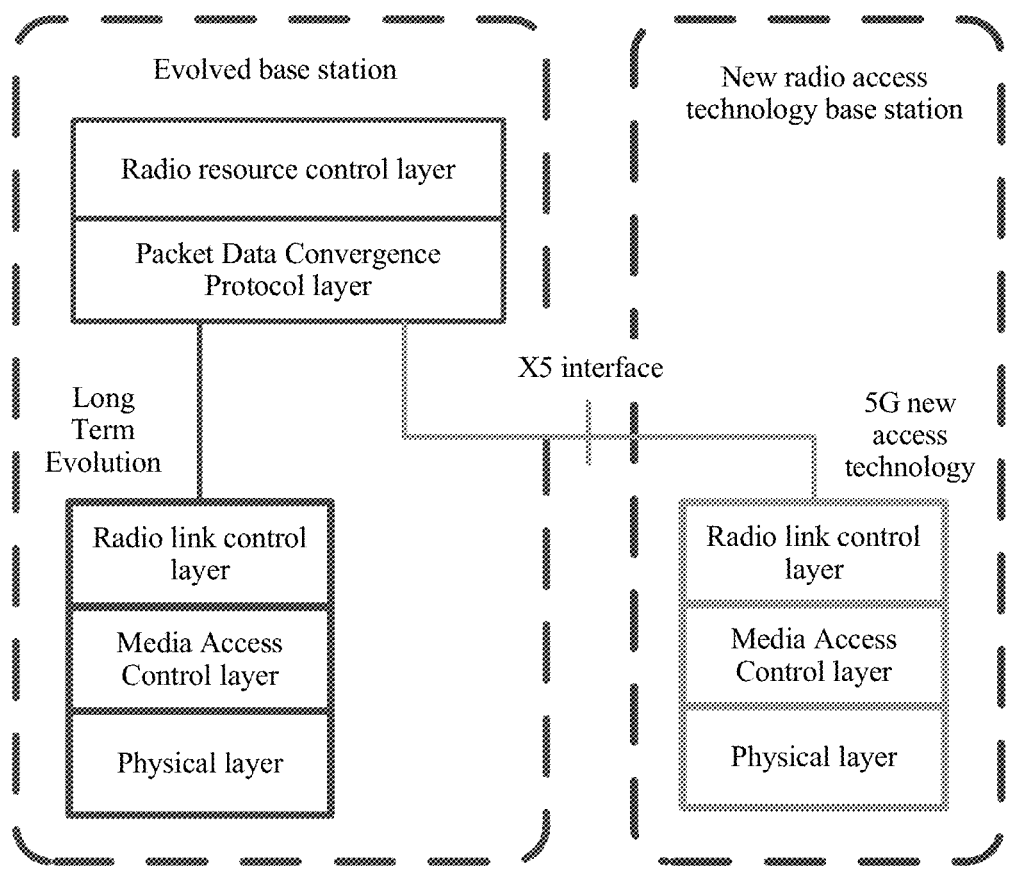
FIG. 2 is a schematic diagram of a CP protocol stack for multilink transmission in the prior art.
Figure 3:
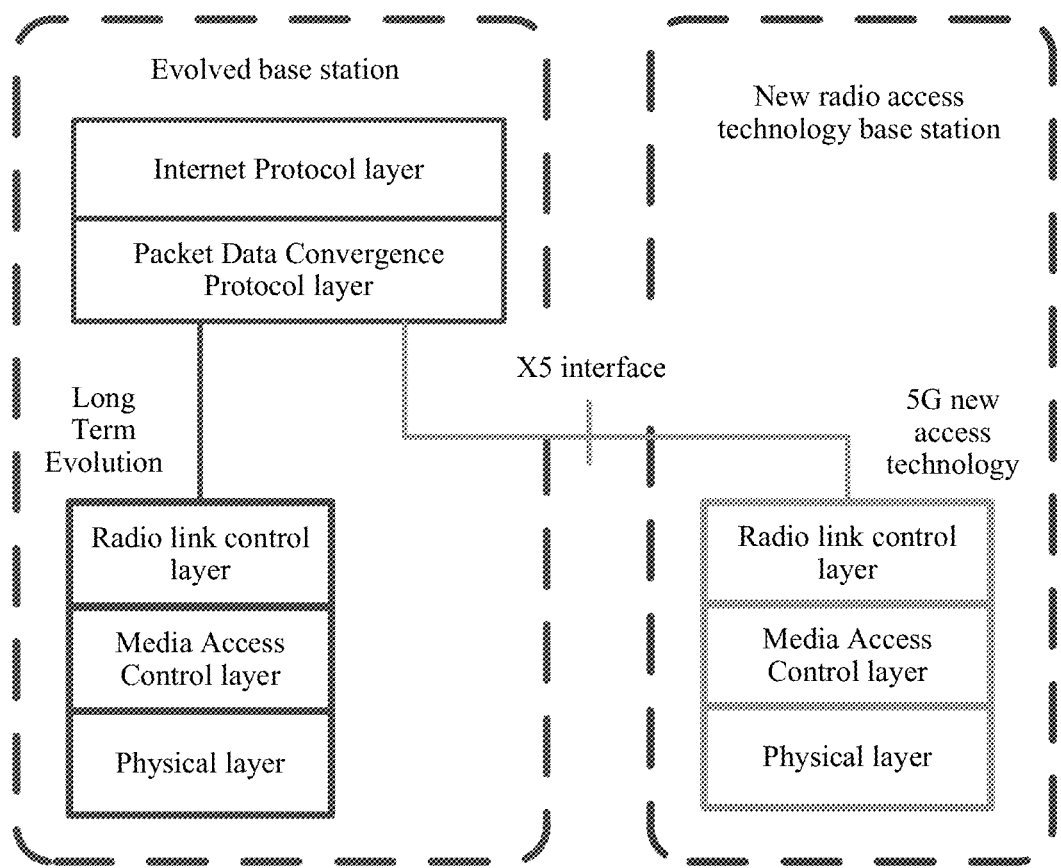
FIG. 3 is a schematic diagram of a UP protocol stack for multilink transmission in the prior art.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

In the specification, claims, and accompanying drawings of the present disclosure, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such a process, method, system, product, or device.

It should be understood that, in a bearer setup method provided in the embodiments of the present disclosure, a first base station may be understood as an NR BS or a new radio access technology node (New RAT node, NR node), that is, a base station using a 5G new access technology, but a second base station may be understood as a 4G base station, that is, an eNB used in LTE network.

Currently, a 4G network may be an LTE network, and a process of evolution from 4G to 5G may be completed in two phases in sequence. According to an LTE-NR based DC solution, UE may be allowed to access a 5G network by using LTE. In phase 1, LTE-NR supports 4G-5G interworking in DC mode. In phase 2, eLTE supports an S1 interface in connecting to an EPC, and also supports an NG interface in connecting to a new core. The NR in phase 1 connects to the EPC by using LTE. The NR in phase 2 directly connects to the new core to comprehensively support all 5G functions.

In the DC solution, a control plane (CP) is reserved in LTE network. Then a user plane (UP) performs offloading at a data packet granularity (or a bearer granularity) by using both a LTE eNB and a 5G new air interface in LTE DC mode, that is, a UP anchor performs offloading at the data packet granularity (or the bearer granularity) at a PDCP layer of the LTE eNB. The data packet granularity indicates that a minimum unit is a data packet, that is, a protocol data unit (PDU). Because a PDU is already a minimum unit of a data packet, the PDU is not split during offloading, but a plurality of PDUs are separately transmitted in each link to implement offloading. Similarly, the UE may also access an LTE core network from a NR BS via an LTE eNB by using a new interface X5; the CP is still reserved in the LTE eNB; and similar to the LTE DC, the UP performs offloading at the data packet granularity (or the bearer granularity) at a PDCP layer of the NR BS. The UE needs to connect to the eNB via the NR BS by using the new interface X5, but the new interface X5 is generally not ideal. This causes a latency in transmitting data from the NR BS to the eNB.

It should be understood that, in one embodiment, an air interface technology used in the 5G new RAT may be a filter band multi-carrier (FBMC) technology, a faster than Nyquist (FTN) technology, a generalized frequency division multiplexing (GFDM) technology, or a non-orthogonal multiple access (NOMA) technology. All the air interface technologies may be temporarily referred to as 5G new air interface technologies.

However, the 5G new RAT may further use a 4G evolved air interface technology in addition to a 5G new air interface technology. In one embodiment, an enhanced new technology is introduced on a basis of an existing 4G architecture, to further improve existing system performance while ensuring compatibility, and meet a 5G scenario and a service requirement to some extent. In the embodiments, an air interface technology specifically used by the 5G new RAT is not limited.

Figure 4:
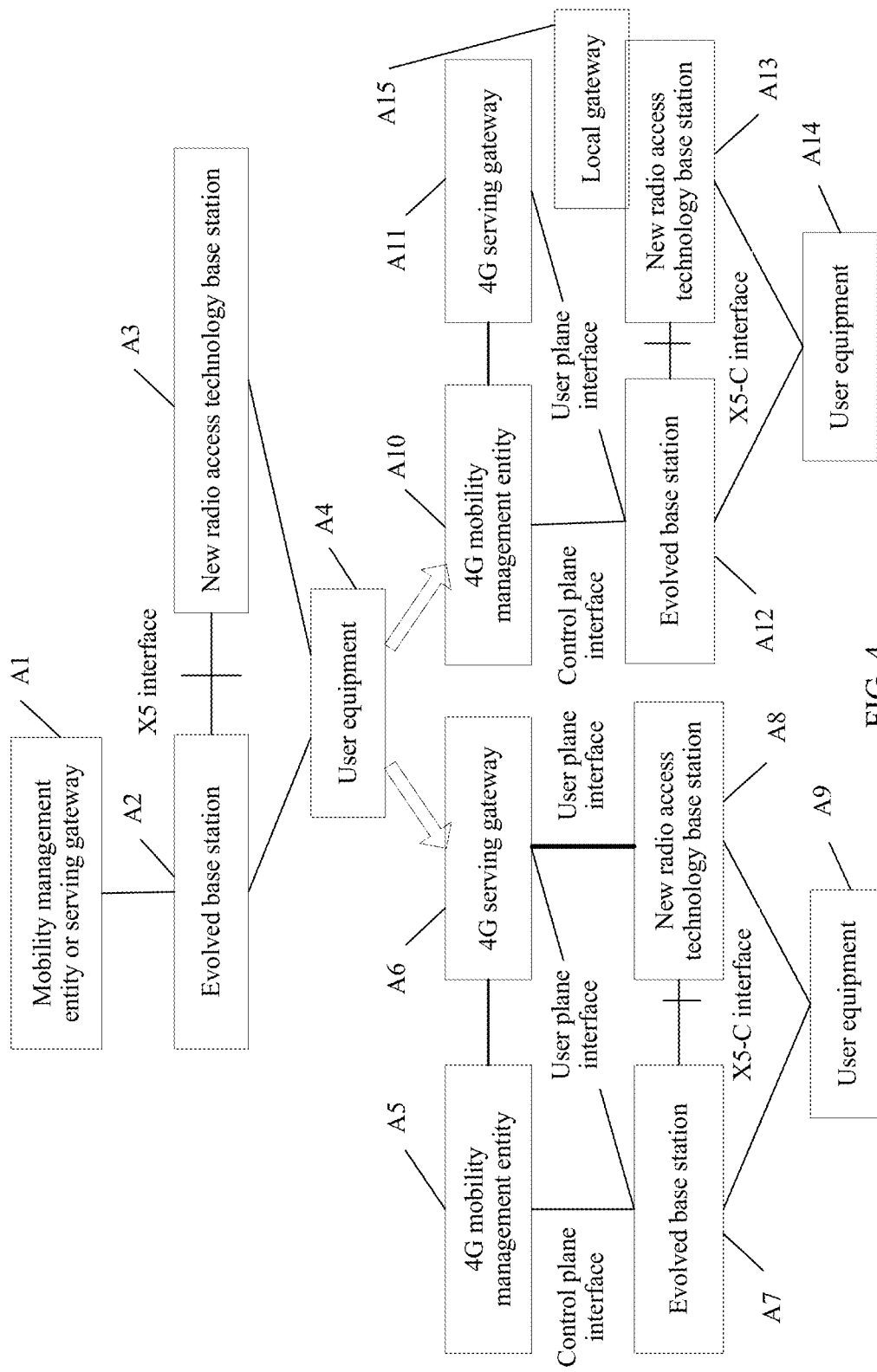
FIG. 4 is a schematic diagram of a new architecture for multilink transmission according to an embodiment of the present disclosure.

To avoid a latency caused in data transmission on the new interface X5, the present disclosure provides a bearer setup method. The method relates to a new architecture. FIG. 4 is a schematic diagram of a new architecture for multilink transmission according to an embodiment of the present disclosure. As shown in the figure, the architecture in the figure includes a multilink transmission architecture above arrows, and two architectures below the arrows, where an architecture on the left of the arrows is an architecture supporting a 4G SGW scenario, and an architecture on the right of the arrows is an architecture supporting a local gateway (LGW) scenario. The following describes the two new architectures separately.

In a first architecture supporting a 4G SGW, a 4G MME A5 and a 4G SGW A6 are components of a 4G core network; and a 4G eNB A7 communicatively connects to the 4G MME A5 by using a CP interface, and also communicatively connects to the 4G SGW A6 by using a UP interface. The CP interface may be specifically an S1-MME interface, and is used to transmit session management and mobility management information, that is, transmit CP information. The UP interface is specifically an S1-U interface, and a bearer is set up between the 4G SGW A6 and the eNB A7 to transmit a user data, that is, UP data. An NR BS A8 transmits UP data to the 4G SGW A6 by using a UP interface, but CP information may be transmitted to the eNB A7 by using an X5-C interface and transmitted to the 4G MME A5 via the eNB A7. Different from an X5-U interface, the X5-C interface is used to transmit CP information instead of UP data.

It should be noted that, the new interface X5 is merely an example, and in an actual application, may also be a new interface X8, or a new interface X10, or another name, and therefore is not limited herein.

UE A9 accesses the LTE core network from the NR BS A8 via the LTE eNB A7. A CP is still in the LTE eNB A7. A UP is directly set up between the LTE core network and the NR BS A8. Certainly, the UE A9 may still transmit CP information and UP data via the 4G eNB A7.

Figure 5A:
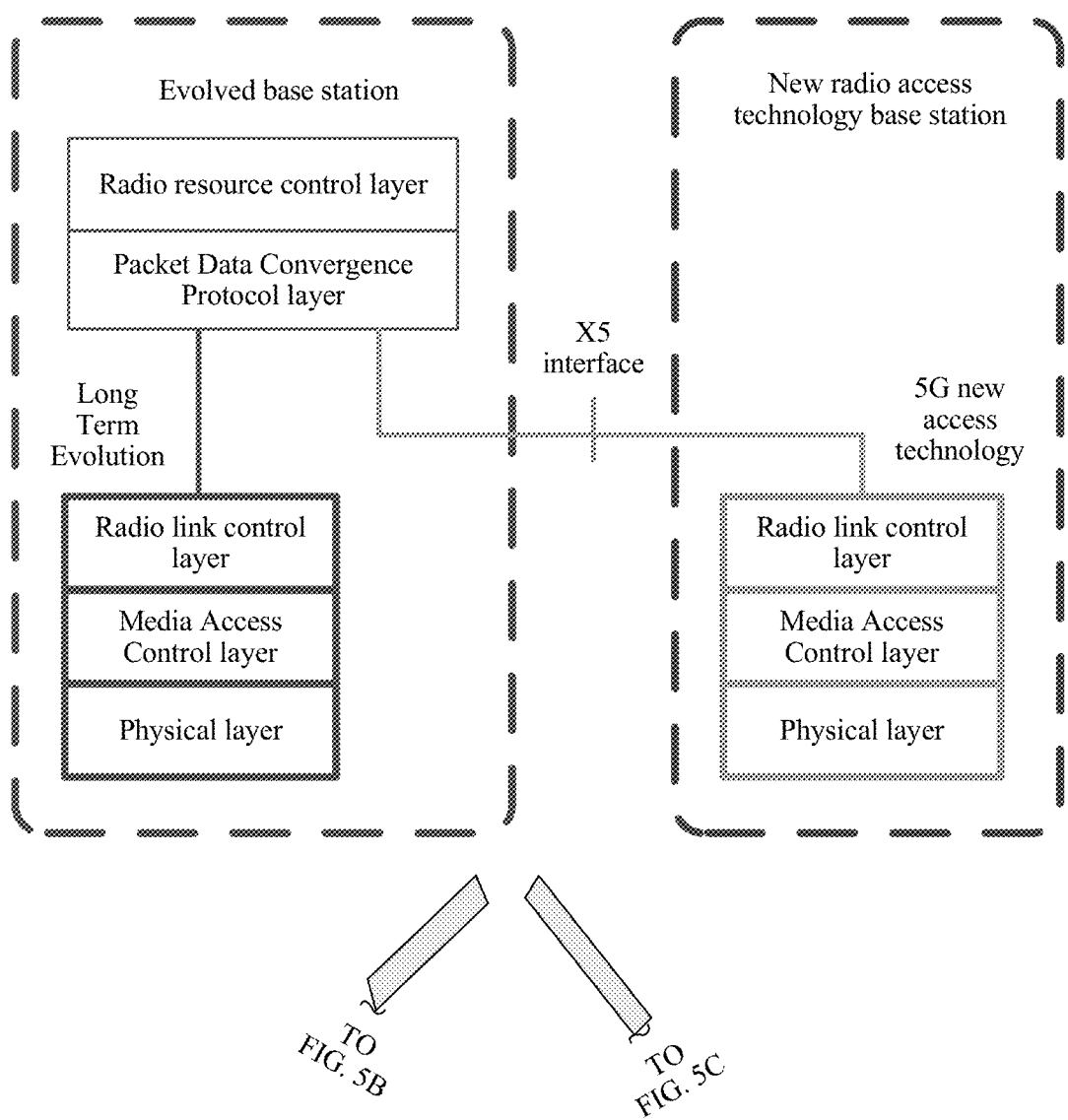
FIG. 5A, FIG. 5B, and FIG. 5C are a schematic diagram of a control plane protocol stack for multilink transmission in a new architecture according to an embodiment of the present disclosure.
Figure 5B:
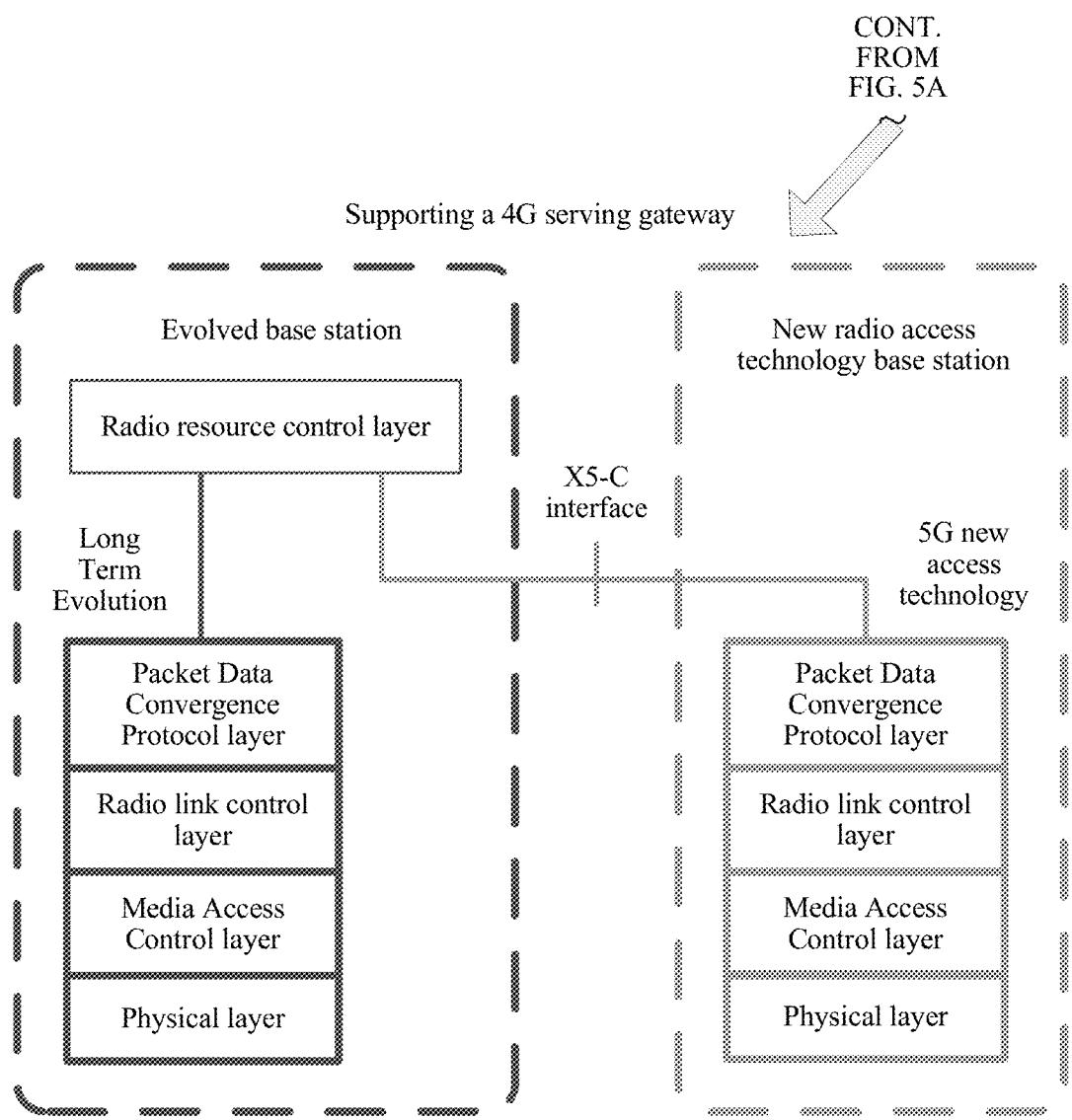
Figure 5C:
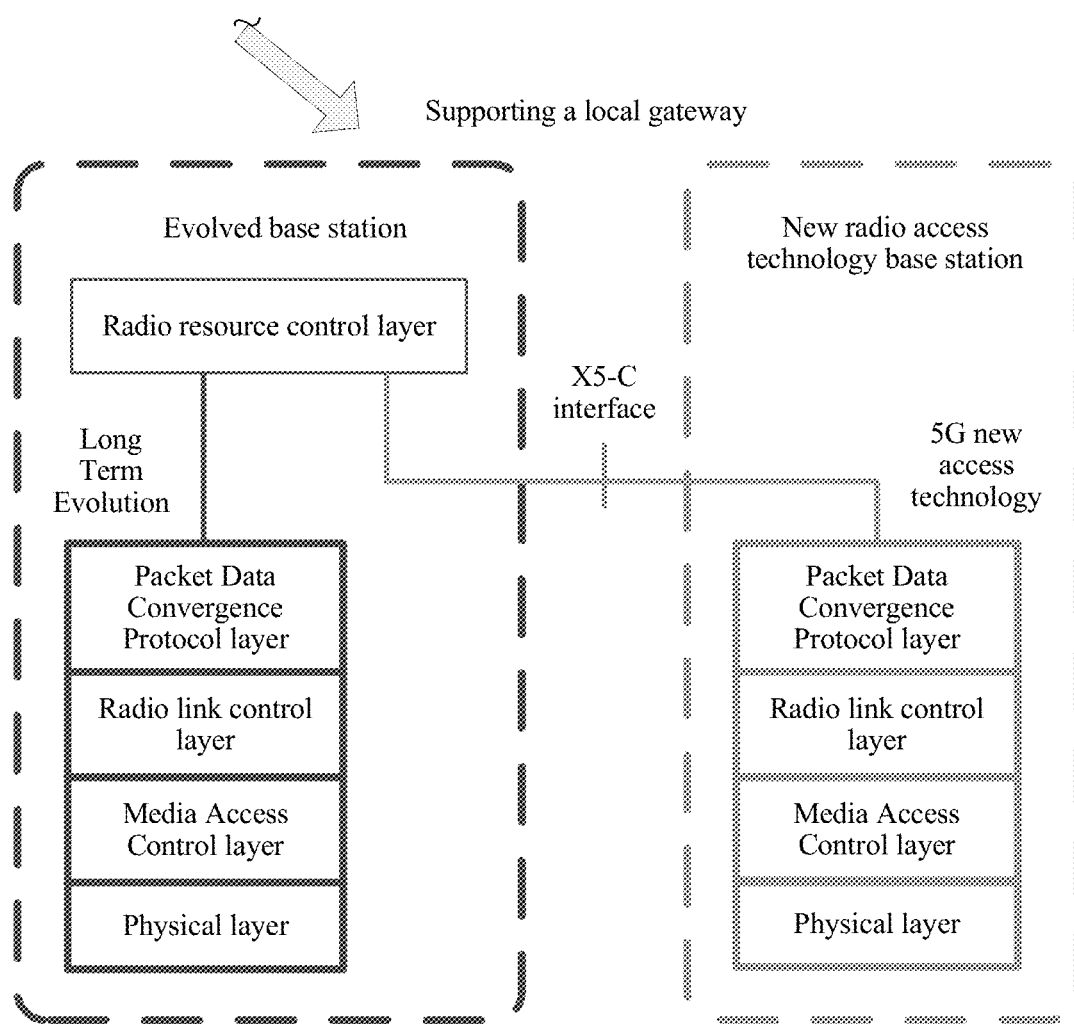

For the foregoing architecture, corresponding CP and UP protocol stacks exist. FIG. 5A, FIG. 5B, and FIG. 5C are a schematic diagram of a CP protocol stack for multilink transmission in a new architecture according to an embodiment of the present disclosure. A protocol stack shown in FIG. 5B is a control plane protocol stack corresponding to the architecture supporting the 4G SGW. In the eNB, an anchor originally disposed at an LTE PDCP layer is changed, and the anchor is disposed at an LTE RRC layer instead. In the CP, a PDCP layer is added to a protocol stack of the NR BS, so that the PDCP layer exchanges CP information with the RRC layer of the eNB by using the X5-C interface.

Figure 6A:
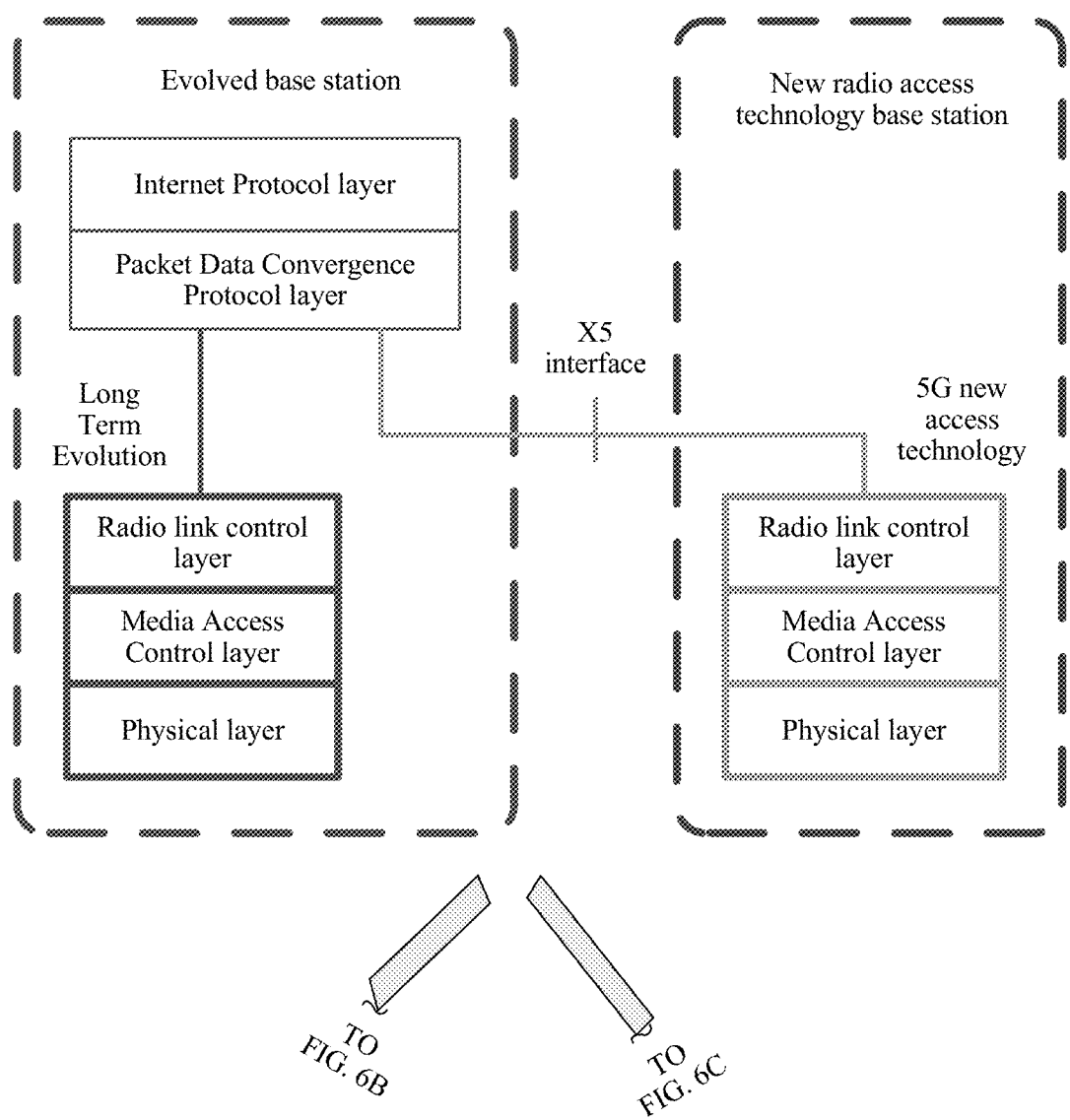
FIG. 6A, FIG. 6B, and FIG. 6C are a schematic diagram of a user plane protocol stack for multilink transmission in a new architecture according to an embodiment of the present disclosure.
Figure 6B:
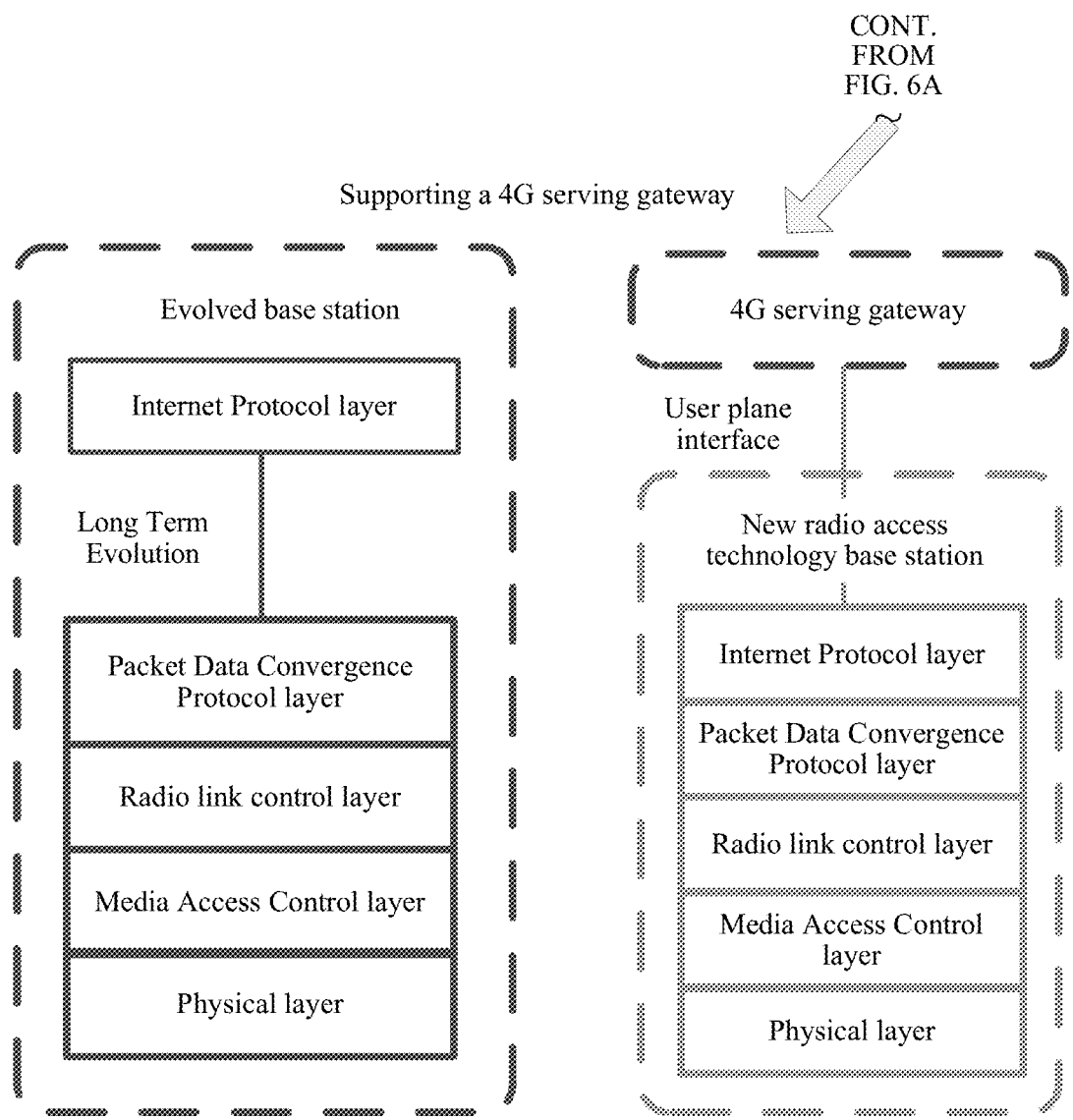
Figure 6C:
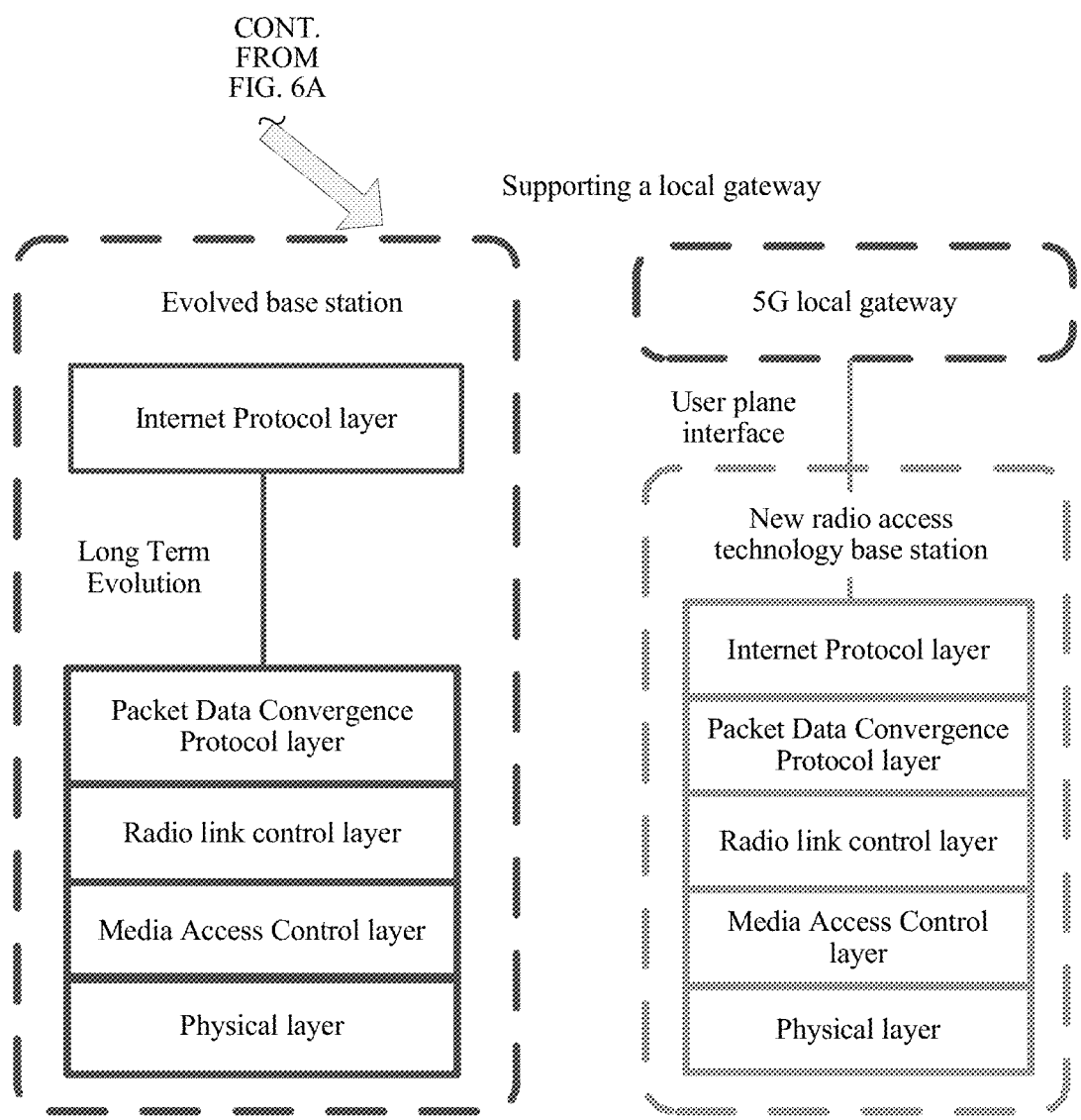

For UP data transmission, FIG. 6A, FIG. 6B, and FIG. 6C show a schematic diagram of a UP protocol stack for multilink transmission in a new architecture according to an embodiment of the present disclosure. A protocol stack below a left arrow shown in FIG. 6A is a UP protocol stack corresponding to the architecture supporting the 4G SGW. In the eNB, the PDCP layer is located above the RLC layer, and forms a protocol stack together with the RLC layer, a MAC layer, and a PHY layer. Likewise, in the NR BS, the PDCP layer is also located above an RLC layer, and forms a protocol stack together with the RLC layer, a MAC layer, and a PHY layer. In this way, a layer, to be specific, an IP layer, above the PDCP layer may be added to the NR BS, and UP data transmission is performed with the 4G SGW directly by using an S1-U interface. Therefore, the NR BS does not need to transmit the UP data via the eNB, and a latency caused by use of the new interface X5 can be avoided.

In a second architecture supporting a 5G LGW, a 4G MME A10 and a 4G SGW A11 are components of a 4G core network; and a 4G eNB A12 communicatively connects to the 4G MME A10 by using a CP interface, and also communicatively connects to the 4G SGW A11 by using a UP interface. Likewise, the CP interface is specifically an S1-MME interface, and the UP interface is specifically an S1-U interface. An NR BS A13 can directly connect to an NR LGW A15 on a UP. Therefore, UP data can also be transmitted without using the 4G SGW A11, but CP information is transmitted to the eNB A12 by using an X5-C interface and transmitted to the 4G MME A10 via the eNB A12. New interfaces X5 include the X5-C interface and an X5-U interface. The X5-C interface is mainly used to transmit CP information, and the X5-U interface is mainly used to transmit UP data.

UE transmits UP data to the NR LGW A15 via the NR BS A13; however, there is no need to transmit UP data between the NR BS A13 and the eNB A12, and only CP information needs to be transmitted. Certainly, the UE may still transmit CP information and UP data via the 4G eNB A12.

For the foregoing architecture, corresponding CP and UP protocol stacks exist. FIG. 5A, FIG. 5B, and FIG. 5C are a schematic diagram of a CP protocol stack for multilink transmission in a new architecture according to an embodiment of the present disclosure. A protocol stack below a right arrow shown in FIG. 5A is a CP protocol stack corresponding to the architecture supporting the NR LGW. The CP protocol stack is similar to the CP protocol stack corresponding to the architecture supporting the 4G SGW, and therefore is not described again herein.

For UP data transmission, FIG. 6A, FIG. 6B, and FIG. 6C show a schematic diagram of a UP protocol stack for multilink transmission in a new architecture according to an embodiment of the present disclosure. A protocol stack below a right arrow shown in FIG. 6A is a UP protocol stack corresponding to the architecture supporting the NR LGW. In the eNB, a PDCP layer is located above an RLC layer, and forms a protocol stack together with the RLC layer, a MAC layer, and a PHY layer. Likewise, in the NR BS, a PDCP layer is also located above an RLC layer, and forms a protocol stack together with the RLC layer, a MAC layer, and a PHY layer. In this way, a layer, to be specific, an IP layer, above the PDCP layer may be added to the NR BS, and UP data transmission is performed with the NR LGW directly by using an S1-U interface. Therefore, the NR BS does not need to transmit the UP data by using the eNB, and a latency caused by use of the new interface X5 can be avoided.

The new architecture for multilink transmission shown in FIG. 4 may be used to implement the following functions:

(1) The UE connects to the eNB via the NR BS or the NR node by using the X5 interface, and implements transmission of CP information;

(2) the NR BS or the NR node reuses a PDCP layer protocol of LTE and an upper layer protocol of LTE;

(3) CP information is still transmitted by using the LTE eNB;

(4) the UE may transmit UP data by using the NR BS or the NR node, or may transmit UP data by using both the LTE eNB and the NR BS (or the NR node); and (5) the NR BS or the NR node is supported in performing UP data transmission directly with the NR LGW, where the LGW is configured to directly output data without using the 4G SGW.

In the foregoing two new architectures, after access from the NR BS or the NR node, the UE accesses the LTE core network directly by using the LTE eNB, and a bearer is directly set up between the LTE core network and the NR BS.

Figure 7:
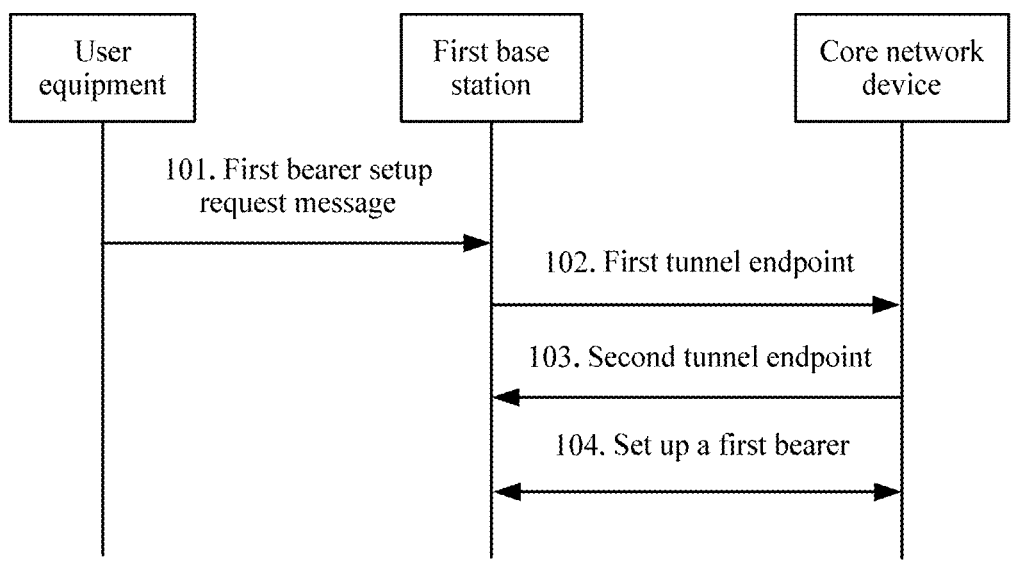
FIG. 7 is a schematic diagram of an embodiment of a bearer setup method according to an embodiment of the present disclosure.

The following describes in detail how to set up a bearer between the NR BS and the LTE core network in two manners:

Manner 1:

Referring to FIG. 7, an embodiment of a bearer setup method in an embodiment of the present disclosure includes the following operations.

Operation 101. A first base station receives a first bearer setup request message initiated by UE.

In this embodiment, the first base station is specifically an NR BS or an NR node, and the first bearer is specifically a default bearer. First, the UE initiates the first bearer setup request message to the first base station, where the first bearer setup request message is used to indicate that the first base station needs to set up a tunnel and set up the first bearer with an LTE core network, to implement data transmission between an NR BS and LTE eNB. The first bearer setup request message may also be referred to as a first bearer setup request.

In one embodiment, the first bearer setup request message may be an attach request (attach request) sent by the UE to the first base station, and the attach request message may be carried in an RRC connection setup complete (RRC connection setup complete) message. Optionally, the first bearer setup request message may also be a request sent independently of the attach request. This is not limited herein.

Operation 102. The first base station sends a first tunnel endpoint to a core network device based on the first bearer setup request message, where the first tunnel endpoint includes a first tunnel endpoint identifier (TEID) and a first transport layer address, the first tunnel endpoint is allocated by the first base station, and the first tunnel endpoint is used to indicate a destination of data transmitted in a downlink data transmission path of a first bearer.

In this embodiment, the first base station determines, based on the received first bearer setup request message, that a tunnel needs to be set up with the LTE core network. Considering that the first base station sets up the tunnel with the LTE core network for the first time, setup of the tunnel is mainly used for implementing the first bearer, and a dedicated bearer can be set up only after setup of the first bearer is completed.

Therefore, the first base station sends the first tunnel endpoint to the core network device, where the first tunnel endpoint includes the first tunnel endpoint identifier (Tunnel Endpoint Identifier, TEID) and the first transport layer address, and the first tunnel endpoint is used to indicate that the destination of the downlink data transmitted on the first bearer is the LTE core network device, for example, may be an SGW, that is, a receiver of the transmitted downlink data is the SGW.

The core network device in the present disclosure may be an SGW and an MME in a 4G core network.

After receiving the first tunnel endpoint, the core network device obtains, by parsing the first tunnel endpoint, the first TEID and the first transport layer address carried in the first tunnel endpoint, and the core network device sets up a downlink bearer of the first bearer with the first base station by using the first TEID and the first transport layer address.

A TEID is used to identify a node of each of GTP tunnels used between two nodes that communicate based on the GPRS Tunneling Protocol (GPRS Tunneling Protocol, GTP). In addition, an IP address and a UDP port may also be used to identify each GTP tunnel.

The first TEID is a TEID of the first base station, and the first transport layer address may be a UP address of the first base station. When the core network device sets up the downlink bearer of the first bearer with the first base station, it means that a downlink bearer of an S1-U interface is created.

Operation 103. The core network device sends a second tunnel endpoint to the first base station, where the second tunnel endpoint includes a second TEID and a second transport layer address, the second tunnel endpoint is allocated by the core network device, and the second tunnel endpoint is used to indicate a destination of data transmitted in an uplink data transmission path of the first bearer.

In this embodiment, after setting up the downlink bearer of the first bearer with the first base station, the core network device sends the second tunnel endpoint to the first base station, where the second tunnel endpoint includes the second TEID and the second transport layer address, and the second tunnel endpoint is used to indicate that a receiver of the transmitted uplink data is the first base station.

The second TEID is specifically a TEID of the SGW in the core network device, and the second transport layer address is specifically a UP address of the SGW.

After receiving the second TEID and the second transport layer address sent by the core network device, the first base station can know that the destination of the uplink data transmitted in the transmission path is the core network device. Therefore, the first base station sets up an uplink bearer of the first bearer with the core network device.

Operation 104. The first base station completes setup of the first bearer with the core network device, for transmitting the uplink data and transmitting the downlink data.

In this embodiment, after the uplink bearer and the downlink bearer of the first bearer are set up between the first base station and the core network device, setup of the first bearer is completed.

In the technical solution provided in this embodiment of the present disclosure, a bearer setup method is provided. To be specific, the first base station receives the first bearer setup request message initiated by the UE; then the first base station sends the first tunnel endpoint to the core network device based on the first bearer setup request message, where the first tunnel endpoint includes the first tunnel endpoint identifier (TEID) and the first transport layer address, the first tunnel endpoint is allocated by the first base station, and the first tunnel endpoint is used to indicate the destination of the data transmitted in the downlink data transmission path of the first bearer; then the first base station receives the second tunnel endpoint sent by the core network device, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

Optionally, on a basis of the embodiment corresponding to FIG. 7, in a first optional embodiment of the bearer setup method provided in this embodiment of the present disclosure, that the first base station sends a first tunnel endpoint to a core network device may include:

the first base station sends an RRC connection setup complete message to a second base station, where the RRC connection setup complete message is used to instruct the second base station to send an initial UE message to the core network device; and the core network device receives the initial UE message sent by the second base station, where the initial UE message is sent after the second base station receives the RRC connection setup complete message sent by the first base station, and the RRC connection setup complete message is sent by the first base station to the second base station based on the first bearer setup request message, where the RRC connection setup complete message and the initial UE message carry the first tunnel endpoint.

In this embodiment, the first base station determines, based on the received first bearer setup request message, that a bearer needs to be set up with the LTE core network. Therefore, the first base station first sends the RRC connection setup complete (RRC connection setup complete) message to the second base station by using an X5-C interface, where the second base station is specifically an eNB. The RRC connection setup complete message carries the first tunnel endpoint, and a format of the RRC connection setup complete message is an LTE format.

After receiving the RRC connection setup complete message in the LTE format, the second base station may add the first tunnel endpoint to the RRC connection setup complete message, or may add the attach request message to the RRC connection setup complete message, and send the RRC connection setup complete message to the MME by using the initial UE message (Initial UE message). Then authentication and NAS security activation may be performed between the UE and the core network.

After successful authentication between the UE and the core network and NAS security activation, a session is created between the MME and the SGW included in the core network device. Specifically, the MME sends a create session request (create session request) to the SGW. Certainly, the create session request still needs to carry the first tunnel endpoint. After receiving the first tunnel endpoint carried in the create session request, the SGW stores the UP address (that is, the first transport layer address) and the TEID (that is, the first TEID) of the first base station in a context of the UE, so that the downlink bearer of the S1-U interface is created.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, in this embodiment of the present disclosure, the first base station specifically transmits the first TEID and the first transport layer address to the core network device by using the RRC connection setup complete message and the initial UE message. In the foregoing manner, the first tunnel endpoint may be transmitted to set up a downlink bearer between the first base station and the core network device, so that feasibility of the solution is enhanced.

Optionally, on a basis of FIG. 7 or the first embodiment corresponding to FIG. 7, in a second optional embodiment of the bearer setup method provided in this embodiment of the present disclosure, that the core network device sends a second tunnel endpoint to the first base station may include:

the core network device sends an initial context setup request to the second base station, where the initial context setup request is used to instruct the second base station to send a first RRC connection reconfiguration message to the first base station; and the first base station receives the first RRC connection reconfiguration message sent by the second base station, where the first RRC connection reconfiguration message is sent after the second base station receives the initial context setup request, and the initial context setup request is sent by the core network device to the second base station, where the initial context setup request and the first RRC connection reconfiguration message carry the second tunnel endpoint.

In this embodiment, after receiving the create session request sent by the MME in the core network device, the SGW in the core network device may create a communication session with the MME and return a create session response (Create session response) message to the MME. In this case, the create session response message carries the second tunnel endpoint, that is, carries the second TEID and the second transport layer address.

After receiving the create session response, the MME returns an attach accept response to the second base station, and requests to set up a radio resource. The request is included in an S1-MME control message, that is, in an initial context setup request (Initial context setup request). The initial context setup request still carries the second TEID and the second transport layer address. Then access stratum security (Access Stratum Security, AS security) activation is performed.

After AS security activation, the second base station sends the first RRC connection reconfiguration (RRC connection reconfiguration) message to the UE via the first base station, where the first RRC connection reconfiguration message still carries the second TEID and the second transport layer address, so that the first base station obtains the second TEID and the second transport layer address of the SGW in the core network device. In this way, the first base station stores the S1-U address (that is, the second transport layer address) and the TEID (that is, the second TEID) of the SGW in the context of the UE. Therefore, the first base station creates an uplink bearer of the S1-U interface.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, the first base station specifically transmits the first TEID and the first transport layer address to the core network device by using the RRC connection setup complete message and the initial UE message. In the foregoing manner, the first tunnel endpoint may be transmitted to set up a downlink bearer between the first base station and the core network device, so that feasibility of the solution is enhanced.

In addition, in this embodiment of the present disclosure, the core network device specifically transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

Optionally, on a basis of the second embodiment corresponding to FIG. 7, in a third optional embodiment of the bearer setup method provided in this embodiment of the present disclosure, after the first base station receives the second tunnel endpoint sent by the core network device, the method may further include:

the first base station sends the first RRC connection reconfiguration message to the UE, where the first RRC connection reconfiguration message is used to request the UE to configure an air interface resource; and the first base station receives a first RRC connection reconfiguration complete message sent by the UE, where the first RRC connection reconfiguration complete message is used to indicate that the UE has completed configuration of the air interface resource.

In this embodiment, after the first base station sets up the uplink bearer with the SGW, to set up the first bearer, the UE further needs to allocate the air interface resource.

In one embodiment, the first base station forwards the first RRC connection reconfiguration message in the LTE format to the UE, to request the UE to configure the air interface resource, where the attach accept response is also sent to the UE by using the first RRC connection reconfiguration message.

It should be noted that, the first RRC connection reconfiguration message sent by the first base station to the UE may carry the second tunnel endpoint, or may not carry the second tunnel endpoint. This is not limited herein.

The UE allocates the air interface resource based on the first RRC connection reconfiguration message, and returns the first RRC connection reconfiguration complete message to the first base station after configuration of the air interface resource is completed. The air interface resource is a high-frequency resource used for transmission between the UE and the base station. The UE allocates the air interface resource based on a service requirement. After receiving the first RRC connection reconfiguration complete message sent by the UE, the first base station may determine that the UE has completed configuration of the air interface resource.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, the first base station specifically transmits the first TEID and the first transport layer address to the core network device by using the RRC connection setup complete message and the initial UE message. In the foregoing manner, the first tunnel endpoint may be transmitted to set up a downlink bearer between the first base station and the core network device, so that feasibility of the solution is enhanced.

In addition, the core network device specifically transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

Further, in this embodiment of the present disclosure, after setting up the uplink bearer with the core network device, the first base station may send the first RRC connection reconfiguration message to the UE, to request configuration of the air interface resource. Therefore, the air interface resource can be provided properly when the uplink data is transmitted, and practical applicability of the solution is enhanced.

Optionally, on a basis of the third embodiment corresponding to FIG. 7, in a fourth optional embodiment of the bearer setup method provided in this embodiment of the present disclosure, after the first base station receives the first RRC connection reconfiguration complete message sent by the UE, the method may further include:

the first base station sends the first RRC connection reconfiguration complete message to the second base station, so that the second base station sends an initial context setup response message to the core network device based on the first RRC connection reconfiguration complete message, where the initial context setup response message is used to instruct the core network device to modify the first bearer;

the core network device modifies the first bearer; and the core network device receives the initial context setup response message sent by the second base station, where the initial context setup response message is sent to the core network device after the second base station receives the first RRC connection reconfiguration complete message sent by the first base station, and the first RRC connection reconfiguration complete message is used to indicate that the UE has completed configuration of the air interface resource.

In this embodiment, before setting up the first bearer with the core network device, the first base station further needs to perform the following signaling interaction.

In one embodiment, after receiving the first RRC connection reconfiguration complete message sent by the UE, the first base station first forwards the first RRC connection reconfiguration complete message to the second base station; and the second base station further sends the initial context setup response (Initial context setup response) message to the MME in the core network device, where the initial context setup response may not carry the first tunnel endpoint, that is, may not carry the S1-U address for downlink transmission and the identifier of the first base station.

After receiving the initial context setup response message, the MME in the core network device sends a modify bearer request (modify bearer request) to the SGW in the core network device; and the SGW modifies the first bearer from the first base station to the core network device based on the modify bearer request. Specific modified information of the first bearer may be information such as a RAT type or a TEID value.

After the first bearer is set up successfully, the SGW sends a modify bearer response (modify bearer response) to the MME. In this case, information related to the first bearer has been modified.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, the first base station specifically transmits the first TEID and the first transport layer address to the core network device by using the RRC connection setup complete message and the initial UE message. In the foregoing manner, the first tunnel endpoint may be transmitted to set up a downlink bearer between the first base station and the core network device, so that feasibility of the solution is enhanced.

In addition, the core network device specifically transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

Further, after setting up the uplink bearer with the core network device, the first base station may send the first RRC connection reconfiguration message to the UE, to request configuration of the air interface resource. Therefore, the air interface resource can be provided properly when the uplink data is transmitted, and practical applicability of the solution is enhanced.

Still further, in this embodiment of the present disclosure, the first base station sends the first RRC connection reconfiguration complete message to the second base station, so that the second base station sends the initial context setup response message to the core network device, where the initial context setup response message is used to instruct the core network device to modify the first bearer; and finally, the core network device receives the initial context setup response message sent by the second base station, to set up the first bearer from the first base station to the core network device, so that feasibility and practical applicability of the solution are enhanced.

Figure 8A:
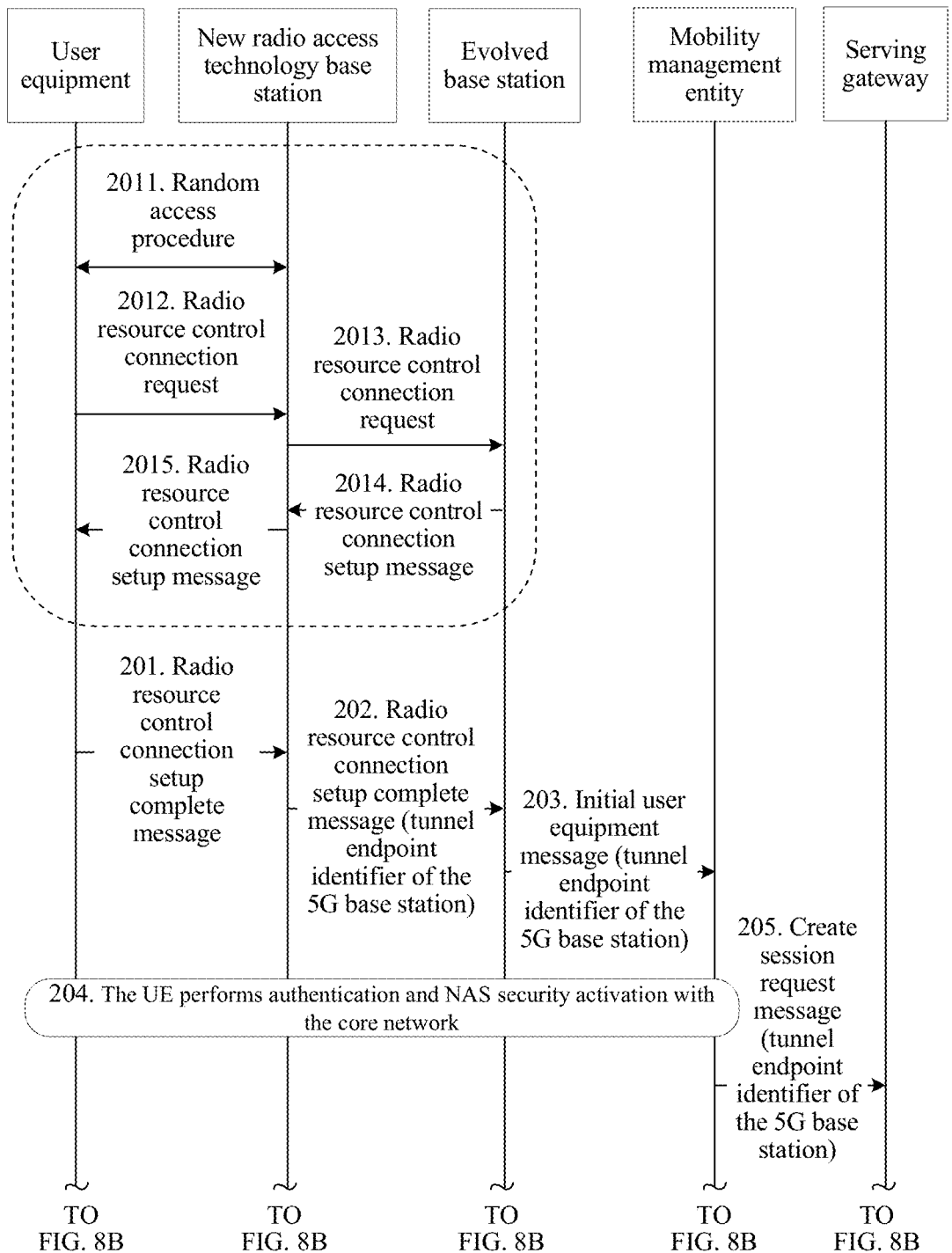
FIG. 8A and FIG. 8B are a schematic flowchart for setting up a default bearer according to an embodiment of the present disclosure.
Figure 8B:
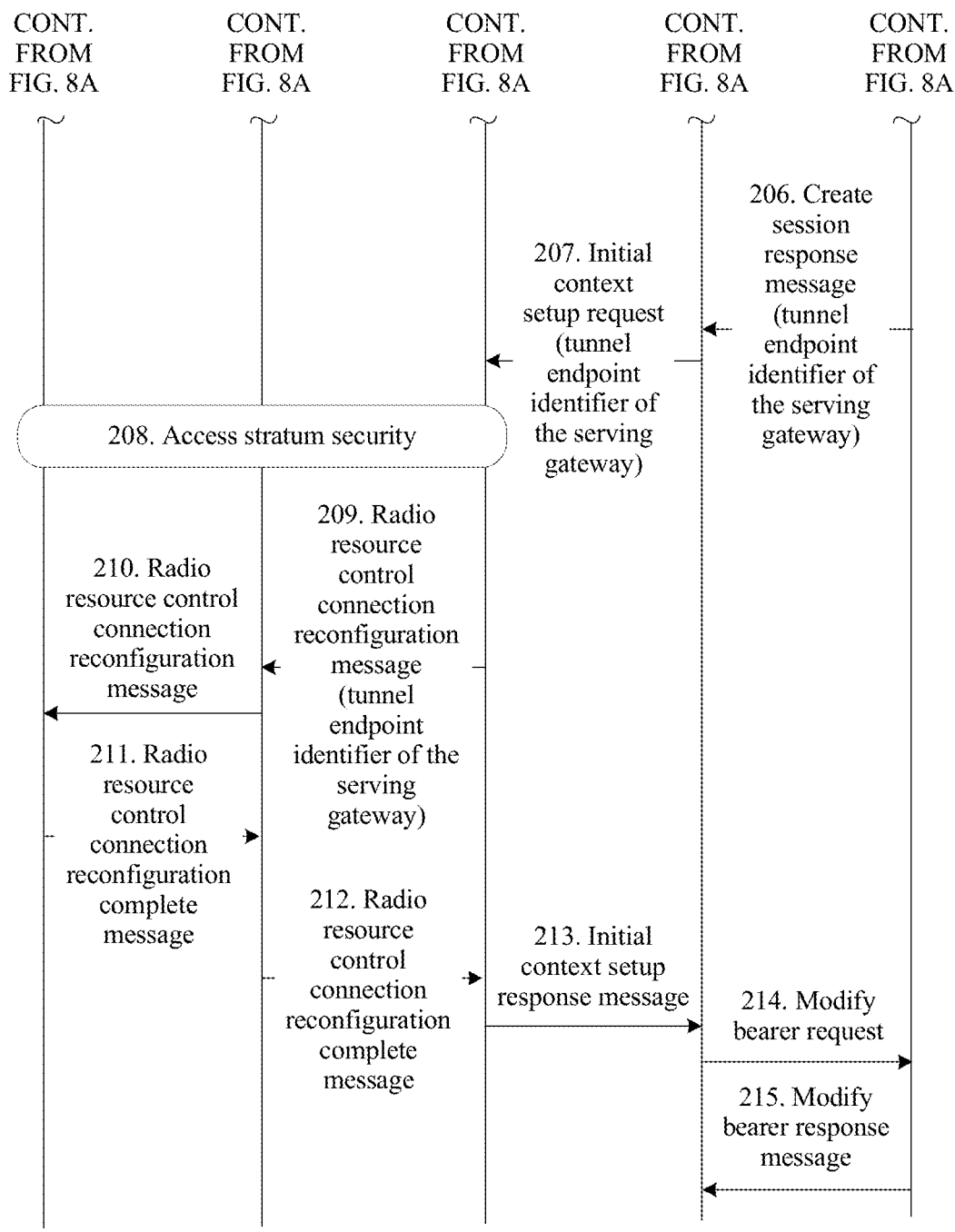

For ease of understanding, the following describes in detail a bearer setup method in the present disclosure by using a flowchart. FIG. 8A and FIG. 8B are a schematic flowchart for setting up a first bearer according to an embodiment of the present disclosure.

Operation 201: UE initiates an attach request to a 5G base station, and accesses an LTE core network via an LTE eNB. Optionally, before operation 201, a random access process further needs to be performed, specifically as described in operation 2011 to operation 2015.

Operation 2011: The UE initiates a random access procedure (Random Access Procedure) to the NR BS. This includes that: The UE randomly selects a preamble (preamble), and sends the preamble on a physical random access channel (Physical Random Access Channel, PRACH) to the NR BS. After detecting that the preamble is sent, the NR BS feeds back a random access response to the UE.

Operation 2012: The UE sends an uplink message on an allocated uplink resource based on an indication of the random access response, where the uplink message is encapsulated in an RRC connection request (RRC connection request) message, and the RRC connection request message herein is in an LTE format, for recognition by the LTE eNB. This is because the UE accesses the LTE core network from the NR BS via the LTE eNB. Therefore, the RRC connection request message created by the NR BS needs to be in the LTE format, so that the eNB can recognize the message.

Operation 2013: The UE sends the RRC connection request message in the LTE format to the LTE eNB via the NR BS. Specifically, the RRC connection request message may be carried in a third message of a random access channel (Random Access Channel, RACH), and it is assumed that an X5 interface between the NR BS and the LTE eNB is previously set up.

It should be noted that, the X5 interface is merely an example, and in an actual application, may be another name defined for the interface. A main function of the interface is to connect the NR BS to the LTE eNB.

Operation 2014: After receiving the RRC connection request message, the LTE eNB sends an RRC connection setup message to the NR BS, where the RRC connection setup message is also in the LTE format.

Operation 2015: The NR BS forwards the RRC connection setup message to the UE.

Therefore, the random access process is completed from operation 2011 to operation 2015. That UE initiates an attach request to an NR BS in operation 201 is specifically as follows:

Operation 201: The UE sends an RRC connection setup complete message to the LTE eNB via the NR BS, where the attach request message is carried in the RRC connection setup complete message.

Operation 202: After receiving the RRC connection setup complete message, the NR BS forwards the RRC connection setup complete message to the LTE eNB, where the RRC connection setup complete message carries a tunnel endpoint (Tunnel Endpoint, TE) allocated by the NR BS, the TE includes a TEID of the NR BS and a transport layer address (Transport Layer Address, TLA) of the NR BS, and the TE is used to indicate a destination of data transmitted in a downlink data transmission path.

Operation 203: The LTE eNB receives the RRC connection setup complete message in the LTE format sent by the UE, where the RRC connection setup complete message still includes the attach request. The LTE eNB sends an initial UE message including the attach request to an MME, where the initial UE message also carries the TEID of the NR BS that is allocated by the NR BS to a first bearer and the transport layer address of the NR BS.

Operation 204: The UE performs authentication and NAS security activation with the core network. NAS security is to perform encryption and integrity protection on NAS data, and is implemented at a NAS stratum of the MME and a NAS stratum of the UE.

Operation 205: After authentication and NAS security activation are completed, the MME creates a session with an SGW; the MME sends a create session request message to the SGW, where the create session request message carries a TEID of the NR BS, that is, carries the TEID allocated by the NR BS to the first bearer and the transport layer address of the NR BS; and the SGW stores an S1-U address of the NR BS and the TEID in a context of the UE, which means that a downlink bearer of an S1-U interface is created.

Operation 206: The SGW returns a create session response message to the MME, where the message carries a TE allocated by the SGW, the TE allocated by the SGW includes a TEID of the SGW and a transport layer address of the SGW, and the TE allocated by the SGW is used to indicate a destination of data transmitted in an uplink data transmission path.

Operation 207: The MME returns an attach accept (attach accept) message to the LTE eNB, requesting to set up a radio resource, where the attach accept message may be included in an S1-MME control message, that is, included in an initial context setup request, where the initial context setup request also still carries the TEID of the SGW and the transport layer address of the SGW.

Operation 208: LTE eNB activates AS security, where AS security is used for encryption and integrity protection on RRC data in AS data and encryption on UP data, and is implemented in peer PDCP layers of the eNB and the UE.

Operation 209: The LTE eNB sends an RRC connection reconfiguration message in the LTE format to the NR BS by using an interface between the LTE eNB and the NR BS. The RRC connection reconfiguration message still carries the TEID of the SGW and the transport layer address of the SGW. Therefore, the NR BS may perform an operation similar to the foregoing operation 205 to create an uplink bearer of the S1-U interface.

Operation 210: The NR BS forwards the RRC connection reconfiguration message in the LTE format to the UE, requesting the UE to configure an air interface resource, where the attach accept is also carried in the RRC connection reconfiguration message to the UE.

It should be noted that, the NR BS may reserve the TE allocated by the SGW in the RRC connection reconfiguration message, or may remove the TE allocated by the SGW from the RRC connection reconfiguration message. This is not limited herein.

Operation 211: The UE sends an RRC connection reconfiguration complete message to the NR BS, and in this case, the UE has completed configuration of the air interface resource.

Operation 212: The NR BS sends the RRC connection reconfiguration complete message to the LTE eNB.

Operation 213: After receiving the RRC connection reconfiguration complete message, the LTE eNB sends an initial context setup response message to the MME.

It should be noted that, the initial context setup response message may not carry a TE allocated by the LTE eNB and an S1-U address used for downlink transmission, or may carry a TE allocated by the LTE eNB and an S1-U address used for downlink transmission. This is not limited herein.

The TE allocated by the LTE eNB and the S1-U address used for downlink transmission are used for setting up a tunnel between the LTE eNB and the SGW in an attach procedure.

Operation 214: After receiving the initial context setup response message, the MME sends a modify bearer request (modify bearer request) to the SGW, so that the SGW modifies the first bearer based on the modify bearer request.

It should be noted that, the modify bearer request may not carry the TE allocated by the LTE eNB and the S1-U address used for downlink transmission, or may carry the TE allocated by the LTE eNB and the S1-U address used for downlink transmission. This is not limited herein.

Operation 215: After modifying the first bearer, the SGW feeds back a modify bearer response (modify bearer response) message to the MME.

Figure 9:
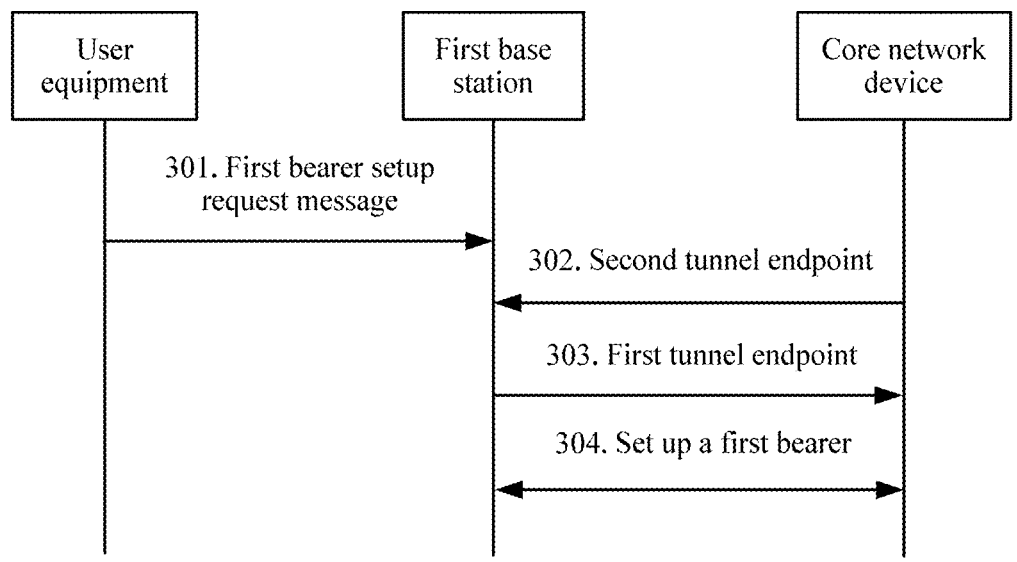
FIG. 9 is a schematic diagram of another embodiment of a bearer setup method according to an embodiment of the present disclosure.

Manner 2:

Referring to FIG. 9, another embodiment of a bearer setup method in an embodiment of the present disclosure includes the following operations.

Operation 301. A first base station receives a first bearer setup request message initiated by UE.

In this embodiment, the first base station is specifically an NR BS or an NR node. First, the UE initiates the first bearer setup request message to the first base station, where the first bearer setup request message is used to indicate that the first base station needs to set up a tunnel with an LTE core network, to implement data transmission between an NR BS and LTE eNB.

A first bearer is specifically a default bearer.

Specifically, the first bearer setup request message may be an attach request sent by the UE to the first base station, or may be a request sent independently of an attach request.

Operation 302. A core network device sends a second tunnel endpoint to the first base station, where the second tunnel endpoint includes a second TEID and a second transport layer address, the second tunnel endpoint is allocated by the core network device, and the second tunnel endpoint is used to indicate a destination of data transmitted in an uplink data transmission path of a first bearer.

In this embodiment, after receiving the first bearer setup request message initiated by the UE, the first base station sends a tunnel setup instruction to the core network device. Therefore, the core network device sends the second tunnel endpoint to the first base station, where the second tunnel endpoint includes the second TEID and the second transport layer address, the second tunnel endpoint is allocated by the core network device, and the second tunnel endpoint is used to indicate that the destination of the data transmitted in the uplink data transmission path of the first bearer is the first base station.

The core network device may be specifically an SGW and an MME; the second TEID may be specifically a TEID of the SGW in the core network device; and the second transport layer address is specifically a UP address of the SGW in the core network device.

After receiving the second TEID and the second transport layer address sent by the core network device, the first base station can know that the destination of the uplink data transmitted in the transmission path is the SGW in the core network device. Therefore, the first base station sets up an uplink bearer of the first bearer with the core network device.

Operation 303. The first base station sends a first tunnel endpoint to the core network device, where the first tunnel endpoint includes a first TEID and a first transport layer address, the first tunnel endpoint is allocated by the first base station, and the first tunnel endpoint is used to indicate a destination of data transmitted in a downlink data transmission path of the first bearer.

In this embodiment, after the first base station sets up the uplink bearer of the first bearer with the core network device, the first base station sends the first tunnel endpoint to the core network device, where the first tunnel endpoint includes the first TEID and the first transport layer address, the first tunnel endpoint is allocated by the first base station, and the first tunnel endpoint is used to indicate that the destination of the data transmitted in the downlink data transmission path of the first bearer is the core network device.

After receiving the first tunnel endpoint, the core network device obtains, by parsing the first tunnel endpoint, the first TEID and the first transport layer address carried in the first tunnel endpoint, and then sets up a downlink bearer of the first bearer with the first base station by using the first TEID and the first transport layer address.

Operation 304. The first base station completes setup of the first bearer with the core network device.

In this embodiment, after the uplink bearer and the downlink bearer of the first bearer are set up between the first base station and the core network device, setup of the first bearer is completed.

In the technical solution provided in this embodiment of the present disclosure, a bearer setup method is provided. To be specific, the first base station receives the first bearer setup request message initiated by the UE; then the core network device sends the second tunnel endpoint to the first base station, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; then the first base station sends the first tunnel endpoint to the core network device, where the first tunnel endpoint includes the first TEID and the first transport layer address, the first tunnel endpoint is allocated by the first base station, and the first tunnel endpoint is used to indicate the destination of the data transmitted in the downlink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

Optionally, on a basis of the embodiment corresponding to FIG. 9, in a first optional embodiment of the bearer setup method provided in this embodiment of the present disclosure, that a core network device sends a second tunnel endpoint to the first base station may include:

the core network device sends an initial context setup request to a second base station, where the initial context setup request is used to instruct the second base station to send a first RRC connection reconfiguration message to the first base station; and the first base station receives the first RRC connection reconfiguration message sent by the second base station, where the first RRC connection reconfiguration message is sent after the second base station receives the initial context setup request sent by the core network device, where the initial context setup request carries the second tunnel endpoint, and the second tunnel endpoint is transmitted to the first base station by using the first RRC connection reconfiguration message.

In this embodiment, after receiving a create session request sent by the MME in the core network device, the SGW in the core network device may create a communication session with the MME and return a create session response to the MME. In this case, the create session response message carries the second tunnel endpoint, that is, carries the second TEID and the second transport layer address.

After receiving the create session response message, the MME returns an attach accept response to the second base station, and requests to set up a radio resource. The request is included in an S1-MME control message, that is, in the initial context setup request. The initial context setup request still carries the second TEID and the second transport layer address. Then AS security activation is performed.

After AS security activation, the second base station sends the first RRC connection reconfiguration message to the first base station, where the first RRC connection reconfiguration message still carries the second TEID and the second transport layer address, so that the first base station obtains the second TEID and the second transport layer address of the core network device. In this way, the first base station stores an S1-U address (that is, the second transport layer address) and the TEID (that is, the second TEID) of the SGW in a context of the UE. Therefore, the first base station creates an uplink bearer of an S1-U interface.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, in this embodiment of the present disclosure, the core network device sends the initial context setup request to the second base station, where the initial context setup request is used to instruct the second base station to send the first RRC connection reconfiguration message to the first base station, and the core network device transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

Optionally, on a basis of FIG. 9 or the first embodiment corresponding to FIG. 9, in a second optional embodiment of the bearer setup method provided in this embodiment of the present disclosure, that the first base station sends a first tunnel endpoint to the core network device may include:

the first base station sends a first RRC connection reconfiguration complete message to the second base station, where the first RRC connection reconfiguration complete message is used to instruct the second base station to send an initial context setup response message to the core network device; and the core network device receives the initial context setup response message sent by the second base station, where the initial context setup response message is sent after the second base station receives the first RRC connection reconfiguration complete message sent by the first base station, and the first RRC connection reconfiguration complete message is used to indicate that the UE has completed configuration of an air interface resource, where the first RRC connection reconfiguration complete message carries the first tunnel endpoint, and the first tunnel endpoint is transmitted to the core network device by using the initial context setup response message.

In this embodiment, the first base station sends the first RRC connection reconfiguration complete message to the second base station by using an X5-C interface, where the first RRC connection reconfiguration complete message carries the first tunnel endpoint, that is, carries the first TEID and the first transport layer address.

After receiving the first RRC connection reconfiguration complete message, the second base station extracts the first TEID and the first transport layer address, adds the first TEID and the first transport layer address to the initial context setup response message, and then sends the initial context setup response message including the first TEID and the first transport layer address to the core network device.

In one embodiment, the second base station may send the initial context setup response message including the first TEID and the first transport layer address to the MEE. After receiving the initial context setup response message, the MME sends a modify bearer request to the SGW, where the modify bearer request still carries the first TEID and the first transport layer address. The SGW sets up a downlink bearer with the first base station based on the first TEID and the first transport layer address. Specifically, the context of the UE stores an S1-U address (that is, the first transport layer address) and the TEID (that is, the first TEID) of the first base station. Therefore, a downlink bearer of the S1-U interface is created.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, the core network device sends the initial context setup request to the second base station, where the initial context setup request is used to instruct the second base station to send the first RRC connection reconfiguration message to the first base station, and the core network device transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

In addition, in this embodiment of the present disclosure, the first base station needs to transmit the first TEID and the first transport layer address to the core network device by using the first RRC connection reconfiguration complete message and the initial context setup response message. In the foregoing manner, the first tunnel endpoint may be transmitted to set up the downlink bearer of the first bearer between the first base station and the core network device, so that feasibility of the solution is enhanced.

Optionally, on a basis of the second embodiment corresponding to FIG. 9, in a third optional embodiment of the bearer setup method provided in this embodiment of the present disclosure, before the first base station sends the first RRC connection reconfiguration complete message to the second base station, the method may further include:

the first base station sends the first RRC connection reconfiguration message to the UE, where the first RRC connection reconfiguration message is used to request the UE to configure the air interface resource; and the first base station receives the first RRC connection reconfiguration complete message sent by the UE, where the first RRC connection reconfiguration complete message is used to indicate that the UE has completed configuration of the air interface resource.

In this embodiment, before the first base station sends the first RRC connection reconfiguration complete message to the second base station, to set up the first bearer, the UE further needs to allocate the air interface resource.

Specifically, the first base station forwards the first RRC connection reconfiguration message in an LTE format to the UE, to request the UE to configure the air interface resource, where the attach accept response is also sent to the UE by using the first RRC connection reconfiguration message.

It should be noted that, the first RRC connection reconfiguration message sent by the first base station to the UE may carry the second tunnel endpoint, or may not carry the second tunnel endpoint. This is not limited herein.

The UE allocates the air interface resource based on the first RRC connection reconfiguration message, and returns the first RRC connection reconfiguration complete message to the first base station after configuration of the air interface resource is completed. The air interface resource is a high-frequency resource used for transmission between the UE and the base station. The UE allocates the air interface resource based on a service requirement. After receiving the first RRC connection reconfiguration complete message sent by the UE, the first base station may determine that the UE has completed configuration of the air interface resource.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, the core network device sends the initial context setup request to the second base station, where the initial context setup request is used to instruct the second base station to send the first RRC connection reconfiguration message to the first base station, and the core network device transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

In addition, the first base station needs to transmit the first TEID and the first transport layer address to the core network device by using the first RRC connection reconfiguration complete message and the initial context setup response message. In the foregoing manner, the first tunnel endpoint may be transmitted to set up the downlink bearer of the first bearer between the first base station and the core network device, so that feasibility of the solution is enhanced.

Further, in this embodiment of the present disclosure, after setting up the downlink bearer with the core network device, the first base station may send the first RRC connection reconfiguration message to the UE, to request configuration of the air interface resource. Therefore, the air interface resource can be provided properly when the uplink data is transmitted, and practical applicability of the solution is enhanced.

Optionally, on a basis of the embodiment corresponding to FIG. 9, in a fourth optional embodiment of the bearer setup method provided in this embodiment of the present disclosure, before the core network device completes setup of the first bearer with the first base station, the method may further include:

the core network device modifies the first bearer.

In this embodiment, after receiving the modify bearer request sent by the MME in the core network device, the SGW in the core network device may modify the first bearer between the first base station and the core network device based on the modify bearer request; and after the first bearer is modified successfully, the SGW sends a modify bearer response message to the MME.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, in this embodiment of the present disclosure, the core network device may further modify the first bearer before completing setup of the first bearer with the first base station. This ensures that the first bearer has been modified, and therefore enhances feasibility and practical applicability of the solution.

Figure 10A:
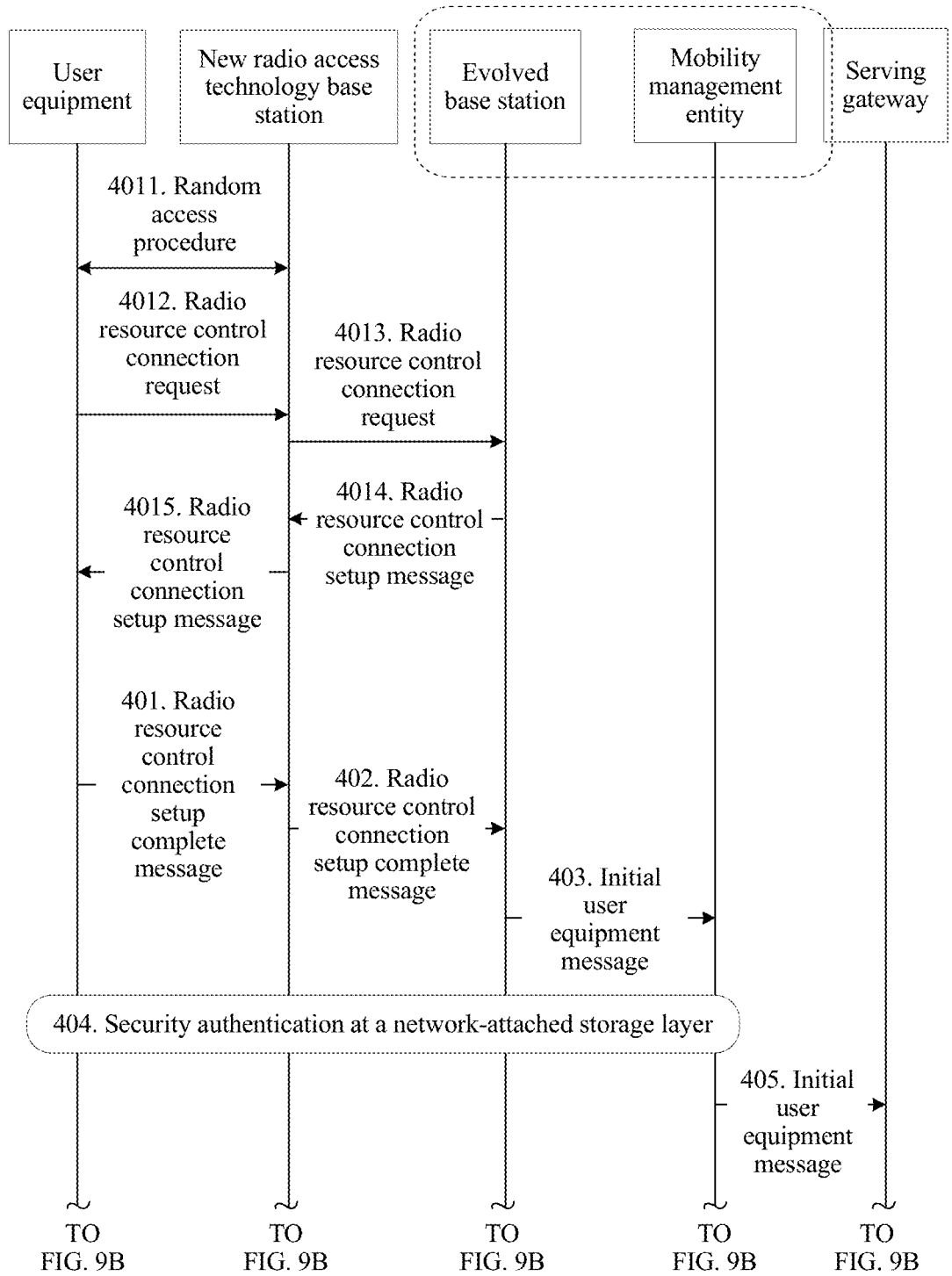
FIG. 10A and FIG. 10B are another schematic flowchart for setting up a default bearer according to an embodiment of the present disclosure.
Figure 10B:
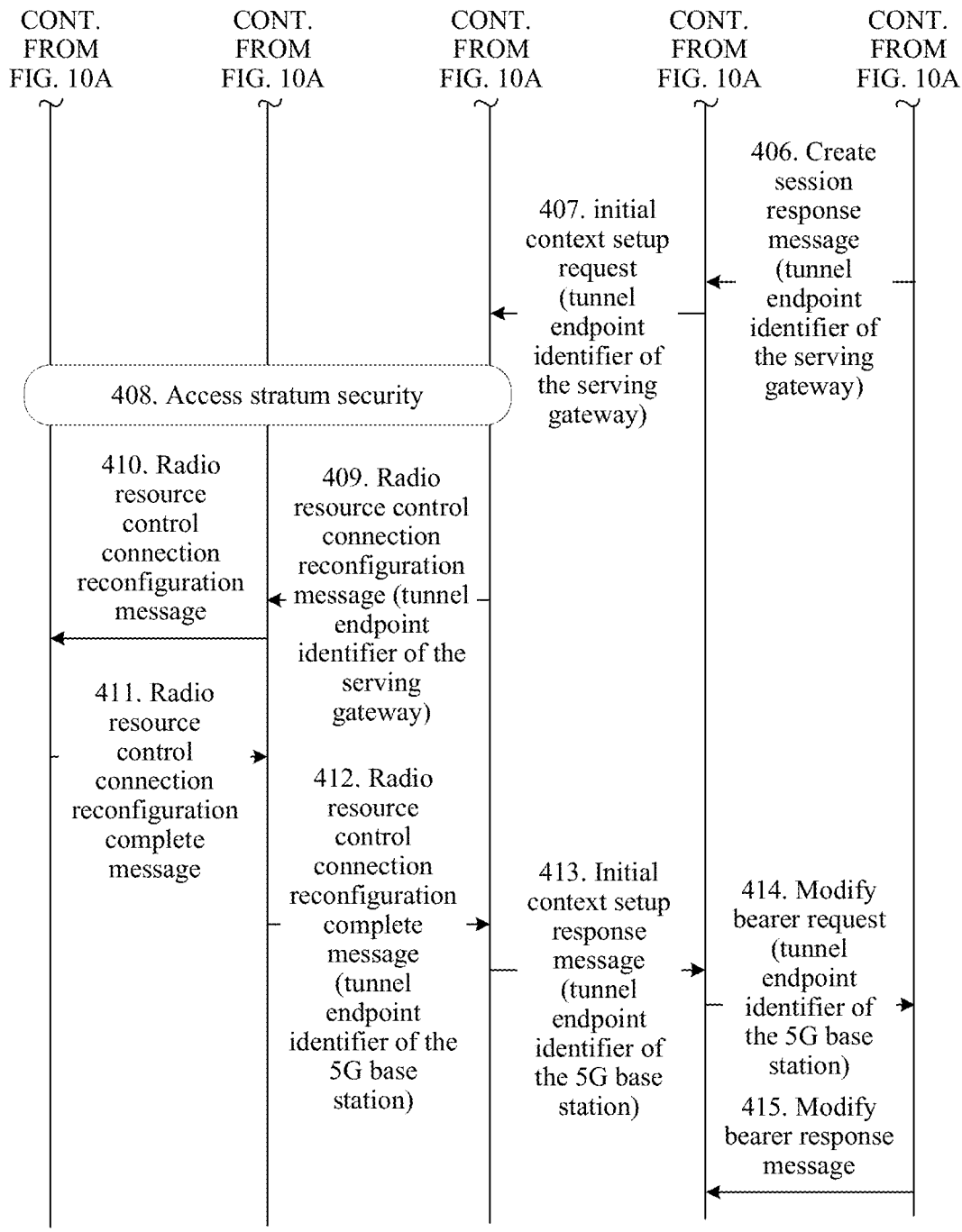

For ease of understanding, the following describes in detail a bearer setup method in the present disclosure by using a flowchart. FIG. 10A and FIG. 10B are a schematic flowchart for setting up a first bearer according to an embodiment of the present disclosure.

Operation 401: UE initiates an attach request to a 5G base station, and accesses an LTE core network via an LTE eNB. Optionally, before operation 401, a random access process further needs to be performed, specifically as described in operation 4011 to operation 4015.

Operation 4011: The UE initiates a random access procedure to the NR BS. This includes: the UE randomly selects a preamble, and sends the preamble on a PRACH to the NR BS. After detecting that the preamble is sent, the NR BS feeds back a random access response to the UE.

Operation 4012: The UE sends an uplink message on an allocated uplink resource based on an indication of the random access response, where the uplink message is encapsulated in an RRC connection request message, and the RRC connection request message herein is in an LTE format, for recognition by the LTE eNB.

This is because the UE accesses the LTE core network from the NR BS via the LTE eNB. Therefore, the RRC connection request message created by the NR BS needs to be in the LTE format, so that the eNB can recognize the message.

Operation 4013: The UE sends the RRC connection request message in the LTE format to the LTE eNB via the NR BS. Specifically, the RRC connection request message may be carried in a third message of a RACH, and it is assumed that an X5 interface between the NR BS and the LTE eNB is previously set up.

It should be noted that, the X5 interface is merely an example, and in an actual application, may be another name defined for the interface. A main function of the interface is to connect the NR BS to the LTE eNB.

Operation 4014: After receiving the RRC connection request message, the LTE eNB sends an RRC connection setup message to the NR BS, where the RRC connection setup message is also in the LTE format.

Operation 4015: The NR BS forwards the RRC connection setup message to the UE.

Therefore, the random access process is completed from operation 4011 to operation 4015. That UE initiates an attach request to an NR BS in operation 401 is specifically as follows:

Operation 401: The UE sends an RRC connection setup complete message to the LTE eNB via the NR BS, where the attach request message is carried in the RRC connection setup complete message.

Operation 402: After receiving the RRC connection setup complete message, the NR BS forwards the RRC connection setup complete message to the LTE eNB.

Operation 403: The LTE eNB receives the RRC connection setup complete message in the LTE format sent by the UE, where the RRC connection setup complete message still includes the attach request. The LTE eNB sends an initial UE message including the attach request to an MME.

Operation 404: The UE performs authentication and NAS security activation with a core network. NAS security activation is used for encryption and integrity protection on NAS data, and is implemented in peer NAS strata of the MME and the UE.

Operation 405: After authentication and NAS security activation are completed, the MME creates a session with an SGW; and the MME sends a create session request message to the SGW.

Operation 406: The SGW returns a create session response message to the MME, where the message carries a TE allocated by the SGW, the TE allocated by the SGW includes a TEID of the SGW and a transport layer address of the SGW, and the TE allocated by the SGW is used to indicate a destination of data transmitted in an uplink data transmission path.

Operation 407: The MME returns an attach accept message to the LTE eNB, requesting to set up a radio resource, where the attach accept message may be included in an S1-MME control message, that is, included in an initial context setup request and sent to the LTE eNB, where the initial context setup request also still carries the TEID of the SGW and the transport layer address of the SGW.

Operation 408: LTE eNB activates AS security, where AS security is used for encryption and integrity protection on RRC data in AS data and encryption on UP data, and is implemented in peer PDCP layers of the eNB and the UE.

Operation 409: The LTE eNB sends an RRC connection reconfiguration message in the LTE format to the NR BS by using an interface between the LTE eNB and the NR BS. The RRC connection reconfiguration message still carries the TEID of the SGW and the transport layer address of the SGW, so that an uplink bearer of an S1-U interface is created.

Operation 410: The NR BS forwards the RRC connection reconfiguration message in the LTE format to the UE, requesting the UE to configure an air interface resource, where the attach accept is also carried in the RRC connection reconfiguration message to the UE.

It should be noted that, the NR BS may reserve the TE allocated by the SGW in the RRC connection reconfiguration message, or may remove the TE allocated by the SGW from the RRC connection reconfiguration message. This is not limited herein.

Operation 411: The UE sends an RRC connection reconfiguration complete message to the NR BS, and in this case, the UE has completed configuration of the air interface resource.

Operation 412: The NR BS sends the RRC connection reconfiguration complete message to the LTE eNB, where the RRC connection reconfiguration complete message carries a TE allocated by the NR BS, the TE includes a TEID of the NR BS and a transport layer address of the NR BS, and the TE is used to indicate a destination of data transmitted in a downlink data transmission path.

Operation 413: After receiving the RRC connection reconfiguration complete message, the LTE eNB sends an initial context setup response message to the MME. The initial context setup response message also carries the TEID of the NR BS that is allocated by the NR BS and the transport layer address of the NR BS.

Operation 414: After receiving the initial context setup response message, the MME sends a modify bearer request to the SGW, so that the SGW modifies a first bearer based on the modify bearer request, where the modify bearer request carries the TEID of the NR BS and the transport layer address of the NR BS, so that a downlink bearer of the S1-U interface is created.

Operation 415: After modifying the first bearer, the SGW feeds back a modify bearer response message to the MME.

In both of the two bearer setup methods described above, the first bearer, that is, the default bearer, can be set up after a tunnel is set up. The default bearer may be understood as a bearer providing an Internet Protocol (Internet Protocol, IP) connection, and is set up when a public data network (Public Data Network, PDN) connection is set up, and is destroyed when the PDN connection is torn down. After the tunnel is set up, when the UE is powered on and attached to the network, a default bearer at a fixed data rate is set up for the UE. This ensures a basic service requirement of the UE, improves user experience, reduces a latency in service setup, and enables the UE to be "always online".

However, if the default bearer cannot provide required quality of service (Quality of Service, QoS), that is, an additional bearer is required, then a dedicated bearer needs to be set up to provide a service. The dedicated bearer is definitely set up on a basis of setup of the default bearer. In other words, the dedicated bearer is set up on a basis of setup of a PDN connection, and is also set up to meet a specific QoS requirement. In a PDN connection, only one default bearer exists, but a plurality of dedicated bearers may exist. An amount of data transmitted on the dedicated bearer is greater than an amount of data transmitted on the default bearer.

The following describes how to set up a tunnel between a 5G base station and an LTE core network in a process of setting up a dedicated bearer after setup of a default bearer is completed.

Optionally, on a basis of FIG. 7 and any one of the first to the fourth embodiments corresponding to FIG. 7, or on a basis of FIG. 9 and any one of the first to the fourth embodiments corresponding to FIG. 9, in a fifth optional embodiment of the bearer setup method provided in this embodiment of the present disclosure, after the first base station completes setup of the first bearer with the core network device, the method may further include:

the core network device sends a third tunnel endpoint to the first base station, where the third tunnel endpoint includes a third TEID and a third transport layer address, the third tunnel endpoint is allocated by the core network device, and the third tunnel endpoint is used to indicate a destination of data transmitted in an uplink data transmission path of a second bearer;

the first base station sends a fourth tunnel endpoint to the core network device, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and the first base station completes setup of the second bearer with the core network device.

In this embodiment, after the first base station completes setup of the first bearer with the core network device, the core network device sends the third tunnel endpoint to the first base station, where the third tunnel endpoint includes the third TEID and the third transport layer address, the third tunnel endpoint is allocated by the core network device, the third tunnel endpoint is used to indicate the destination of the data transmitted in the uplink data transmission path of the second bearer, the third TEID may be specifically a TEID of the SGW, and the third transport layer address is a UP address of the SGW. It may be determined, by using the third tunnel endpoint, that a receiver of the transmitted uplink data is the first base station. The second bearer is a dedicated bearer.

Therefore, after receiving the third TEID and the third transport layer address, the first base station sets up an uplink bearer of the second bearer with the SGW based on the third TEID and the third transport layer address, which means that an uplink bearer of an S1-U interface is created.

After the first base station completes setup of the uplink bearer of the second bearer with the SGW, the first base station sends the fourth tunnel endpoint to the core network device, where the fourth tunnel endpoint includes the fourth TEID and the fourth transport layer address, the fourth tunnel endpoint is allocated by the first base station, the fourth tunnel endpoint is used to indicate the destination of the data transmitted in the downlink data transmission path of the second bearer, and the fourth TEID is specifically a TEID of the first base station. The fourth tunnel endpoint is used to indicate that a receiver of the downlink data transmitted on the second bearer is the first base station.

Finally, the core network device sets up a downlink bearer of the second bearer with the first base station based on the received fourth TEID and fourth transport layer address. Up to now, setup of the uplink bearer and the downlink bearer of the second bearer is completed. Therefore, the uplink data and the downlink data can be transmitted on the second bearer.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, in this embodiment of the present disclosure, the second bearer between the first base station and the core network device may be further set up provided that the first bearer is set up. Likewise, in the process of setting up the second bearer, there is no need to first connect to a 4G base station via an NR BS by using a new interface X5 and then connect to a 4G core network via the 4G base station. Therefore, a latency caused by the new interface X5 is shortened, and bandwidth of the new interface X5 is saved.

Optionally, on a basis of the fifth embodiment corresponding to FIG. 7, or on a basis of the fifth embodiment corresponding to FIG. 9, that the core network device sends a third tunnel endpoint to the first base station may include:

the first base station receives a second RRC connection reconfiguration message sent by the second base station, where the second RRC connection reconfiguration message is sent after the second base station receives an eRAB setup request sent by the core network device; and the core network device sends the eRAB setup request to the second base station, where the eRAB setup request is used to instruct the second base station to send the second RRC connection reconfiguration message to the first base station, where the eRAB setup request carries the third tunnel endpoint, and the third tunnel endpoint is transmitted to the first base station by using the second RRC connection reconfiguration message.

In this embodiment, after setup of the first bearer is completed, the first base station receives the third tunnel endpoint sent by the core network device. A specific process is as follows:

First, the SGW in the core network device sends a create bearer request (create bearer request) to the MME in the core network device, where the create bearer request carries the third tunnel endpoint, that is, carries the TEID of the SGW and the UP address of the SGW.

After receiving the create bearer request, the MME initiates a second bearer setup process, requesting the second base station to allocate a radio resource to the second bearer. Therefore, the MME sends the evolved radio access bearer setup request (Evolved Radio Access Bearer setup request, eRAB setup request) to the second base station, where the eRAB setup request also still carries the third tunnel endpoint.

The second base station generates the second RRC connection reconfiguration message, and transmits the second RRC connection reconfiguration message to the first base station by using the X5 interface, where the second RRC connection reconfiguration message still carries the third tunnel endpoint allocated by the SGW. After receiving the second RRC connection reconfiguration message, the first base station sets up the uplink bearer of the S1-U interface.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, the second bearer between the first base station and the core network device may be further set up provided that the first bearer is set up. Likewise, in the process of setting up the second bearer, there is no need to first connect to a 4G base station via an NR BS by using a new interface X5 and then connect to a 4G core network via the 4G base station. Therefore, a latency caused by the new interface X5 is shortened, and bandwidth of the new interface X5 is saved.

In addition, in this embodiment of the present disclosure, the core network device needs to transmit the third TEID and the third transport layer address to the first base station by using the eRAB setup request and the second RRC connection reconfiguration message. In the foregoing manner, the third tunnel endpoint may be transmitted to set up an uplink bearer between the first base station and the core network device, so that feasibility of the solution is enhanced.

Optionally, on a basis of the fifth or the sixth embodiment corresponding to FIG. 7, or on a basis of the fifth or the sixth embodiment corresponding to FIG. 9, that the first base station sends a fourth tunnel endpoint to the core network device may include:

the first base station sends a second RRC connection reconfiguration complete message to the second base station, where the second RRC connection reconfiguration complete message is used to instruct the second base station to send an eRAB setup response message to the core network device; and the core network device receives the eRAB setup response message sent by the second base station, where the eRAB setup response message is sent to the core network device after the second base station receives the second RRC connection reconfiguration complete message sent by the first base station, and the second RRC connection reconfiguration complete message is used to indicate that the UE has completed configuration of an air interface resource, where the second RRC connection reconfiguration complete message carries the fourth tunnel endpoint, and the fourth tunnel endpoint is transmitted to the core network device by using the eRAB setup response message.

In this embodiment, after the first base station sets up an uplink tunnel of the second bearer with the SGW, the first base station sends the fourth tunnel endpoint of the second bearer to the SGW. A specific process is as follows:

First, the first base station sends the second RRC connection reconfiguration complete message to the second base station, where the second RRC connection reconfiguration complete message carries the fourth tunnel endpoint, that is, carries the TEID of the first base station and a UP address of the first base station.

After receiving the second RRC connection reconfiguration complete message, the second base station returns a bearer setup result to the core network device by using the eRAB setup response (eRAB setup response) message, where the eRAB setup response message still carries the fourth tunnel endpoint.

Specifically, after receiving the eRAB setup response message, the MME in the core network device sends bearer related information to the SGW in the core network device by using a create bearer response (create bearer response) message, where the create bearer response message includes the fourth tunnel endpoint of the second carrier. After this operation is completed, the SGW stores the S1-U address and the TEID of the first base station in the context of the UE, which means that the downlink bearer of the S1-U interface is created.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, the second bearer between the first base station and the core network device may be further set up provided that the first bearer is set up. Likewise, in the process of setting up the second bearer, there is no need to first connect to a 4G base station via an NR BS by using a new interface X5 and then connect to a 4G core network via the 4G base station. Therefore, a latency caused by the new interface X5 is shortened, and bandwidth of the new interface X5 is saved.

In addition, the core network device needs to transmit the third TEID and the third transport layer address to the first base station by using the eRAB setup request and the second RRC connection reconfiguration message. In the foregoing manner, the third tunnel endpoint may be transmitted to set up an uplink bearer between the first base station and the core network device, so that feasibility of the solution is enhanced.

Further, in this embodiment of the present disclosure, the first base station needs to transmit the fourth TEID and the fourth transport layer address to the core network device by using the second RRC connection reconfiguration complete message and the eRAB setup response message. In the foregoing manner, the fourth tunnel endpoint may be transmitted to set up the downlink bearer of the second bearer between the first base station and the core network device, so that feasibility of the solution is enhanced.

Optionally, on a basis of the sixth or the seventh embodiment corresponding to FIG. 7, or on a basis of the sixth or the seventh embodiment corresponding to FIG. 9, after the first base station receives the second RRC connection reconfiguration message sent by the second base station, the method may further include the following operations:

the first base station sends the second RRC connection reconfiguration message to the UE, where the second RRC connection reconfiguration message is used to request the UE to configure the air interface resource; and the first base station receives the second RRC connection reconfiguration complete message sent by the UE, where the second RRC connection reconfiguration complete message is used to indicate that the UE has completed configuration of the air interface resource.

In this embodiment, after the first base station receives the second RRC connection reconfiguration message sent by the second base station, to set up the second bearer, the UE further needs to allocate the air interface resource.

Specifically, the first base station forwards the second RRC connection reconfiguration message in the LTE format to the UE, to request the UE to configure the air interface resource. It should be noted that, the second RRC connection reconfiguration message sent by the first base station to the UE may carry the third tunnel endpoint of the second bearer, or may not carry the third tunnel endpoint of the second bearer. This is not limited herein.

The UE allocates the air interface resource based on the second RRC connection reconfiguration message, and after configuration of the air interface resource is completed, returns the second RRC connection reconfiguration complete message to the first base station. The air interface resource is a high-frequency resource used for transmission between the UE and the base station. The UE allocates the air interface resource based on a service requirement. After receiving the second RRC connection reconfiguration complete message sent by the UE, the first base station may determine that the UE has completed configuration of the air interface resource.

In the technical solution provided in this embodiment of the present disclosure, a bearer setup method is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

In addition, the second bearer between the first base station and the core network device may be further set up provided that the first bearer is set up. Likewise, in the process of setting up the second bearer, there is no need to first connect to a 4G base station via an NR BS by using a new interface X5 and then connect to a 4G core network via the 4G base station. Therefore, a latency caused by the new interface X5 is shortened, and bandwidth of the new interface X5 is saved.

In addition, the core network device needs to transmit the third TEID and the third transport layer address to the first base station by using the eRAB setup request and the second RRC connection reconfiguration message. In the foregoing manner, the third tunnel endpoint may be transmitted to set up an uplink bearer between the first base station and the core network device, so that feasibility of the solution is enhanced.

Further, the first base station needs to transmit the fourth TEID and the fourth transport layer address to the core network device by using the second RRC connection reconfiguration complete message and the eRAB setup response message. In the foregoing manner, the fourth tunnel endpoint may be transmitted to set up the downlink bearer of the second bearer between the first base station and the core network device, so that feasibility of the solution is enhanced.

Still further, in this embodiment of the present disclosure, after setting up the uplink bearer of the second bearer with the core network device, the first base station may send the second RRC connection reconfiguration message to the UE, to request configuration of the air interface resource. Therefore, the air interface resource can be provided properly when the uplink data is transmitted, and practical applicability of the solution is enhanced.

Figure 11:
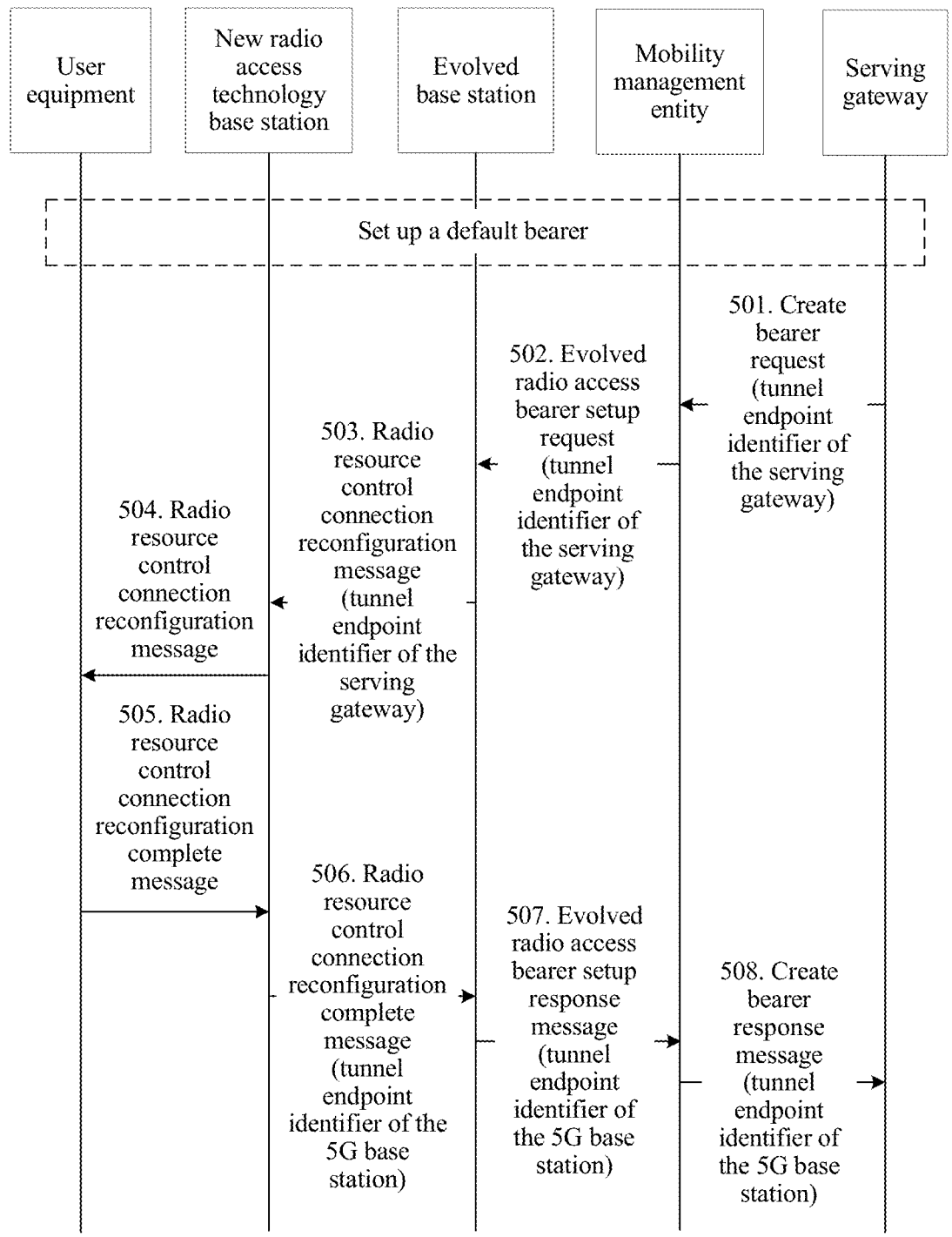
FIG. 11 is a schematic flowchart for setting up a dedicated bearer according to an embodiment of the present disclosure.

For ease of understanding, the following describes in detail a bearer setup method in the present disclosure by using a flowchart. FIG. 11 is a schematic flowchart for setting up a second bearer according to an embodiment of the present disclosure.

Operation 501: After a first bearer is set up successfully, a second bearer may be set up. An SGW sends a create bearer request message to an MME, where the create bearer request message carries a TE allocated by the SGW to the second bearer, the TE of the SGW includes a TEID of the SGW and a UP address of the SGW, and the TE of the SGW is used to indicate a destination of data transmitted in an uplink data transmission path.

Operation 502: After receiving the create bearer request message, the MME initiates a bearer setup process, requesting an eNB to allocate a radio resource to the second bearer; and the MME sends an eRAB setup request message to the eNB, where the eRAB setup request message carries the TE of the SGW, and the TE of the SGW is intended for the second bearer. Specifically, content included in the eRAB setup request message is shown in the following Table 1.

TABLE 1

| Group name | Presence |
|---|---|
| Message type | Mandatory |
| Identity of an application protocol of the MME and UE | Mandatory |
| Identity of an application protocol of the eNB and the UE | Mandatory |
| Aggregate maximum bit rate of the UE | Optional |
| Set an eRAB list | |
| Set an eRAB item | |
| Identity of an eRAB | Mandatory |
| Quality of service level parameter of the eRAB | Mandatory |
| Transport layer address | Mandatory |
| GTP-TEID | Mandatory |
| NAS-protocol data unit | Mandatory |
| Related identity | Optional |
| Identity related to IP data offloading | Optional |

Operation 503: The eNB generates an RRC connection reconfiguration message, and transmits the RRC connection reconfiguration message to a 5G base station by using an X5 interface, where the RRC connection reconfiguration message carries the TE allocated by the SGW. After receiving the message, the 5G base station creates an uplink tunnel of an S1-U interface.

Specifically, the RRC connection reconfiguration message includes a list of bearers to be set up, for example, an identity (identity, ID) of an eRAB, a TEID, and a transport layer address.

Operation 504: The 5G base station forwards the RRC connection reconfiguration message in an LTE format to UE, requesting the UE to configure an air interface resource. It should be noted that, the NR BS may remove the TE of the SGW from the RRC connection reconfiguration message before sending the message, or may reserve the TE of the SGW. This is not limited herein.

Operation 505: After completing the configuration, the UE sends an RRC connection reconfiguration complete message to the 5G base station.

Operation 506: The 5G base station sends the RRC connection reconfiguration complete message to the LTE eNB, where a TE allocated by the 5G base station to the second bearer is added to the RRC connection reconfiguration complete message, the TE allocated by the 5G base station includes a TEID and a UP address of the 5G base station, and the TE of the 5G base station is used to indicate a destination of data transmitted in a downlink data transmission path.

Specifically, the RRC connection reconfiguration complete message may also include a list of bearers that are set up successfully, where the list includes an eRAB ID, a TEID, and a transport layer address. In addition, the RRC connection reconfiguration complete message may further include a list of failed bearers, where the list includes an eRAB ID. The list is merely a representation form and is an example herein.

Operation 507: After receiving the RRC connection reconfiguration complete message, the LTE eNB returns a bearer setup result to the MME by using an eRAB setup response message, where the eRAB setup response message also carries the TE allocated by the 5G base station. Content included in specific information elements is shown in the following Table 2.

TABLE 2

| Group name | Presence |
| --- | --- |
| Message type | Mandatory |
| Identity of an application protocol of the MME and the UE | Mandatory |
| Identity of an application protocol of the eNB and the UE | Mandatory |
| Set an eRAB list | |
| Set an eRAB item | |
| Identity of an eRAB | Mandatory |
| Transport layer address | Mandatory |
| GTP-TEID | Mandatory |
| Set a list of failed eRABs | Optional |
| Critical diagnosis | Optional |

The TEID in Table 2 is the TEID allocated by the 5G base station.

Operation 508: After receiving the eRAB setup response message, the MME sends bearer related information to the SGW by using a create bearer response message, where the create bearer response message includes the TE allocated by the 5G base station. After operation 508 is completed, the SGW stores the S1-U address and the TEID of the 5G base station in a context of the UE, which means that a downlink tunnel of the S1-U is created.

Figure 12:
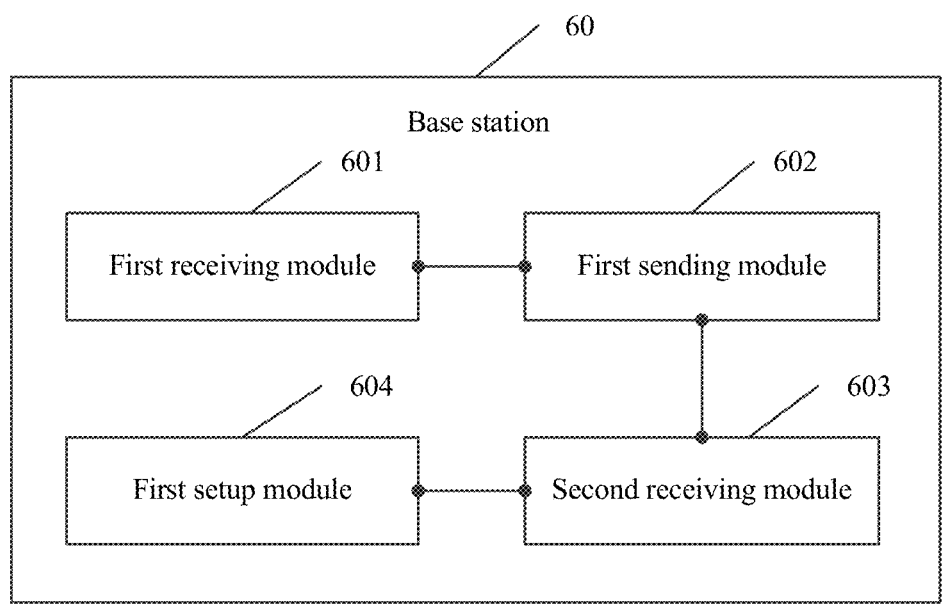
FIG. 12 is a schematic diagram of an embodiment of a base station according to an embodiment of the present disclosure.

The following describes a base station in the present disclosure in detail. Referring to FIG. 12, a base station in an embodiment of the present disclosure includes:

a first receiving module 601, configured to receive a first bearer setup request message initiated by user equipment (UE);

a first sending module 602, configured to send a first tunnel endpoint to a core network device based on the first bearer setup request message received by the first receiving module 601, where the first tunnel endpoint includes a first tunnel endpoint identifier (TEID) and a first transport layer address, the first tunnel endpoint is allocated by the first base station, and the first tunnel endpoint is used to indicate a destination of data transmitted in a downlink data transmission path of a first bearer;

a second receiving module 603, configured to receive a second tunnel endpoint sent by the core network device, where the second tunnel endpoint includes a second TEID and a second transport layer address, the second tunnel endpoint is allocated by the core network device, and the second tunnel endpoint is used to indicate a destination of data transmitted in an uplink data transmission path of the first bearer; and a first setup module 604, configured to complete setup of the first bearer with the core network device, for transmitting the uplink data and transmitting the downlink data.

In this embodiment, the first receiving module 601 receives the first bearer setup request message initiated by the UE; the first sending module 602 sends the first tunnel endpoint to the core network device based on the first bearer setup request message received by the first receiving module 601, where the first tunnel endpoint includes the first tunnel endpoint identifier (TEID) and the first transport layer address, the first tunnel endpoint is allocated by the first base station, and the first tunnel endpoint is used to indicate the destination of the data transmitted in the downlink data transmission path of the first bearer; the second receiving module 603 receives the second tunnel endpoint sent by the core network device, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; and the first setup module 604 completes setup of the first bearer with the core network device, for transmitting the uplink data and transmitting the downlink data.

In the technical solution provided in this embodiment of the present disclosure, a base station for setting up a bearer is provided. To be specific, the first base station receives the first bearer setup request message initiated by the UE; then the first base station sends the first tunnel endpoint to the core network device based on the first bearer setup request message, where the first tunnel endpoint includes the first tunnel endpoint identifier (TEID) and the first transport layer address, the first tunnel endpoint is allocated by the first base station, and the first tunnel endpoint is used to indicate the destination of the data transmitted in the downlink data transmission path of the first bearer; then the first base station receives the second tunnel endpoint sent by the core network device, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

Figure 13:
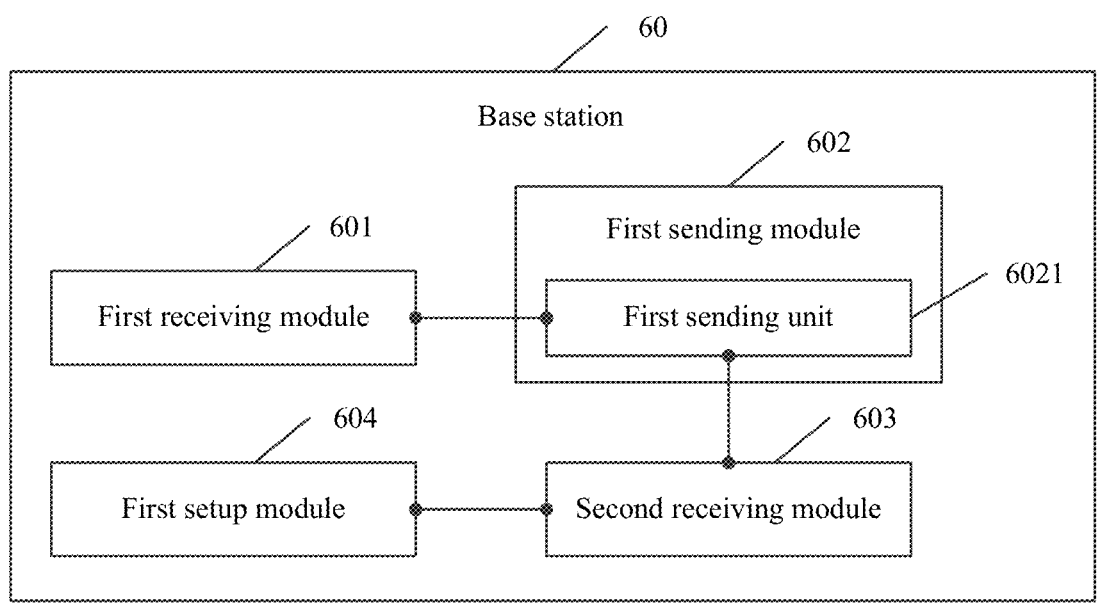
FIG. 13 is a schematic diagram of another embodiment of a base station according to an embodiment of the present disclosure.

Optionally, based on the embodiment corresponding to FIG. 12, referring to FIG. 13, in the base station in this embodiment of the present disclosure, the first sending module 602 includes:

a first sending unit 6021, configured to send a radio resource control (RRC) connection setup complete message to a second base station, where the RRC connection setup complete message is used to instruct the second base station to send an initial UE message to the core network device, where the RRC connection setup complete message and the initial UE message carry the first tunnel endpoint.

In addition, in this embodiment of the present disclosure, the first base station specifically transmits the first TEID and the first transport layer address to the core network device by using the RRC connection setup complete message and the initial UE message. In the foregoing manner, the first tunnel endpoint may be transmitted to set up a downlink bearer between the first base station and the core network device, so that feasibility of the solution is enhanced.

Figure 14:
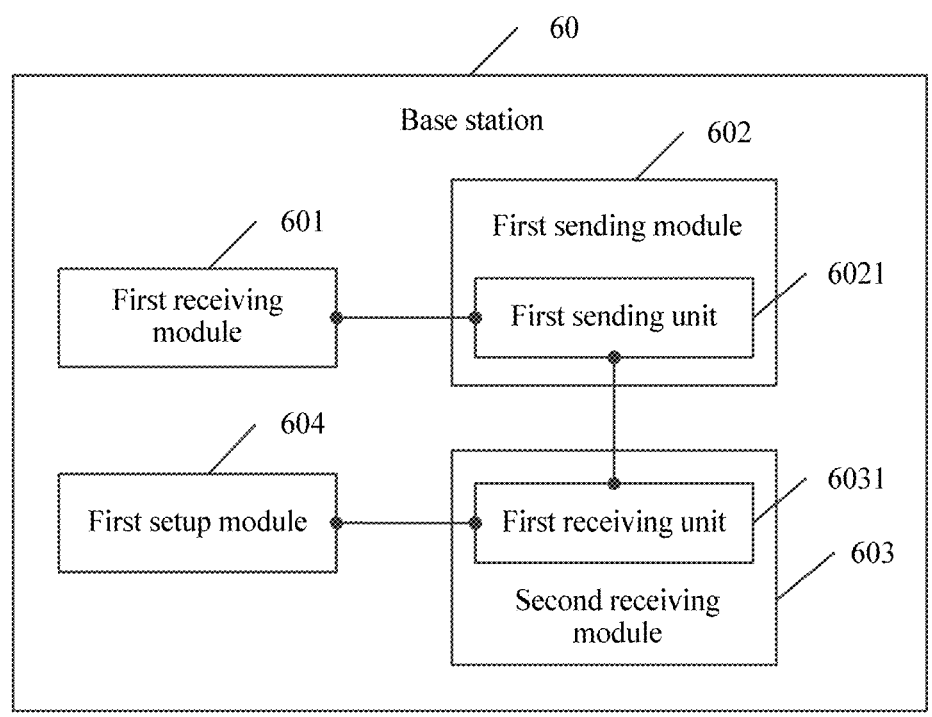
FIG. 14 is a schematic diagram of another embodiment of a base station according to an embodiment of the present disclosure.

Optionally, based on the embodiment corresponding to FIG. 12 or FIG. 13, referring to FIG. 14, in the base station in this embodiment of the present disclosure, the second receiving module 603 includes:

a first receiving unit 6031, configured to receive a first RRC connection reconfiguration message sent by the second base station, where the first RRC connection reconfiguration message is sent after the second base station receives an initial context setup request, and the initial context setup request is sent by the core network device to the second base station, where the initial context setup request and the first RRC connection reconfiguration message carry the second tunnel endpoint.

In addition, in this embodiment of the present disclosure, the core network device specifically transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

Figure 15:
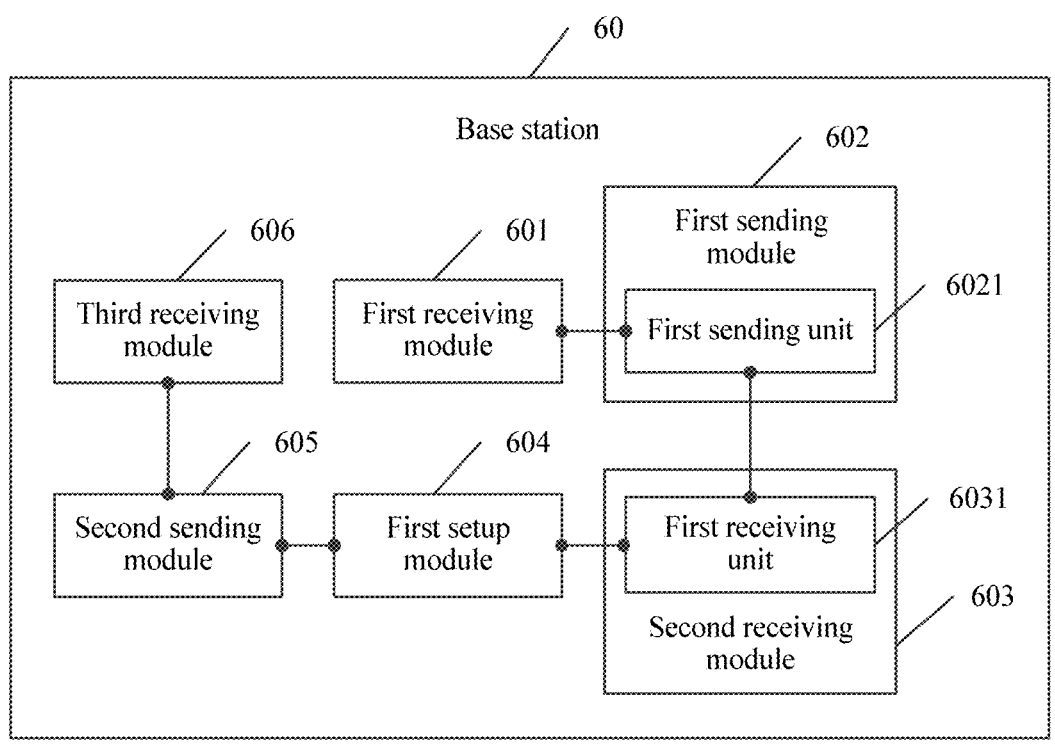
FIG. 15 is a schematic diagram of another embodiment of a base station according to an embodiment of the present disclosure.

Optionally, based on the embodiment corresponding to FIG. 14, referring to FIG. 15, the base station in this embodiment of the present disclosure may further include:

a second sending module 605, configured to send the first RRC connection reconfiguration message to the UE after the second receiving module 603 receives the second tunnel endpoint sent by the core network device, where the first RRC connection reconfiguration message is used to request the UE to configure an air interface resource; and a third receiving module 606, configured to receive a first RRC connection reconfiguration complete message sent by the UE, where the first RRC connection reconfiguration complete message is used to indicate that the UE has completed configuration of the air interface resource.

Further, in this embodiment of the present disclosure, after setting up the uplink bearer with the core network device, the first base station may send the first RRC connection reconfiguration message to the UE, to request configuration of the air interface resource. Therefore, the air interface resource can be provided properly when the uplink data is transmitted, and practical applicability of the solution is enhanced.

Figure 16:
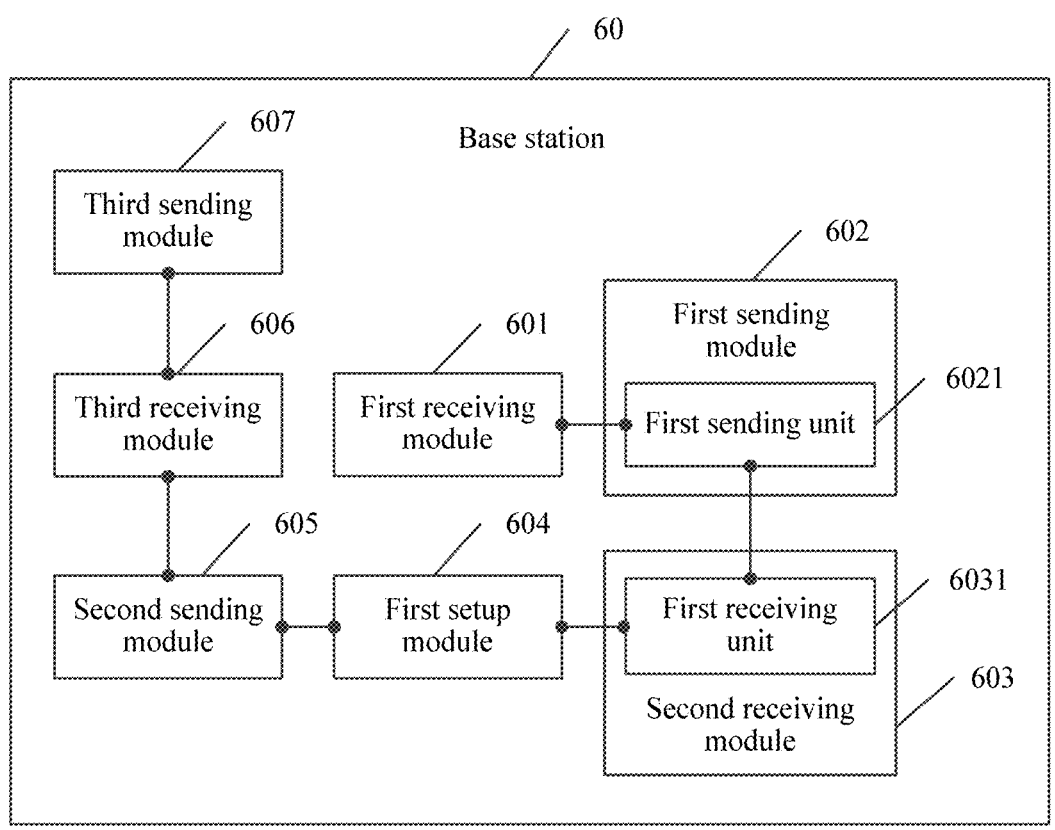
FIG. 16 is a schematic diagram of another embodiment of a base station according to an embodiment of the present disclosure.

Optionally, based on the embodiment corresponding to FIG. 15, referring to FIG. 16, the base station in this embodiment of the present disclosure may further include:

a third sending module 607, configured to send the first RRC connection reconfiguration complete message to the second base station after the third receiving module 606 receives the first RRC connection reconfiguration complete message sent by the UE, so that the second base station sends an initial context setup response message to the core network device based on the first RRC connection reconfiguration complete message, where the initial context setup response message is used to instruct the core network device to modify the first bearer.

Still further, in this embodiment of the present disclosure, the first base station sends the first RRC connection reconfiguration complete message to the second base station, so that the second base station sends the initial context setup response message to the core network device, where the initial context setup response message is used to instruct the core network device to modify the first bearer; and finally, the core network device receives the initial context setup response message sent by the second base station, to set up the first bearer from the first base station to the core network device, so that feasibility and practical applicability of the solution are enhanced.

Figure 17:
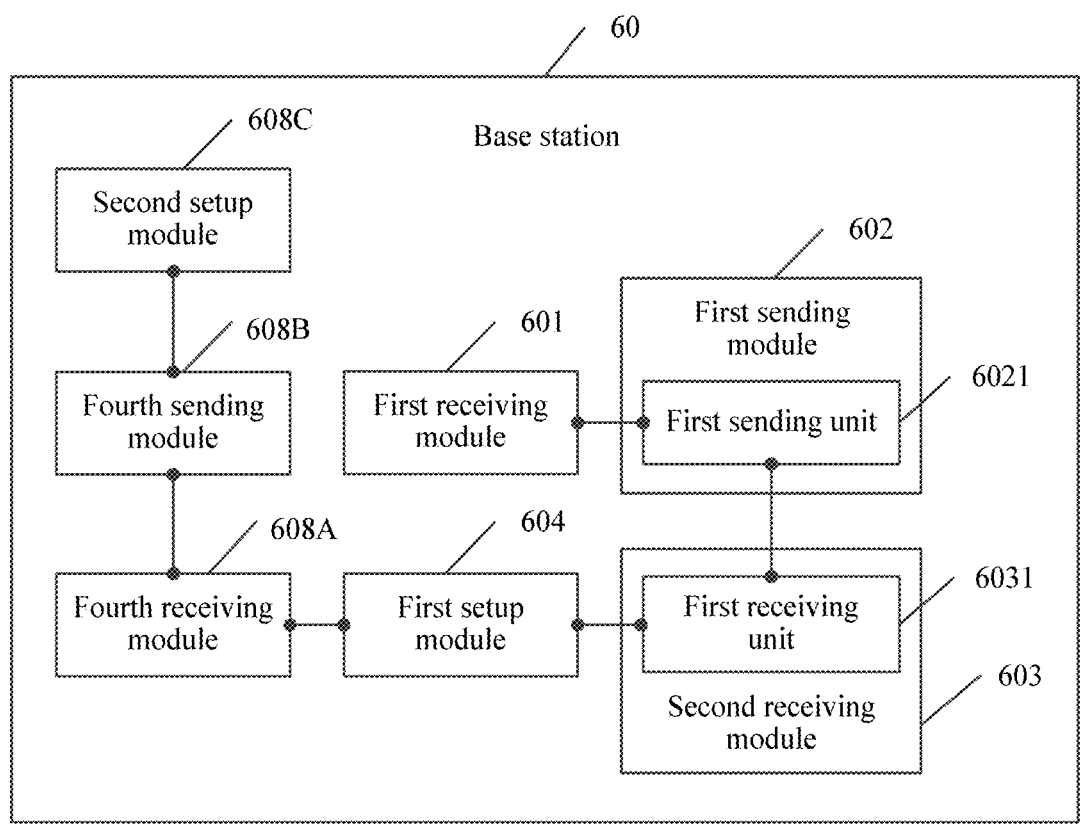
FIG. 17 is a schematic diagram of another embodiment of a base station according to an embodiment of the present disclosure.

Optionally, based on the embodiment corresponding to any one of FIG. 12 to FIG. 16, referring to FIG. 17, the base station in this embodiment of the present disclosure may further include:

a fourth receiving module 608A, configured to: after the first setup module 604 completes setup of the first bearer with the core network device, receive a third tunnel endpoint sent by the core network device, where the third tunnel endpoint includes the third TEID and the third transport layer address, the third tunnel endpoint is allocated by the core network device, and the third tunnel endpoint is used to indicate a destination of data transmitted in an uplink data transmission path of a second bearer;

a fourth sending module 608B, configured to send a fourth tunnel endpoint to the core network device, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and a second setup module 608C, configured to complete setup of the second bearer with the core network device.

In addition, in this embodiment of the present disclosure, the second bearer between the first base station and the core network device may be further set up provided that the first bearer is set up. Likewise, in the process of setting up the second bearer, there is no need to first connect to a 4G base station via an NR BS by using a new interface X5 and then connect to a 4G core network via the 4G base station. Therefore, a latency caused by the new interface X5 is shortened, and bandwidth of the new interface X5 is saved.

Figure 18:
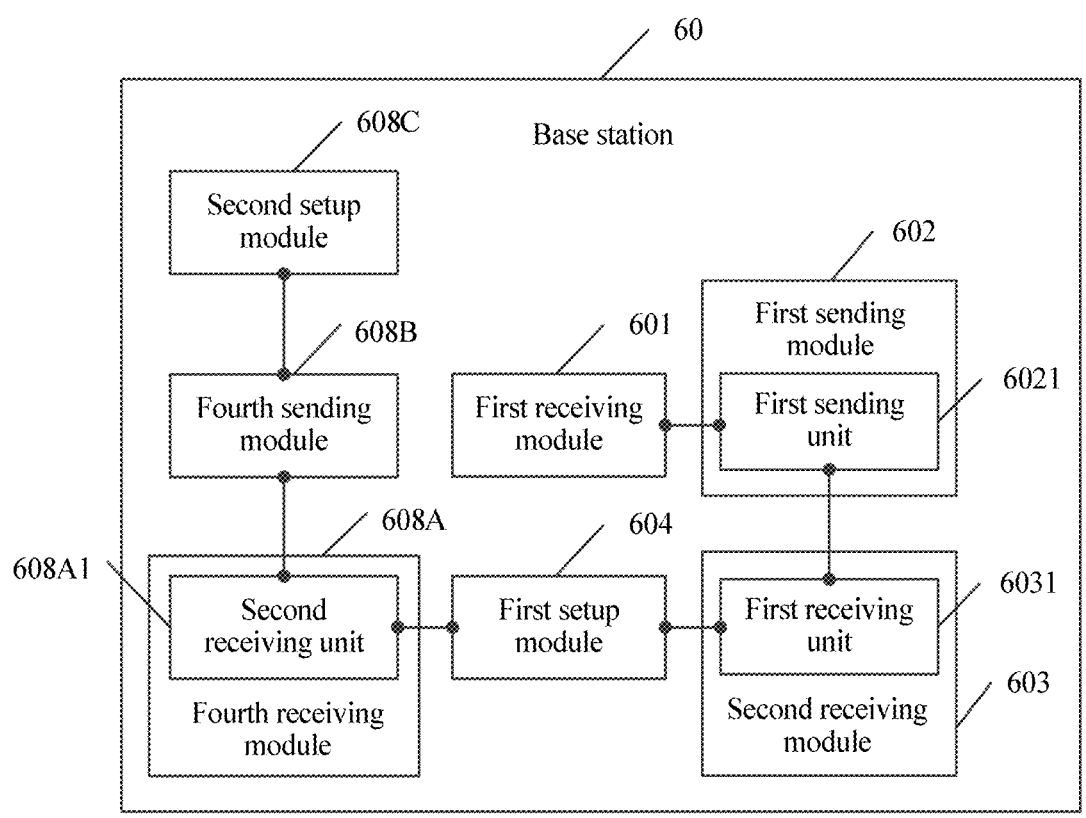
FIG. 18 is a schematic diagram of another embodiment of a base station according to an embodiment of the present disclosure.

Optionally, based on the embodiment corresponding to FIG. 17, referring to FIG. 18, in the base station in this embodiment of the present disclosure, the fourth receiving module 608A includes:

a second receiving unit 608A1, configured to receive a second RRC connection reconfiguration message sent by the second base station, where the second RRC connection reconfiguration message is sent after the second base station receives an evolved radio access bearer (eRAB) setup request sent by the core network device, where the eRAB setup request and the second RRC connection reconfiguration message carry the third tunnel endpoint.

In addition, in this embodiment of the present disclosure, the core network device needs to transmit the third TEID and the third transport layer address to the first base station by using the eRAB setup request and the second RRC connection reconfiguration message. In the foregoing manner, the third tunnel endpoint may be transmitted to set up an uplink bearer between the first base station and the core network device, so that feasibility of the solution is enhanced.

Figure 19:
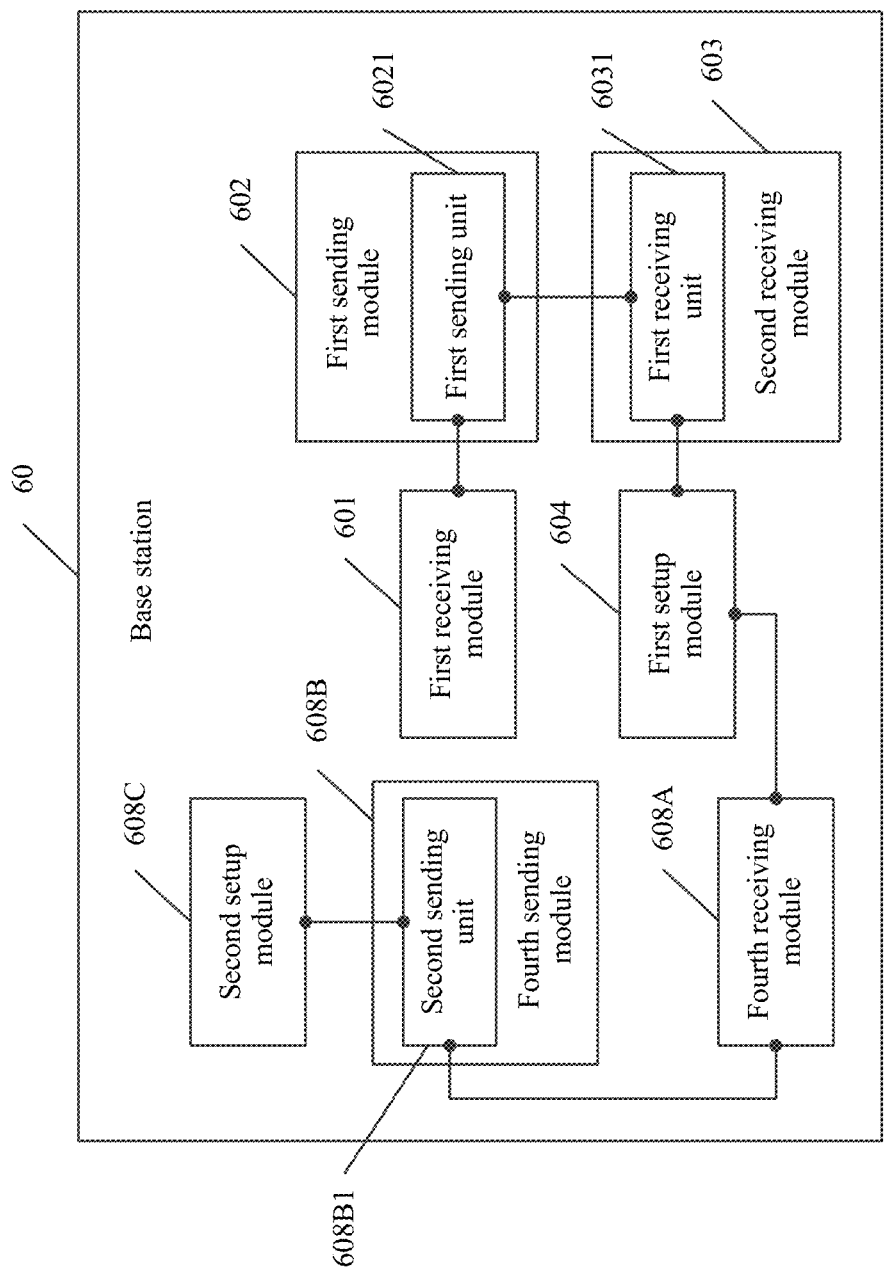
FIG. 19 is a schematic diagram of another embodiment of a base station according to an embodiment of the present disclosure.

Optionally, based on the embodiment corresponding to FIG. 17 or FIG. 18, referring to FIG. 19, in the base station in this embodiment of the present disclosure, the fourth sending module 608B includes:

a second sending unit 608B1, configured to send a second RRC connection reconfiguration complete message to the second base station, where the second RRC connection reconfiguration complete message is used to instruct the second base station to send an eRAB setup response message to the core network device, where the second RRC connection reconfiguration complete message and the eRAB setup response message carry the fourth tunnel endpoint.

Figure 20:
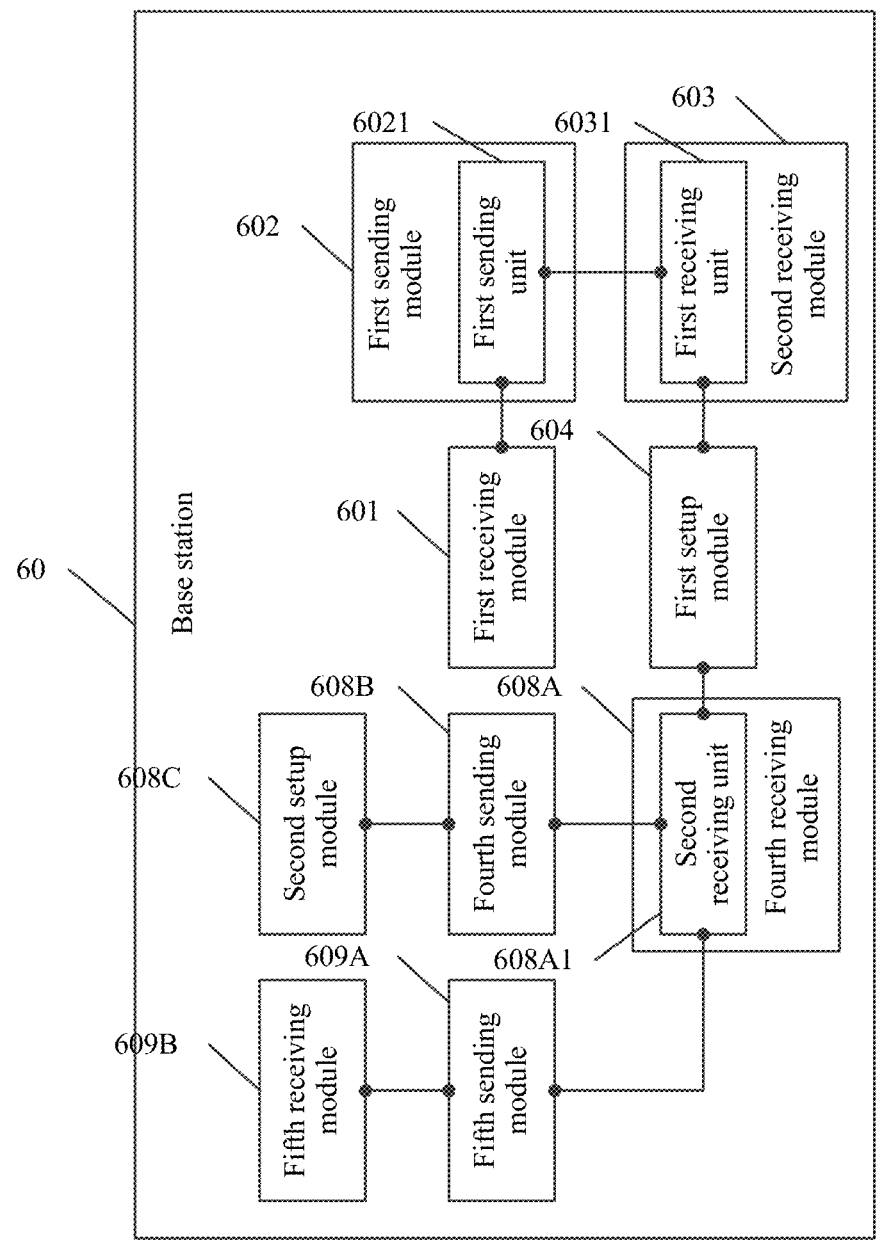
FIG. 20 is a schematic diagram of another embodiment of a base station according to an embodiment of the present disclosure.

Optionally, based on the embodiment corresponding to FIG. 18 or FIG. 19, referring to FIG. 20, the base station in this embodiment of the present disclosure may further include:

a fifth sending module 609A, configured to send the second RRC connection reconfiguration message to the UE after the second receiving unit 608A1 receives the second RRC connection reconfiguration message sent by the second base station, where the second RRC connection reconfiguration message is used to request the UE to configure an air interface resource; and a fifth receiving module 609B, configured to receive the second RRC connection reconfiguration complete message sent by the UE, where the second RRC connection reconfiguration complete message is used to indicate that the UE has completed configuration of the air interface resource.

Still further, in this embodiment of the present disclosure, after setting up the uplink bearer of the second bearer with the core network device, the first base station may send the second RRC connection reconfiguration message to the UE, to request configuration of the air interface resource. Therefore, the air interface resource can be provided properly when the uplink data is transmitted, and practical applicability of the solution is enhanced.

Figure 21:
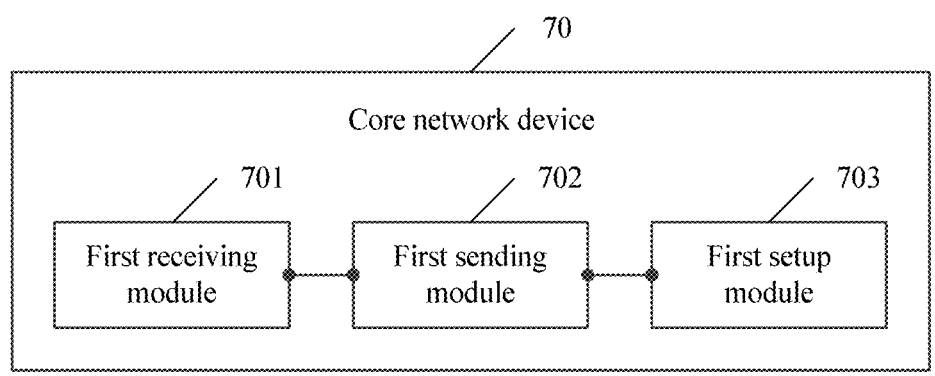
FIG. 21 is a schematic diagram of an embodiment of a core network device according to an embodiment of the present disclosure.

The foregoing describes a base station provided by an embodiment of the present disclosure. The following describes a core network device provided by an embodiment of the present. Referring to FIG. 21, a core network device in an embodiment of the present disclosure may include:

a first receiving module 701, configured to receive a first tunnel endpoint sent by a first base station, where the first tunnel endpoint includes a first tunnel endpoint identifier (TEID) and a first transport layer address, the first tunnel endpoint is allocated by the first base station, and the first tunnel endpoint is used to indicate a destination of data transmitted in a downlink data transmission path of a first bearer;

a first sending module 702, configured to send a second tunnel endpoint to the first base station, where the second tunnel endpoint includes a second TEID and a second transport layer address, the second tunnel endpoint is allocated by the core network device, and the second tunnel endpoint is used to indicate a destination of data transmitted in an uplink data transmission path of the first bearer; and a first setup module 703, configured to complete setup of the first bearer with the first base station, for transmitting the uplink data and transmitting the downlink data.

In this embodiment, the first receiving module 701 receives the first tunnel endpoint sent by the first base station, where the first tunnel endpoint includes the first tunnel endpoint identifier (TEID) and the first transport layer address, the first tunnel endpoint is allocated by the first base station, and the first tunnel endpoint is used to indicate the destination of the data transmitted in the downlink data transmission path of the first bearer; the first sending module 702 sends the second tunnel endpoint to the first base station, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; and the first setup module 703 completes setup of the first bearer with the first base station, for transmitting the uplink data and transmitting the downlink data.

In the technical solution provided in this embodiment of the present disclosure, a core network device for setting up a bearer is provided. To be specific, the first base station receives a first bearer setup request message initiated by UE; then the first base station sends the first tunnel endpoint to the core network device based on the first bearer setup request message, where the first tunnel endpoint includes the first tunnel endpoint identifier (TEID) and the first transport layer address, the first tunnel endpoint is allocated by the first base station, and the first tunnel endpoint is used to indicate the destination of the data transmitted in the downlink data transmission path of the first bearer; then the first base station receives the second tunnel endpoint sent by the core network device, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

Figure 22:
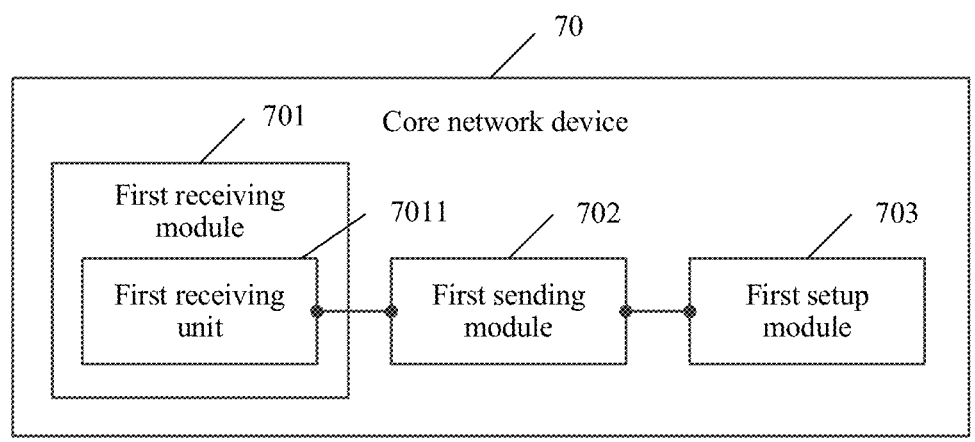
FIG. 22 is a schematic diagram of another embodiment of a core network device according to an embodiment of the present disclosure.

Optionally, based on the embodiment corresponding to FIG. 21, referring to FIG. 22, in the core network device in this embodiment of the present disclosure, the first receiving module 701 includes:

a first receiving unit 7011, configured to receive an initial user equipment (UE) message sent by a second base station, where the initial UE message is sent after the second base station receives a radio resource control (RRC) connection setup complete message sent by the first base station, and the RRC connection setup complete message is sent by the first base station to the second base station based on a first bearer setup request message, where the RRC connection setup complete message and the initial UE message carry the first tunnel endpoint.

In addition, in this embodiment of the present disclosure, the first base station specifically transmits the first TEID and the first transport layer address to the core network device by using the RRC connection setup complete message and the initial UE message. In the foregoing manner, the first tunnel endpoint may be transmitted to set up a downlink bearer between the first base station and the core network device, so that feasibility of the solution is enhanced.

Figure 23:
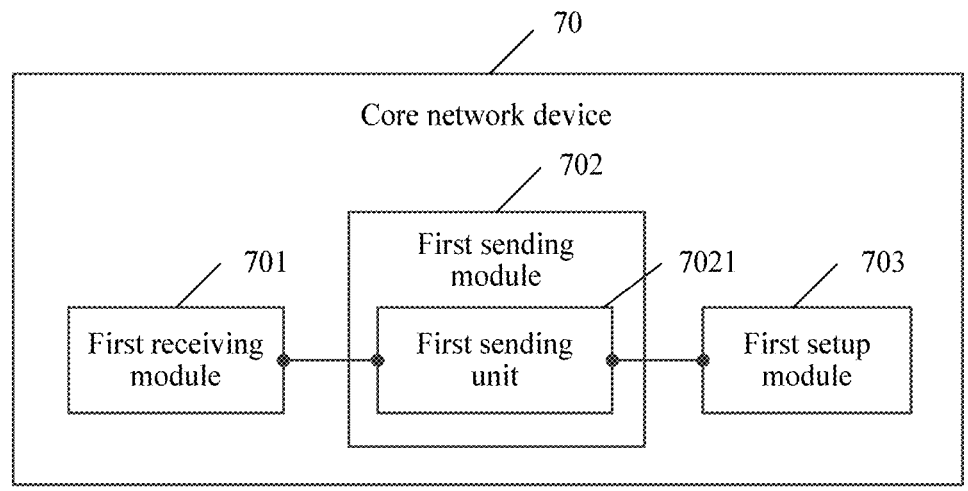
FIG. 23 is a schematic diagram of another embodiment of a core network device according to an embodiment of the present disclosure.

Optionally, based on the embodiment corresponding to FIG. 21 or FIG. 22, referring to FIG. 23, in the core network device in this embodiment of the present disclosure, the first sending module 702 includes:

a first sending unit 7021, configured to send an initial context setup request to the second base station, where the initial context setup request is used to instruct the second base station to send a first RRC connection reconfiguration message to the first base station, where the initial context setup request and the first RRC connection reconfiguration message carry the second tunnel endpoint.

In addition, in this embodiment of the present disclosure, the core network device specifically transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

Figure 24:
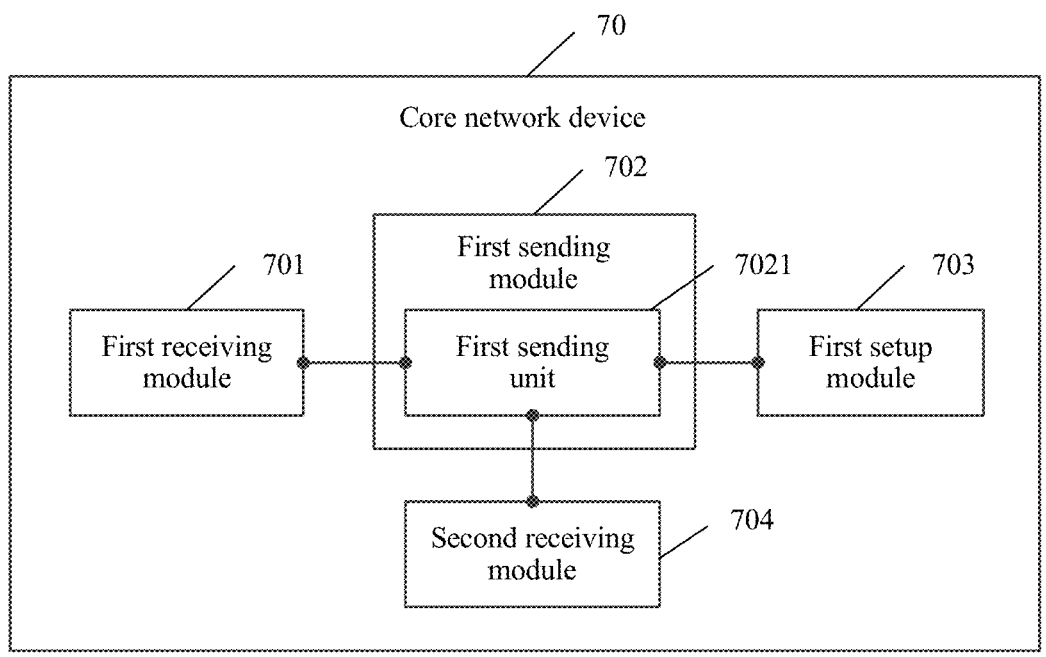
FIG. 24 is a schematic diagram of another embodiment of a core network device according to an embodiment of the present disclosure.

Optionally, based on the embodiment corresponding to FIG. 23, referring to FIG. 24, the core network device in this embodiment of the present disclosure may further include:

a second receiving module 704, configured to: after the first sending module 702 sends the second tunnel endpoint to the first base station, receive an initial context setup response message sent by the second base station, where the initial context setup response message is sent to the core network device after the second base station receives a first RRC connection reconfiguration complete message sent by the first base station, and the first RRC connection reconfiguration complete message is used to indicate that UE has completed configuration of an air interface resource.

Further, in this embodiment of the present disclosure, after setting up the uplink bearer with the core network device, the first base station may send the first RRC connection reconfiguration message to the UE, to request configuration of the air interface resource. Therefore, the air interface resource can be provided properly when the uplink data is transmitted, and practical applicability of the solution is enhanced.

Figure 25:
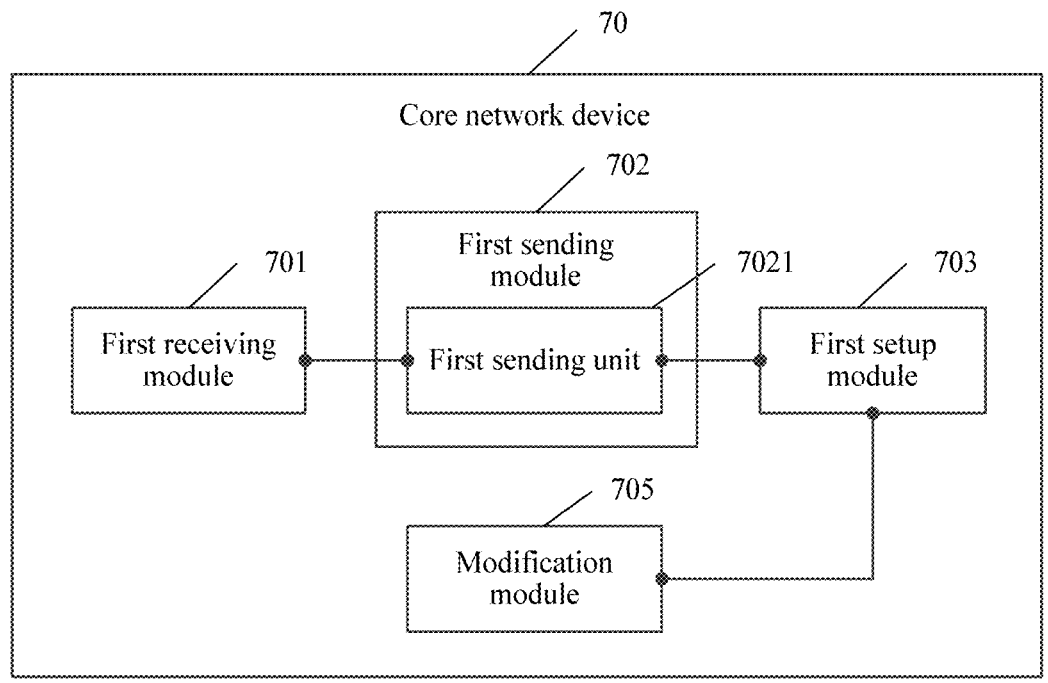
FIG. 25 is a schematic diagram of another embodiment of a core network device according to an embodiment of the present disclosure.

Optionally, based on the embodiment corresponding to FIG. 23, referring to FIG. 25, the core network device in this embodiment of the present disclosure may further include:

a modification module 705, configured to modify the first bearer before the first setup module 703 completes setup of the first bearer with the first base station.

Still further, in this embodiment of the present disclosure, the first base station sends the first RRC connection reconfiguration complete message to the second base station, so that the second base station sends the initial context setup response message to the core network device, where the initial context setup response message is used to instruct the core network device to modify the first bearer; and finally, the core network device receives the initial context setup response message sent by the second base station, to set up the first bearer from the first base station to the core network device, so that feasibility and practical applicability of the solution are enhanced.

Figure 26:
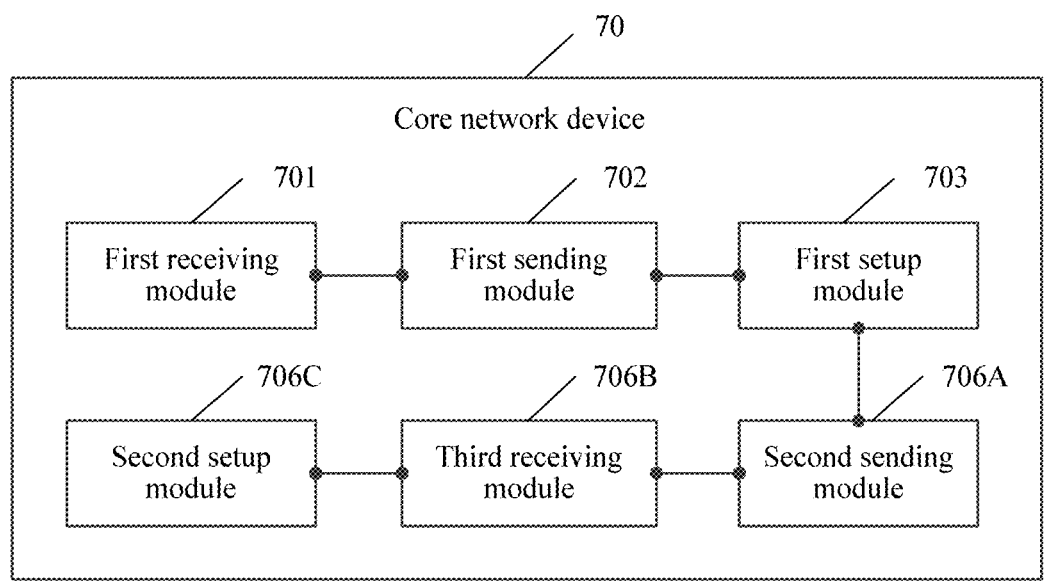
FIG. 26 is a schematic diagram of another embodiment of a core network device according to an embodiment of the present disclosure.

Optionally, based on the embodiment corresponding to any one of FIG. 21 to FIG. 25, referring to FIG. 26, the core network device in this embodiment of the present disclosure may further include:

a second sending module 706A, configured to send a third tunnel endpoint to the first base station after the first setup module 703 completes setup of the first bearer with the first base station, where the third tunnel endpoint includes the third TEID and the third transport layer address, the third tunnel endpoint is allocated by the core network device, and the third tunnel endpoint is used to indicate a destination of data transmitted in an uplink data transmission path of a second bearer;

a third receiving module 706B, configured to receive a fourth tunnel endpoint sent by the first base station, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and a second setup module 706C, configured to complete setup of the second bearer with the first base station.

In addition, in this embodiment of the present disclosure, the second bearer between the first base station and the core network device may be further set up provided that the first bearer is set up. Likewise, in the process of setting up the second bearer, there is no need to first connect to a 4G base station via an NR BS by using a new interface X5 and then connect to a 4G core network via the 4G base station. Therefore, a latency caused by the new interface X5 is shortened, and bandwidth of the new interface X5 is saved.

Figure 27:
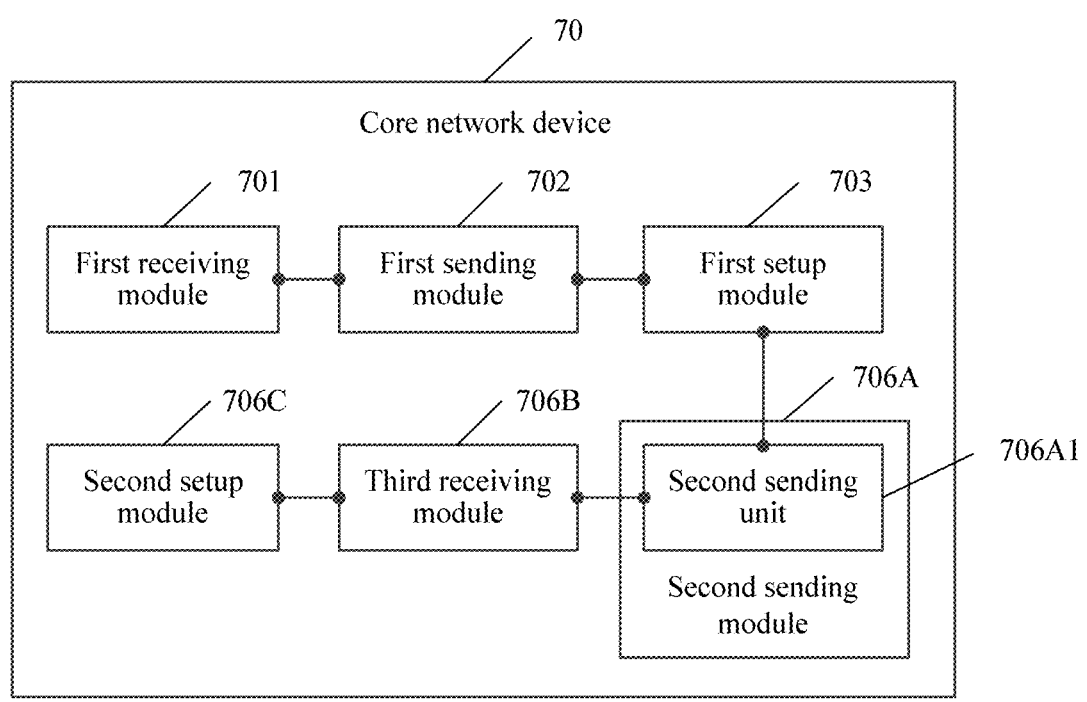
FIG. 27 is a schematic diagram of another embodiment of a core network device according to an embodiment of the present disclosure.

Optionally, based on the embodiment corresponding to FIG. 26, referring to FIG. 27, in the core network device in this embodiment of the present disclosure, the second sending module 706A includes:

a second sending unit 706A1, configured to send an evolved radio access bearer (eRAB) setup request to the second base station, where the eRAB setup request is used to instruct the second base station to send a second RRC connection reconfiguration message to the first base station, where the eRAB setup request and the second RRC connection reconfiguration message carry the third tunnel endpoint.

In addition, in this embodiment of the present disclosure, the core network device needs to transmit the third TEID and the third transport layer address to the first base station by using the eRAB setup request and the second RRC connection reconfiguration message. In the foregoing manner, the third tunnel endpoint may be transmitted to set up an uplink bearer between the first base station and the core network device, so that feasibility of the solution is enhanced.

Figure 28:
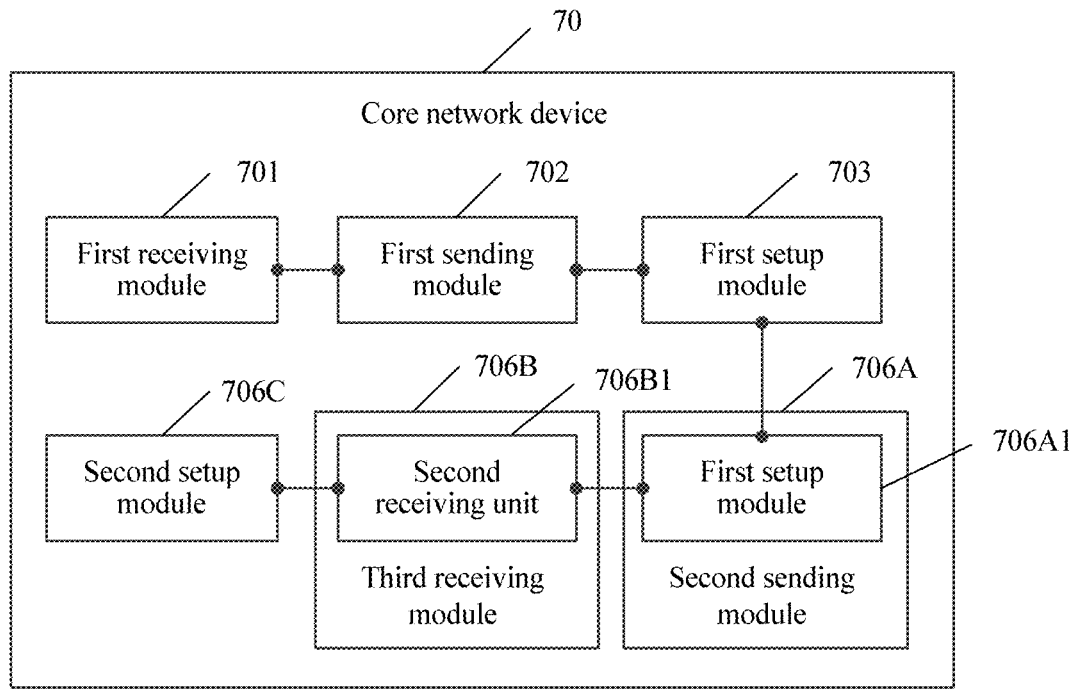
FIG. 28 is a schematic diagram of another embodiment of a core network device according to an embodiment of the present disclosure.

Optionally, based on the embodiment corresponding to FIG. 26 or FIG. 27, referring to FIG. 28, in the core network device in this embodiment of the present disclosure, the third receiving module 706B includes:

a second receiving unit 706B1, configured to receive an eRAB setup response message sent by the second base station, where the eRAB setup response message is sent to the core network device after the second base station receives a second RRC connection reconfiguration complete message sent by the first base station, and the second RRC connection reconfiguration complete message is used to indicate that the UE has completed configuration of an air interface resource, where the second RRC connection reconfiguration complete message and the eRAB setup response message carry the fourth tunnel endpoint.

Further, in this embodiment of the present disclosure, the first base station needs to transmit the fourth TEID and the fourth transport layer address to the core network device by using the second RRC connection reconfiguration complete message and the eRAB setup response message. In the foregoing manner, the fourth tunnel endpoint may be transmitted to set up a downlink bearer of the second bearer between the first base station and the core network device, so that feasibility of the solution is enhanced.

Figure 29:
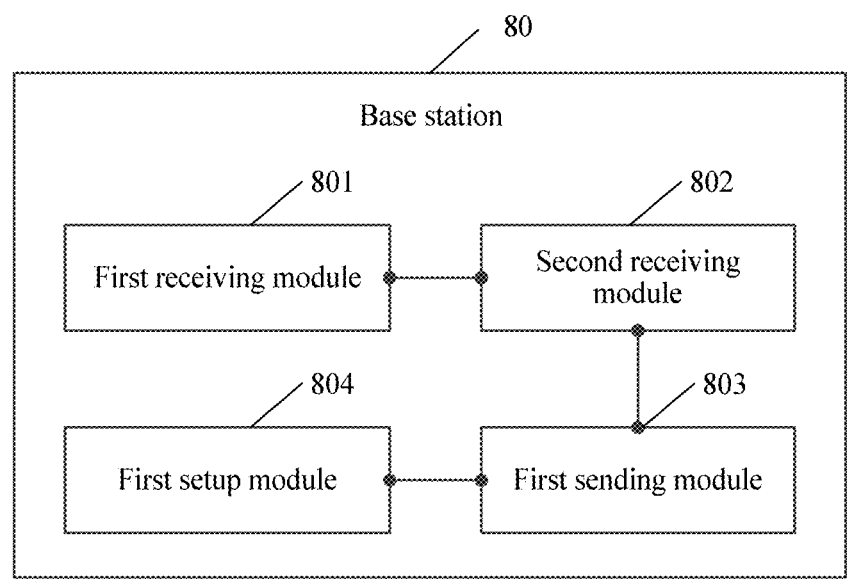
FIG. 29 is a schematic diagram of an embodiment of a base station according to an embodiment of the present disclosure.

The following describes a base station in another bearer setup method in an embodiment of the present disclosure. Referring to FIG. 29, a base station in an embodiment of the present disclosure may include:

a first receiving module 801, configured to receive a first bearer setup request message initiated by user equipment (UE);

a second receiving module 802, configured to receive, based on the first bearer setup request message received by the first receiving module 801, a second tunnel endpoint sent by a core network device, where the second tunnel endpoint includes a second TEID and a second transport layer address, the second tunnel endpoint is allocated by the core network device, and the second tunnel endpoint is used to indicate a destination of data transmitted in an uplink data transmission path of a first bearer;

a first sending module 803, configured to send a first tunnel endpoint to the core network device, where the first tunnel endpoint includes a first tunnel endpoint identifier (TEID) and a first transport layer address, the first tunnel endpoint is allocated by the first base station, and the first tunnel endpoint is used to indicate a destination of data transmitted in a downlink data transmission path of the first bearer; and a first setup module 804, configured to complete setup of the first bearer with the core network device, for transmitting the uplink data and transmitting the downlink data.

In this embodiment, the first receiving module 801 receives the first bearer setup request message initiated by the UE; the second receiving module 802 receives, based on the first bearer setup request message received by the first receiving module 801, the second tunnel endpoint sent by the core network device, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; the first sending module 803 sends the first tunnel endpoint to the core network device, where the first tunnel endpoint includes the first tunnel endpoint identifier (TEID) and the first transport layer address, the first tunnel endpoint is allocated by the first base station, and the first tunnel endpoint is used to indicate the destination of the data transmitted in the downlink data transmission path of the first bearer; and the first setup module 804 is configured to complete setup of the first bearer with the core network device, for transmitting the uplink data and transmitting the downlink data.

In the technical solution provided in this embodiment of the present disclosure, a bearer setup method is provided. To be specific, the first base station receives the first bearer setup request message initiated by the UE; then the core network device sends the second tunnel endpoint to the first base station, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; then the first base station sends the first tunnel endpoint to the core network device, where the first tunnel endpoint includes the first TEID and the first transport layer address, the first tunnel endpoint is allocated by the first base station, and the first tunnel endpoint is used to indicate the destination of the data transmitted in the downlink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

Figure 30:
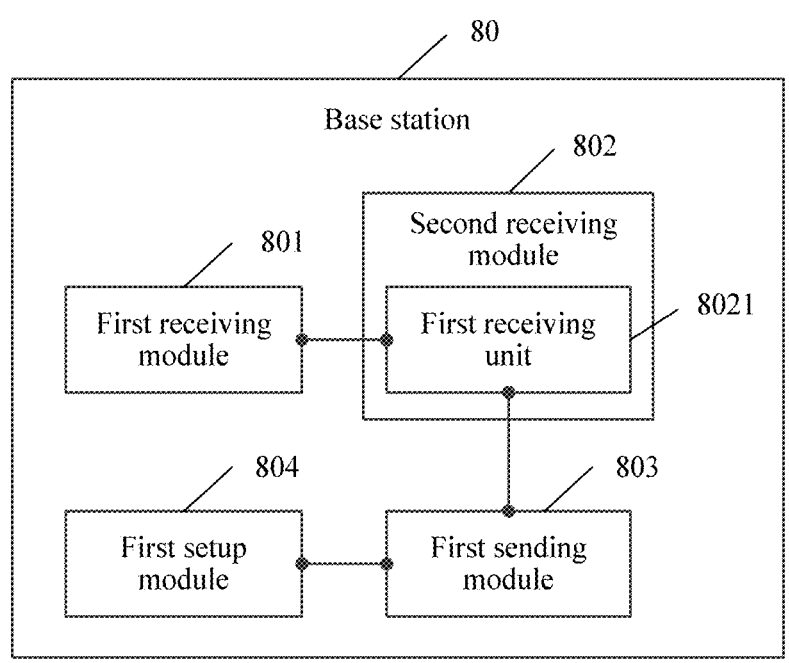
FIG. 30 is a schematic diagram of another embodiment of a base station according to an embodiment of the present disclosure.

Optionally, based on the embodiment corresponding to FIG. 29, referring to FIG. 30, in the base station in this embodiment of the present disclosure, the second receiving module 802 includes:

a first receiving unit 8021, configured to receive a first radio resource control (RRC) connection reconfiguration message sent by a second base station, where the first RRC connection reconfiguration message is sent after the second base station receives an initial context setup request sent by the core network device, where the initial context setup request and the first RRC connection reconfiguration message carry the second tunnel endpoint.

In addition, in this embodiment of the present disclosure, the core network device sends the initial context setup request to the second base station, where the initial context setup request is used to instruct the second base station to send the first RRC connection reconfiguration message to the first base station, and the core network device transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

Figure 31:
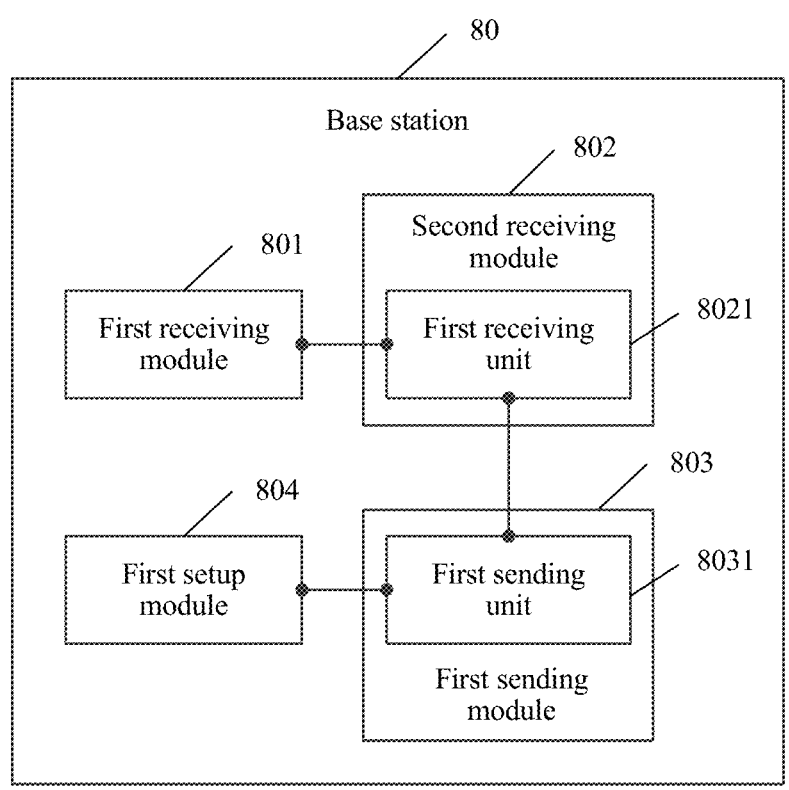
FIG. 31 is a schematic diagram of another embodiment of a base station according to an embodiment of the present disclosure.

Optionally, based on the embodiment corresponding to FIG. 29 or FIG. 30, referring to FIG. 31, in the base station in this embodiment of the present disclosure, the first sending module 803 includes:

a first sending unit 8031, configured to send a first RRC connection reconfiguration complete message to the second base station, where the first RRC connection reconfiguration complete message is used to instruct the second base station to send an initial context setup response message to the core network device, where the first RRC connection reconfiguration complete message and the initial context setup response message carry the first tunnel endpoint.

In addition, in this embodiment of the present disclosure, the first base station needs to transmit the first TEID and the first transport layer address to the core network device by using the first RRC connection reconfiguration complete message and the initial context setup response message. In the foregoing manner, the first tunnel endpoint may be transmitted to set up a downlink bearer of the first bearer between the first base station and the core network device, so that feasibility of the solution is enhanced.

Figure 32:
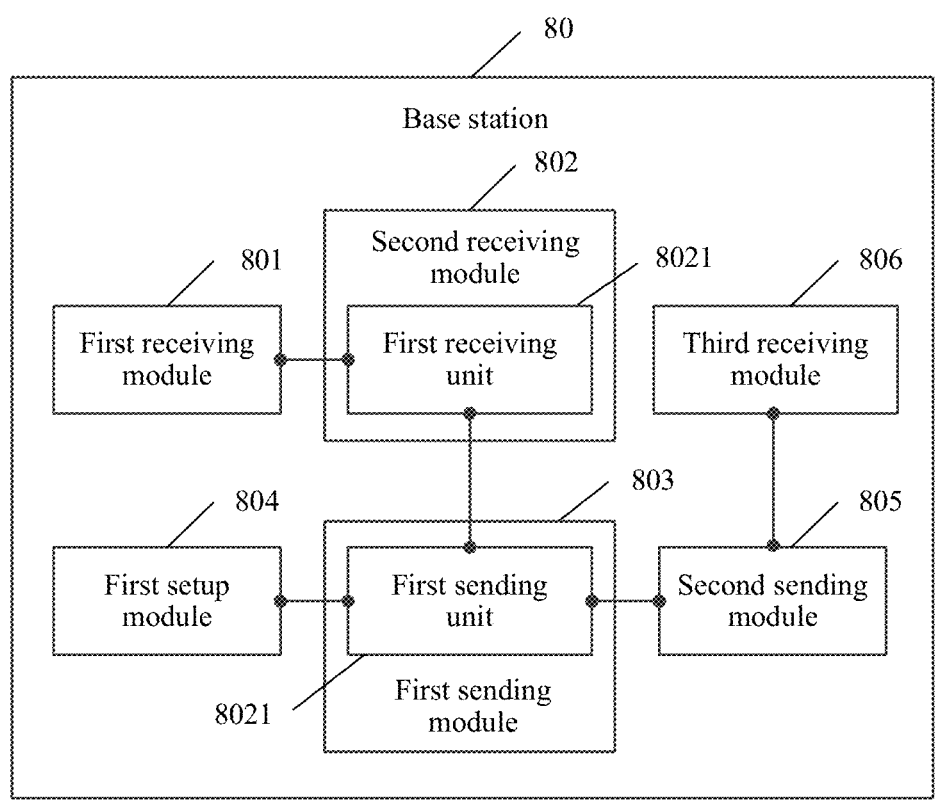
FIG. 32 is a schematic diagram of another embodiment of a base station according to an embodiment of the present disclosure.

Optionally, based on the embodiment corresponding to FIG. 31, referring to FIG. 32, the base station in this embodiment of the present disclosure may further include:

a second sending module 805, configured to send the first RRC connection reconfiguration message to the UE before the first sending unit 8031 sends the first RRC connection reconfiguration complete message to the second base station, where the first RRC connection reconfiguration message is used to request the UE to configure an air interface resource; and a third receiving module 806, configured to receive the first RRC connection reconfiguration complete message sent by the UE, where the first RRC connection reconfiguration complete message is used to indicate that the UE has completed configuration of the air interface resource.

Further, in this embodiment of the present disclosure, after setting up the downlink bearer with the core network device, the first base station may send the first RRC connection reconfiguration message to the UE, to request configuration of the air interface resource. Therefore, the air interface resource can be provided properly when the uplink data is transmitted, and practical applicability of the solution is enhanced.

Figure 33:
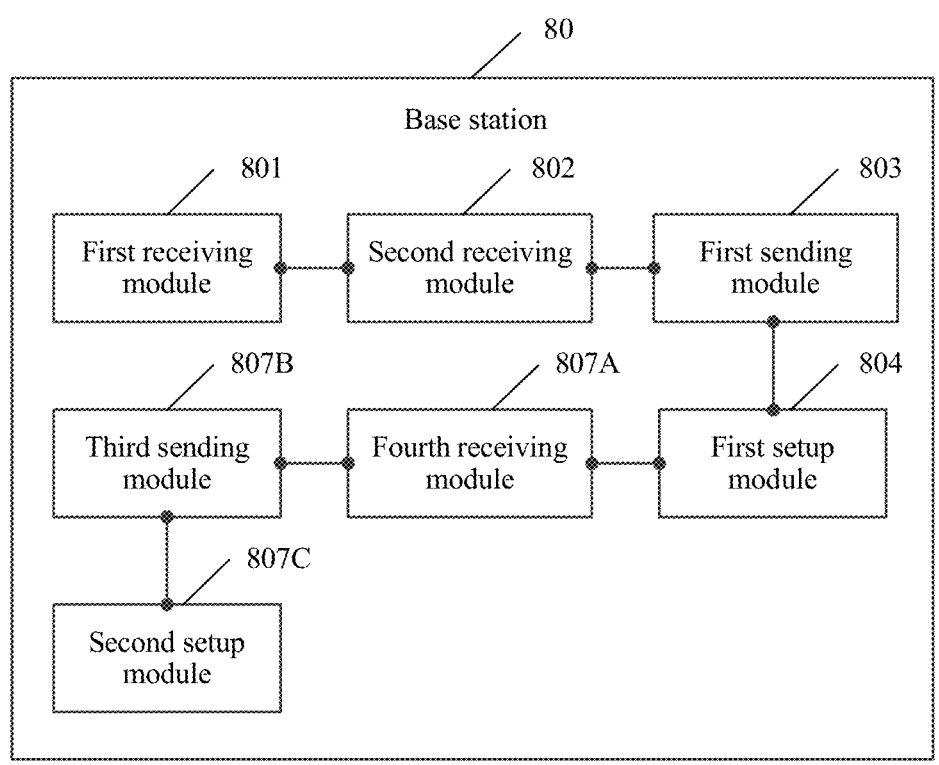
FIG. 33 is a schematic diagram of another embodiment of a base station according to an embodiment of the present disclosure.

Optionally, based on the embodiment corresponding to any one of FIG. 29 to FIG. 32, referring to FIG. 33, the base station in this embodiment of the present disclosure may further include:

a fourth receiving module 807A, configured to: after the first setup module 804 completes setup of the first bearer with the core network device, receive a third tunnel endpoint sent by the core network device, where the third tunnel endpoint includes the third TEID and the third transport layer address, the third tunnel endpoint is allocated by the core network device, and the third tunnel endpoint is used to indicate a destination of data transmitted in an uplink data transmission path of a second bearer;

a third sending module 807B, configured to send a fourth tunnel endpoint to the core network device, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and a second setup module 807C, configured to complete setup of the second bearer with the core network device.

In addition, in this embodiment of the present disclosure, the second bearer between the first base station and the core network device may be further set up provided that the first bearer is set up. Likewise, in the process of setting up the second bearer, there is no need to first connect to a 4G base station via an NR BS by using a new interface X5 and then connect to a 4G core network via the 4G base station. Therefore, a latency caused by the new interface X5 is shortened, and bandwidth of the new interface X5 is saved.

Figure 34:
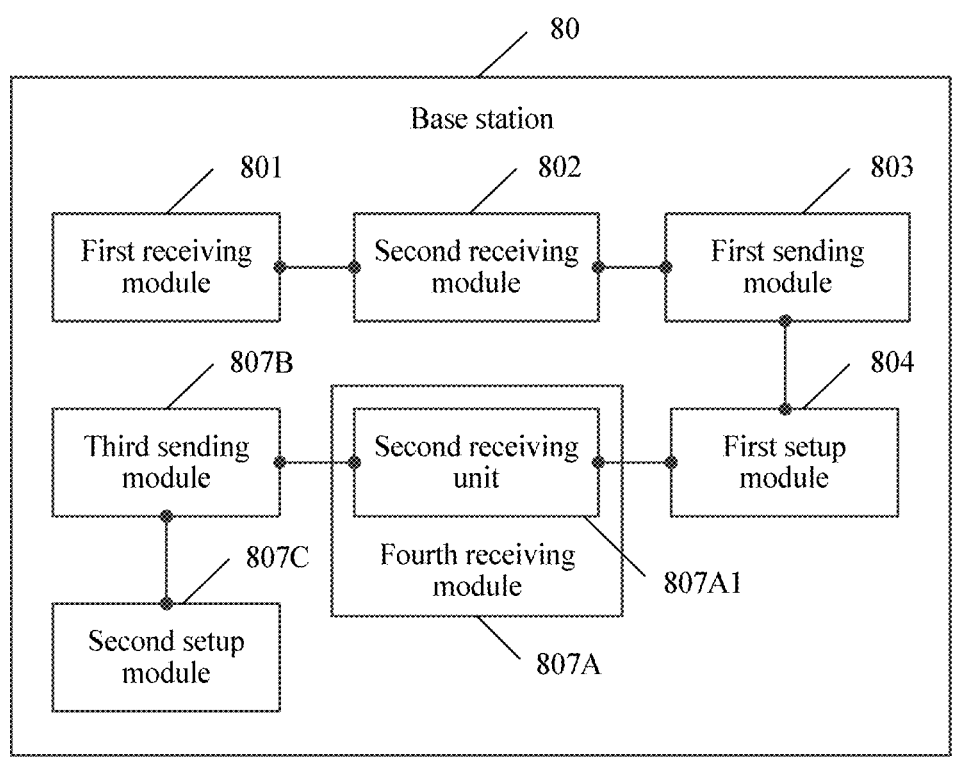
FIG. 34 is a schematic diagram of another embodiment of a base station according to an embodiment of the present disclosure.

Optionally, based on the embodiment corresponding to FIG. 33, referring to FIG. 34, in the base station in this embodiment of the present disclosure, the fourth receiving module 807A includes:

a second receiving unit 807A1, configured to receive a second RRC connection reconfiguration message sent by the second base station, where the second RRC connection reconfiguration message is sent after the second base station receives an evolved radio access bearer (eRAB) setup request sent by the core network device, where the eRAB setup request and the second RRC connection reconfiguration message carry the third tunnel endpoint.

In addition, in this embodiment of the present disclosure, the core network device needs to transmit the third TEID and the third transport layer address to the first base station by using the eRAB setup request and the second RRC connection reconfiguration message. In the foregoing manner, the third tunnel endpoint may be transmitted to set up an uplink bearer between the first base station and the core network device, so that feasibility of the solution is enhanced.

Figure 35:
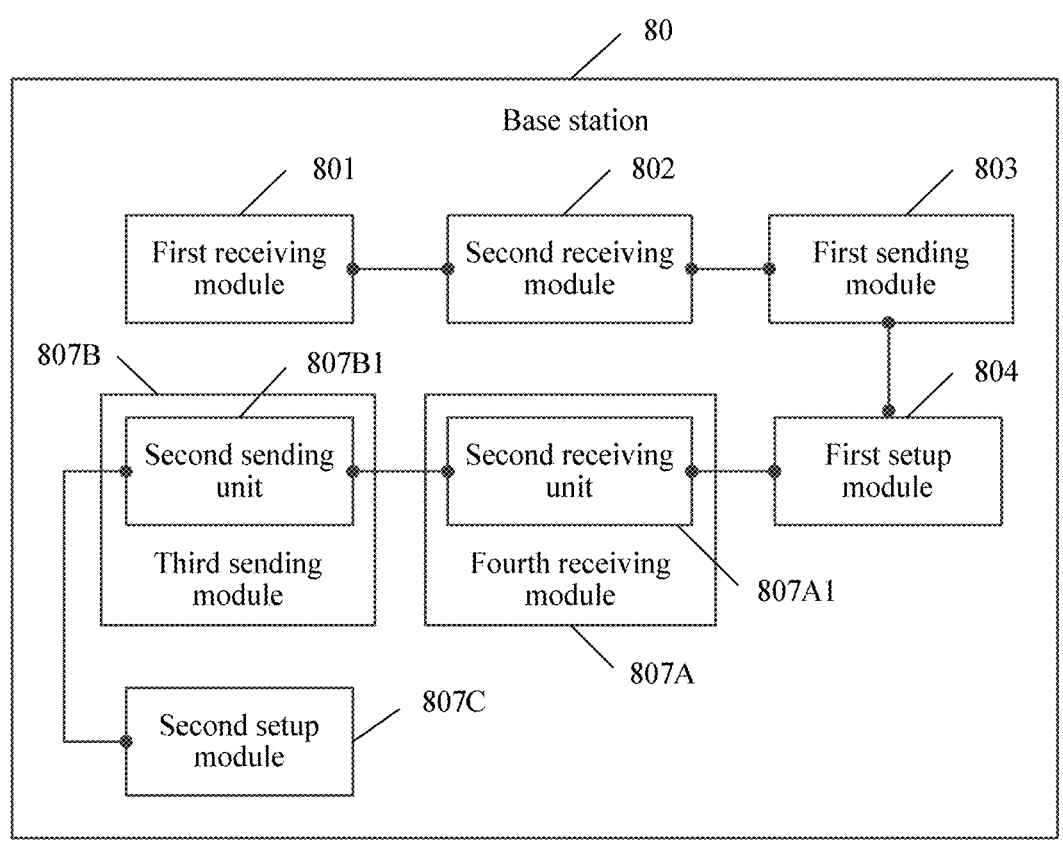
FIG. 35 is a schematic diagram of another embodiment of a base station according to an embodiment of the present disclosure.

Optionally, based on the embodiment corresponding to FIG. 33 or FIG. 34, referring to FIG. 35, in the base station in this embodiment of the present disclosure, the third sending module 807B includes:

a second sending unit 807B1, configured to send a second RRC connection reconfiguration complete message to the second base station, where the second RRC connection reconfiguration complete message is used to instruct the second base station to send an eRAB setup response message to the core network device, where the second RRC connection reconfiguration complete message and the eRAB setup response message carry the fourth tunnel endpoint.

Further, in this embodiment of the present disclosure, the first base station needs to transmit the fourth TEID and the fourth transport layer address to the core network device by using the second RRC connection reconfiguration complete message and the eRAB setup response message. In the foregoing manner, the fourth tunnel endpoint may be transmitted to set up a downlink bearer of the second bearer between the first base station and the core network device, so that feasibility of the solution is enhanced.

Figure 36:
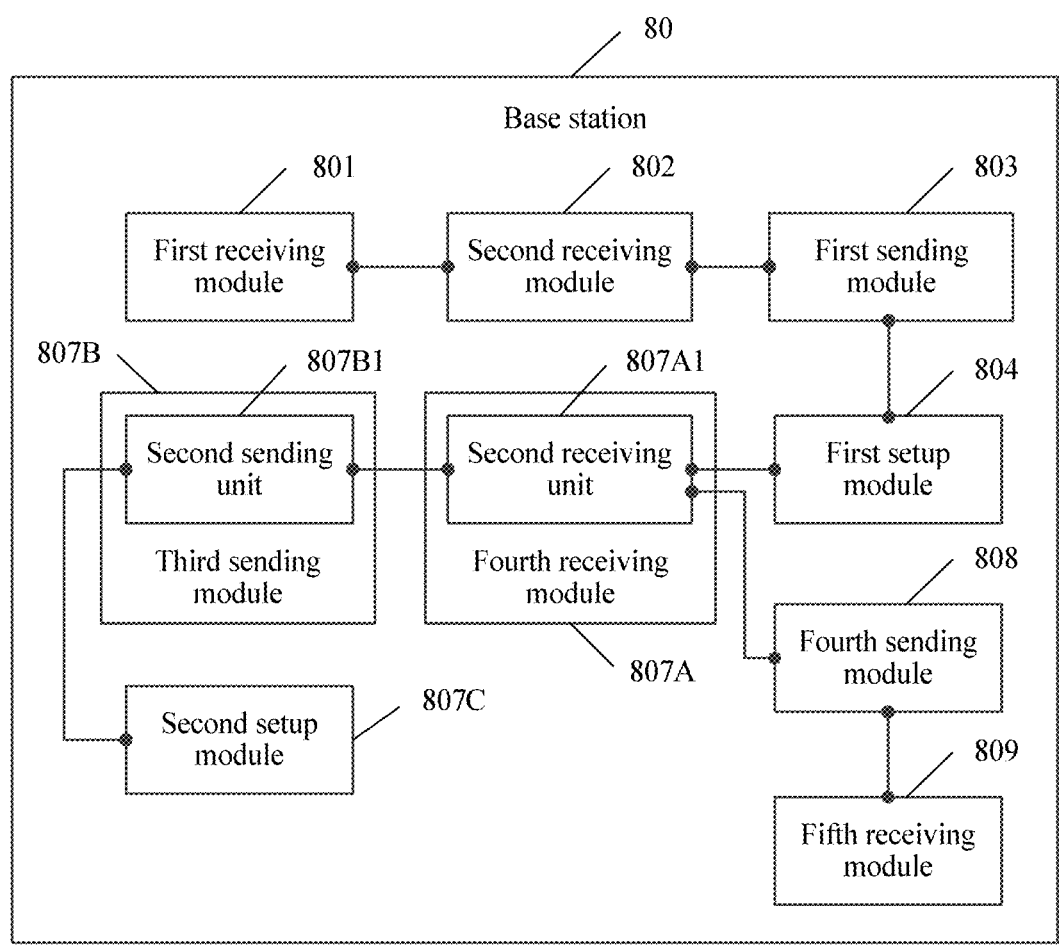
FIG. 36 is a schematic diagram of another embodiment of a base station according to an embodiment of the present disclosure.

Optionally, based on the embodiment corresponding to FIG. 34 or FIG. 35, referring to FIG. 36, the base station in this embodiment of the present disclosure may further include:

a fourth sending module 808, configured to send the second RRC connection reconfiguration message to the UE after the second receiving unit 807A1 receives the second RRC connection reconfiguration message sent by the second base station, where the second RRC connection reconfiguration message is used to request the UE to configure an air interface resource; and a fifth receiving module 809, configured to receive the second RRC connection reconfiguration complete message sent by the UE, where the second RRC connection reconfiguration complete message is used to indicate that the UE has completed configuration of the air interface resource.

Still further, in this embodiment of the present disclosure, after setting up the uplink bearer of the second bearer with the core network device, the first base station may send the second RRC connection reconfiguration message to the UE, to request configuration of the air interface resource. Therefore, the air interface resource can be provided properly when the uplink data is transmitted, and practical applicability of the solution is enhanced.

Figure 37:
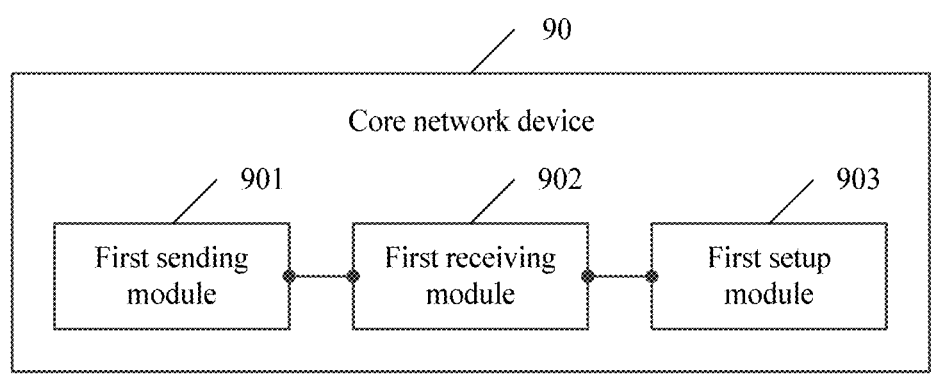
FIG. 37 is a schematic diagram of an embodiment of a core network device according to an embodiment of the present disclosure.

The foregoing describes a bearer setup method in the present disclosure from a perspective of a base station. The following describes a bearer setup method from a perspective of a core network device. Referring to FIG. 37, a core network device in an embodiment of the present disclosure includes:

a first sending module 901, configured to send a second tunnel endpoint to a first base station, where the second tunnel endpoint includes a second TEID and a second transport layer address, the second tunnel endpoint is allocated by the core network device, and the second tunnel endpoint is used to indicate a destination of data transmitted in an uplink data transmission path of a first bearer;

a first receiving module 902, configured to receive a first tunnel endpoint sent by the first base station, where the first tunnel endpoint includes a first tunnel endpoint identifier (TEID) and a first transport layer address, the first tunnel endpoint is allocated by the first base station, and the first tunnel endpoint is used to indicate a destination of data transmitted in a downlink data transmission path of the first bearer; and a first setup module 903, configured to complete setup of the first bearer with the first base station, for transmitting the uplink data and transmitting the downlink data.

In this embodiment, the first sending module 901 sends the second tunnel endpoint to the first base station, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; the first receiving module 902 receives the first tunnel endpoint sent by the first base station, where the first tunnel endpoint includes the first tunnel endpoint identifier (TEID) and the first transport layer address, the first tunnel endpoint is allocated by the first base station, and the first tunnel endpoint is used to indicate the destination of the data transmitted in the downlink data transmission path of the first bearer; and the first setup module 903 completes setup of the first bearer with the first base station, for transmitting the uplink data and transmitting the downlink data.

In the technical solution provided in this embodiment of the present disclosure, a core network device for setting up a bearer is provided. To be specific, the first base station receives a first bearer setup request message initiated by UE; then the core network device sends the second tunnel endpoint to the first base station, where the second tunnel endpoint includes the second TEID and the second transport layer address, the second tunnel endpoint is allocated by the core network device, and the second tunnel endpoint is used to indicate the destination of the data transmitted in the uplink data transmission path of the first bearer; then the first base station sends the first tunnel endpoint to the core network device, where the first tunnel endpoint includes the first TEID and the first transport layer address, the first tunnel endpoint is allocated by the first base station, and the first tunnel endpoint is used to indicate the destination of the data transmitted in the downlink data transmission path of the first bearer; and the first base station and the core network device complete setup of the first bearer after respectively receiving the tunnel endpoints. In the foregoing manner, a bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

Figure 38:
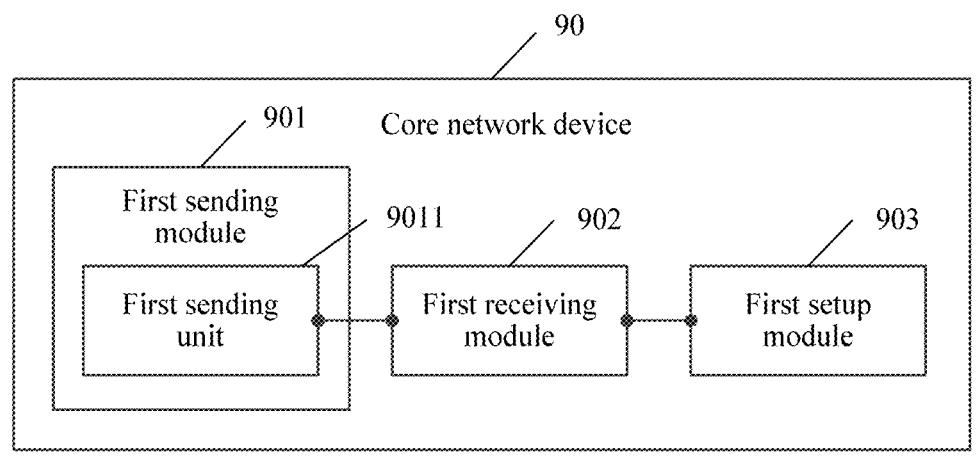
FIG. 38 is a schematic diagram of another embodiment of a core network device according to an embodiment of the present disclosure.

Optionally, based on the embodiment corresponding to FIG. 37, referring to FIG. 38, in the core network device in this embodiment of the present disclosure, the first sending module 901 includes:

a first sending unit 9011, configured to send an initial context setup request to a second base station, where the initial context setup request is used to instruct the second base station to send a first radio resource control (RRC) connection reconfiguration message to the first base station, where the initial context setup request and the first RRC connection reconfiguration message carry the second tunnel endpoint.

In addition, in this embodiment of the present disclosure, the core network device sends the initial context setup request to the second base station, where the initial context setup request is used to instruct the second base station to send the first RRC connection reconfiguration message to the first base station, and the core network device transmits the second TEID and the second transport layer address to the first base station by using the initial context setup request and the first RRC connection reconfiguration message. In the foregoing manner, the second tunnel endpoint may be transmitted to set up an uplink bearer between the first base station and the core network device, so that feasibility of the solution is enhanced.

Figure 39:
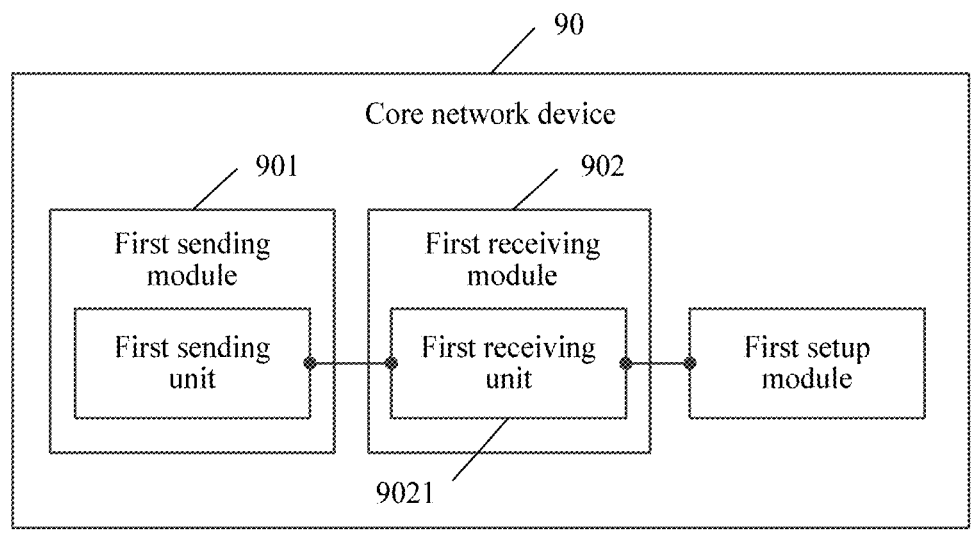
FIG. 39 is a schematic diagram of another embodiment of a core network device according to an embodiment of the present disclosure.

Optionally, based on the embodiment corresponding to FIG. 37 or FIG. 38, referring to FIG. 39, in the core network device in this embodiment of the present disclosure, the first receiving module 902 includes:

a first receiving unit 9021, configured to receive an initial context setup response message sent by the second base station, where the initial context setup response message is sent after the second base station receives a first RRC connection reconfiguration complete message sent by the first base station, and the first RRC connection reconfiguration complete message is used to indicate that UE has completed configuration of an air interface resource, where the first RRC connection reconfiguration complete message and the initial context setup response message carry the first tunnel endpoint.

In addition, in this embodiment of the present disclosure, the first base station needs to transmit the first TEID and the first transport layer address to the core network device by using the first RRC connection reconfiguration complete message and the initial context setup response message. In the foregoing manner, the first tunnel endpoint may be transmitted to set up a downlink bearer of the first bearer between the first base station and the core network device, so that feasibility of the solution is enhanced.

Figure 40:
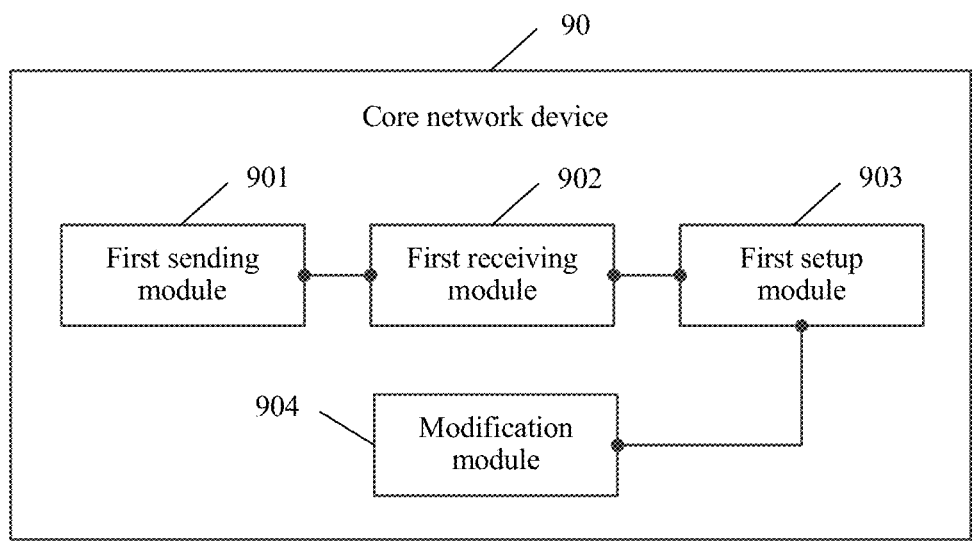
FIG. 40 is a schematic diagram of another embodiment of a core network device according to an embodiment of the present disclosure.

Optionally, based on the embodiment corresponding to FIG. 37, referring to FIG. 40, the core network device in this embodiment of the present disclosure may further include:

a modification module 904, configured to modify the first bearer before the first setup module 903 completes setup of the first bearer with the first base station.

In addition, in this embodiment of the present disclosure, the core network device may further modify the first bearer before completing setup of the first bearer with the first base station. This ensures that the first bearer has been modified, and therefore enhances feasibility and practical applicability of the solution.

Figure 41:
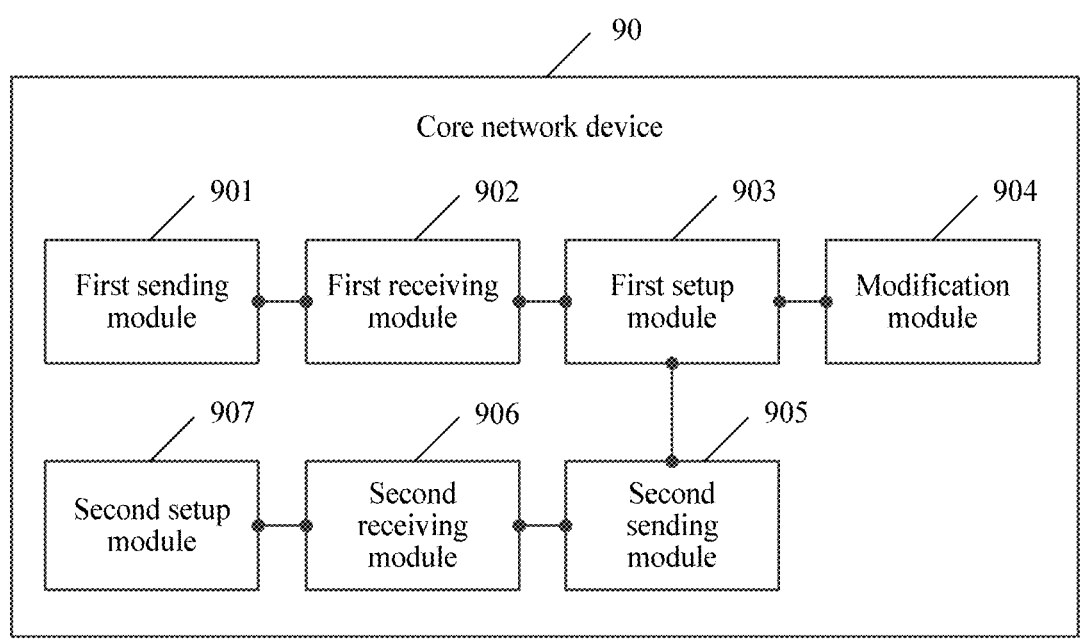
FIG. 41 is a schematic diagram of another embodiment of a core network device according to an embodiment of the present disclosure.

Optionally, based on the embodiment corresponding to any one of FIG. 37 to FIG. 40, referring to FIG. 41, the core network device in this embodiment of the present disclosure may further include:

a second sending module 905, configured to send a third tunnel endpoint to the first base station after the first setup module 903 completes setup of the first bearer with the first base station, where the third tunnel endpoint includes the third TEID and the third transport layer address, the third tunnel endpoint is allocated by the core network device, and the third tunnel endpoint is used to indicate a destination of data transmitted in an uplink data transmission path of a second bearer;

a second receiving module 906, configured to receive a fourth tunnel endpoint sent by the first base station, where the fourth tunnel endpoint includes a fourth TEID and a fourth transport layer address, the fourth tunnel endpoint is allocated by the first base station, and the fourth tunnel endpoint is used to indicate a destination of data transmitted in a downlink data transmission path of the second bearer; and a second setup module 907, configured to complete setup of the second bearer with the first base station.

In addition, in this embodiment of the present disclosure, the second bearer between the first base station and the core network device may be further set up provided that the first bearer is set up. Likewise, in the process of setting up the second bearer, there is no need to first connect to a 4G base station via an NR BS by using a new interface X5 and then connect to a 4G core network via the 4G base station. Therefore, a latency caused by the new interface X5 is shortened, and bandwidth of the new interface X5 is saved.

Figure 42:
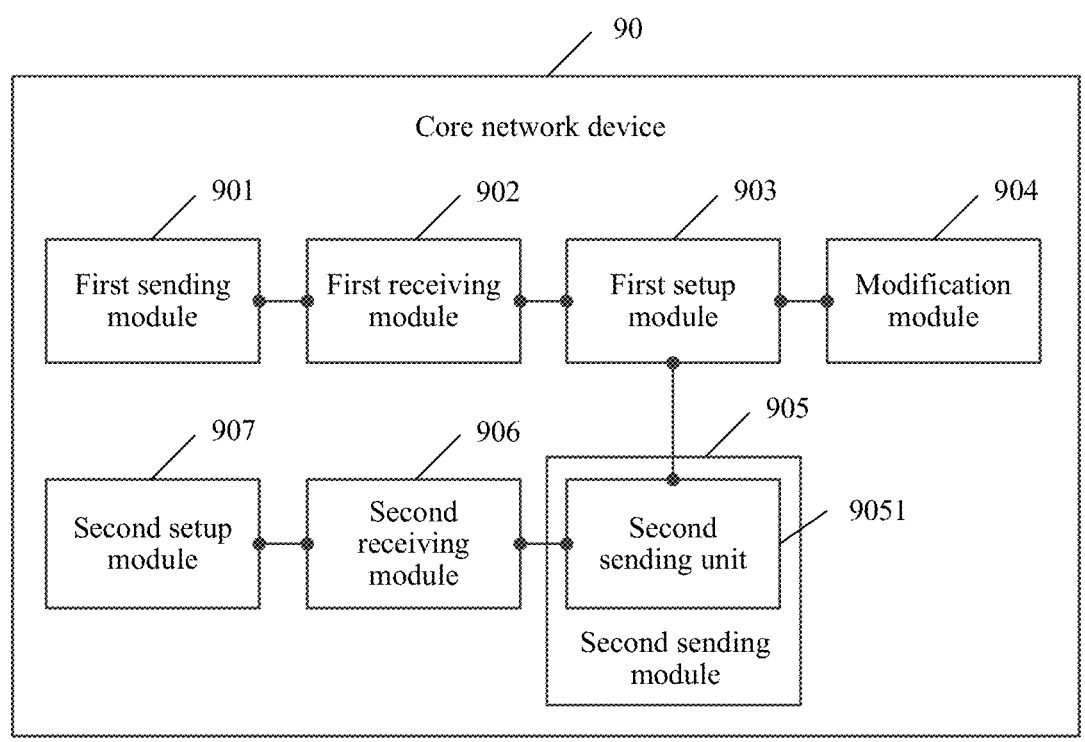
FIG. 42 is a schematic diagram of another embodiment of a core network device according to an embodiment of the present disclosure.

Optionally, based on the embodiment corresponding to FIG. 41, referring to FIG. 42, in the core network device in this embodiment of the present disclosure, the second sending module 905 includes:

a second sending unit 9051, configured to send an evolved radio access bearer (eRAB) setup request to the second base station, where the eRAB setup request is used to instruct the second base station to send a second RRC connection reconfiguration message to the first base station, where the eRAB setup request and the second RRC connection reconfiguration message carry the third tunnel endpoint.

In addition, in this embodiment of the present disclosure, the core network device needs to transmit the third TEID and the third transport layer address to the first base station by using the eRAB setup request and the second RRC connection reconfiguration message. In the foregoing manner, the third tunnel endpoint may be transmitted to set up an uplink bearer between the first base station and the core network device, so that feasibility of the solution is enhanced.

Figure 43:
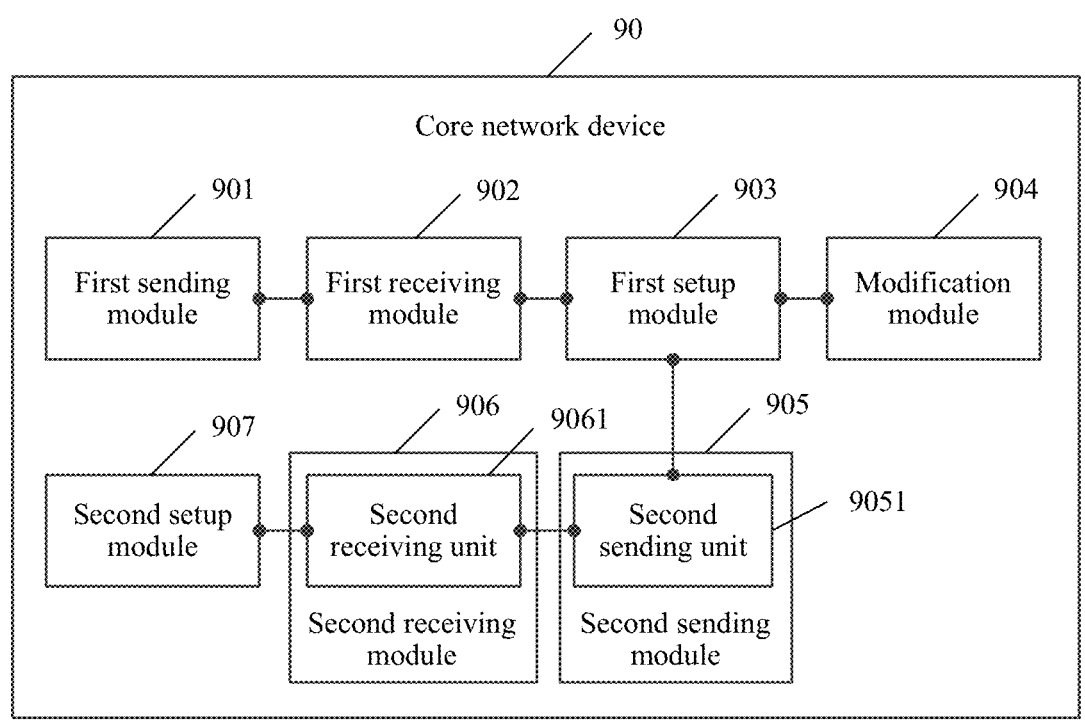
FIG. 43 is a schematic diagram of another embodiment of a core network device according to an embodiment of the present disclosure.

Optionally, based on the embodiment corresponding to FIG. 41 or FIG. 42, referring to FIG. 43, in the core network device in this embodiment of the present disclosure, the second receiving module 906 includes:

a second receiving unit 9061, configured to receive an eRAB setup response message sent by the second base station, where the eRAB setup response message is sent to the core network device after the second base station receives a second RRC connection reconfiguration complete message sent by the first base station, and the second RRC connection reconfiguration complete message is used to indicate that the UE has completed configuration of an air interface resource, where the second RRC connection reconfiguration complete message and the eRAB setup response message carry the fourth tunnel endpoint.

Further, in this embodiment of the present disclosure, the first base station needs to transmit the fourth TEID and the fourth transport layer address to the core network device by using the second RRC connection reconfiguration complete message and the eRAB setup response message. In the foregoing manner, the fourth tunnel endpoint may be transmitted to set up a downlink bearer of the second bearer between the first base station and the core network device, so that feasibility of the solution is enhanced.

Figure 44:
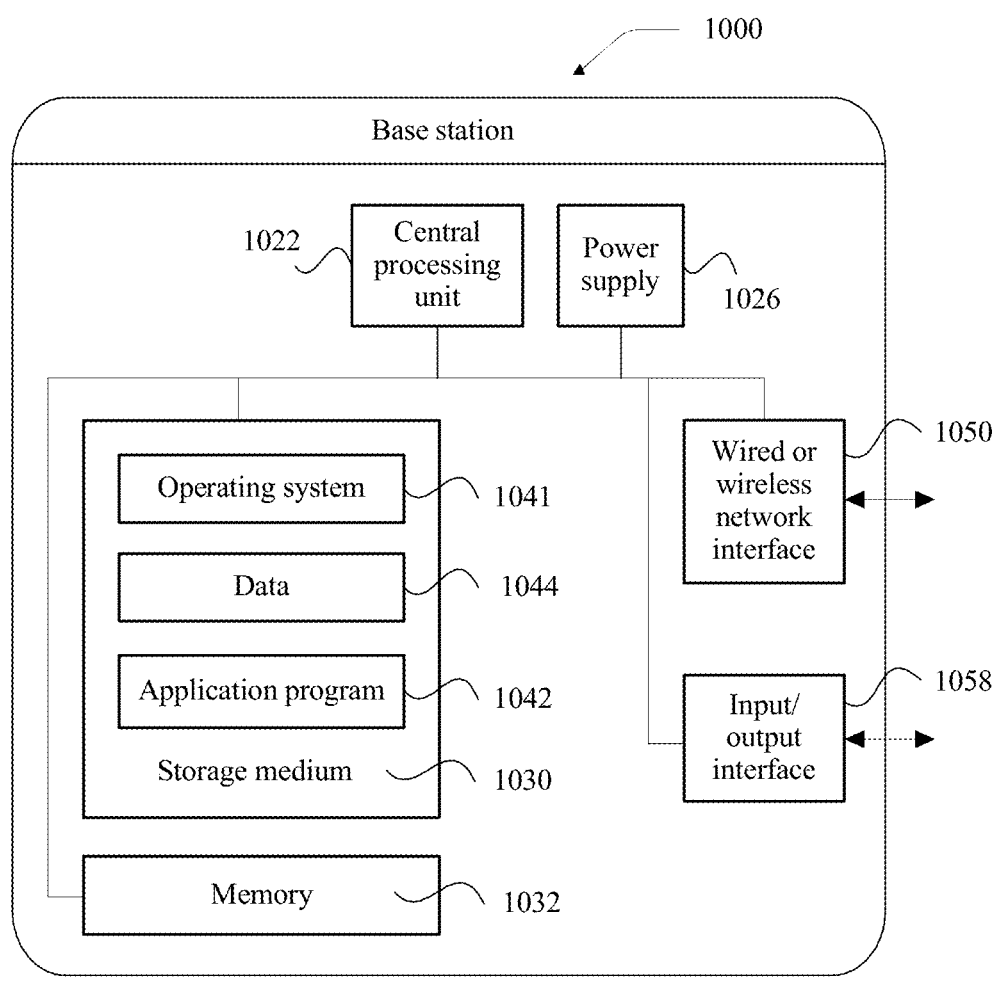
FIG. 44 is a schematic structural diagram of an embodiment of a base station according to an embodiment of the present disclosure.

FIG. 44 is a schematic structural diagram of a base station according to an embodiment of the present disclosure. The base station 1000 may vary greatly depending on different configurations or performance, and may include a transceiver, one or more central processing units (English: central processing units, CPU for short) 1022 (for example, one or more processors), a memory 1032, and one or more storage media 1030 (for example, one or more mass storage devices) storing an application program 1042 or data 1044. The memory 1032 and the storage medium 1030 may be transitory storage or persistent storage. A program stored in the storage medium 1030 may include one or more modules (not shown in the figure), and each module may include a series of instructions for performing operations on a server. Still further, the central processing unit 1022 may be configured to communicate with the storage medium 1030, and execute a series of instructions in the storage medium 1030 to perform operations on the base station 1000.

The base station 1000 may further include one or more power supplies 1026, one or more wired or wireless network interfaces 1050, one or more input/output interfaces 1058, and/or one or more operating systems 1041.

The operations performed by the base station in the foregoing embodiment may be based on the structure of the base station shown in FIG. 44:

controlling the transceiver to receive a first bearer setup request message initiated by user equipment (UE);

controlling, based on the first bearer setup request message, the transceiver to send a first tunnel endpoint to a core network device, where the first tunnel endpoint includes a first tunnel endpoint identifier (TEID) and a first transport layer address, the first tunnel endpoint is allocated by the first base station, and the first tunnel endpoint is used to indicate a destination of data transmitted in a downlink data transmission path of a first bearer;

controlling the transceiver to receive a second tunnel endpoint sent by the core network device, where the second tunnel endpoint includes a second TEID and a second transport layer address, the second tunnel endpoint is allocated by the core network device, and the second tunnel endpoint is used to indicate a destination of data transmitted in an uplink data transmission path of the first bearer; and completing setup of the first bearer with the core network device, for transmitting the uplink data and transmitting the downlink data.

Figure 45:
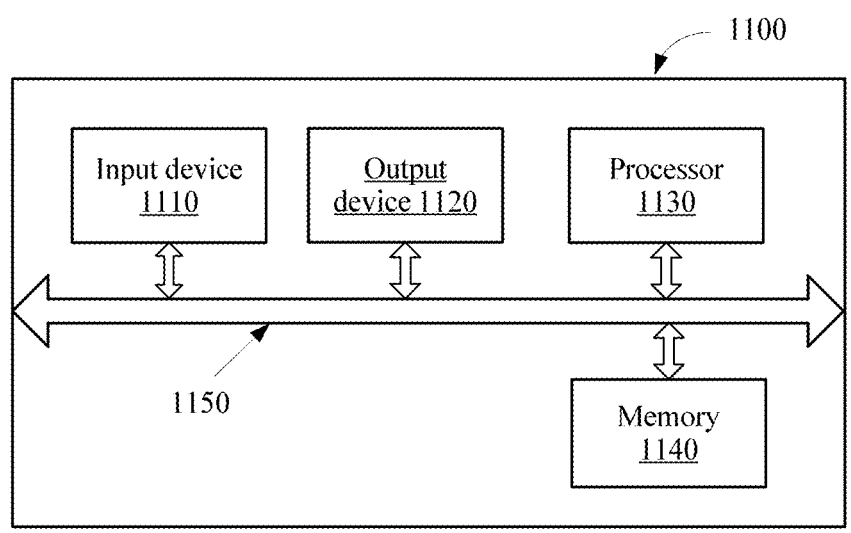
FIG. 45 is a schematic structural diagram of an embodiment of a core network device according to an embodiment of the present disclosure.

FIG. 45 is a schematic structural diagram of a core network device 1100 according to an embodiment of the present disclosure. The core network device 1100 may include an input device 1110, an output device 1120, a processor 1130, and a memory 1140. The output device in this embodiment of the present disclosure may be a display device.

The memory 1140 may include a read-only memory and a random access memory, and provide an instruction and data to the processor 1130. A part of the memory 1140 may further include a non-volatile random access memory (English: Non-Volatile Random Access Memory, NVRAM for short).

The memory 1140 stores the following elements: an executable module or a data structure, or a subset thereof, or an extended set thereof:

operation instructions, including various operation instructions, used to implement various operations; and an operating system, including various system programs, used to implement various basic services and process hardware-based tasks.

The processor 1130 in this embodiment of the present disclosure is configured to:

control the input device 1110 to receive a first tunnel endpoint sent by a first base station, where the first tunnel endpoint includes a first tunnel endpoint identifier (TEID) and a first transport layer address, the first tunnel endpoint is allocated by the first base station, and the first tunnel endpoint is used to indicate a destination of data transmitted in a downlink data transmission path of a first bearer;

control the output device 1120 to send a second tunnel endpoint to the first base station, where the second tunnel endpoint includes a second TEID and a second transport layer address, the second tunnel endpoint is allocated by the core network device, and the second tunnel endpoint is used to indicate a destination of data transmitted in an uplink data transmission path of the first bearer; and complete setup of the first bearer with the first base station, for transmitting the uplink data and transmitting the downlink data.

The processor 1130 controls operations of the core network device 1100. The processor 1130 may also be referred to as a CPU. The memory 1140 may include a read-only memory and a random access memory, and provide an instruction and data to the processor 1130. A part of the memory 1140 may further include an NVRAM. During specific application, components of the core network device 1100 are coupled together by using the bus system 1150. In addition to a data bus, the bus system 1150 includes a power bus, a control bus, and a status signal bus. However, for clear description, various types of buses in the figure are marked as the bus system 1150.

The method disclosed by the foregoing embodiment of the present disclosure may be applied to the processor 1130 or implemented by the processor 1130. The processor 1130 may be an integrated circuit chip and has a signal processing capability. In an implementation process, operations in the foregoing methods can be implemented by using a hardware integrated logical circuit in the processor 1130, or by using instructions in a form of software. The processor 1130 may be a general-purpose processor, a digital signal processor (DSP for short), an application-specific integrated circuit (ASIC for short), a field programmable gate array (FPGA for short) or another programmable logical device, a discrete gate or transistor logic device, or a discrete hardware component. It may implement or perform the methods, the operations, and logical block diagrams that are disclosed in the embodiments of the present disclosure. The general-purpose processor may be a microprocessor, or the processor may be any conventional processor or the like. Operations of the methods disclosed with reference to the embodiments of the present disclosure may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 1140, and the processor 1130 reads information in the memory 1140 and completes the operations in the foregoing methods in combination with hardware of the processor 1130.

For descriptions about FIG. 45, refer to the related descriptions and effects in the method embodiment in FIG. 7. Details are not described again herein.

Figure 46:
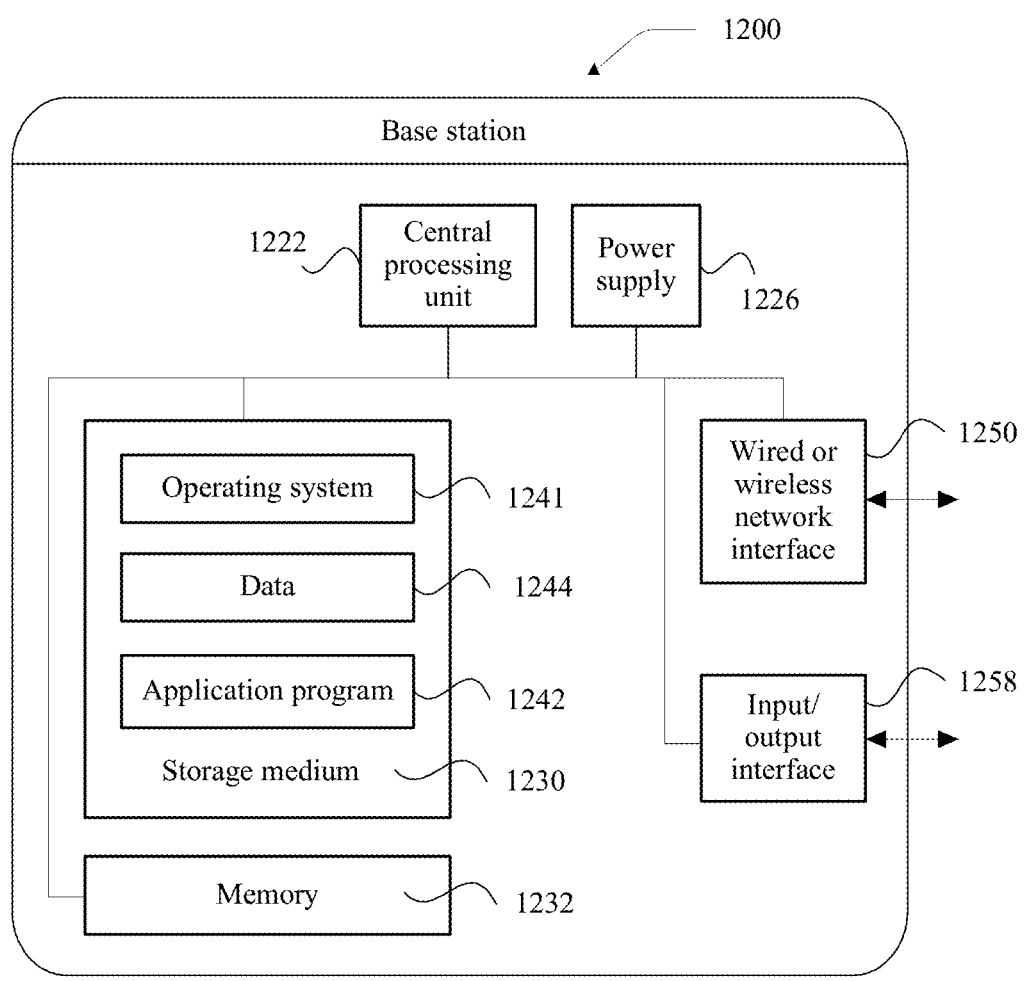
FIG. 46 is a schematic structural diagram of another embodiment of a base station according to an embodiment of the present disclosure.

FIG. 46 is a schematic structural diagram of a base station according to an embodiment of the present disclosure. The base station 1200 may vary greatly depending on different configurations or performance, and may include a transceiver, one or more CPUs 1222 (for example, one or more processors), a memory 1232, and one or more storage media 1230 (for example, one or more mass storage devices) storing an application program 1242 or data 1244. The memory 1232 and the storage medium 1230 may be transitory storage or persistent storage. A program stored in the storage medium 1230 may include one or more modules (not shown in the figure), and each module may include a series of instructions for performing operations on a server. Still further, the central processing unit 1222 may be configured to communicate with the storage medium 1230, and execute a series of instructions in the storage medium 1230 to perform operations on the server 1200.

The base station 1200 may further include one or more power supplies 1226, one or more wired or wireless network interfaces 1250, one or more input/output interfaces 1258, and/or one or more operating systems 1241, for example, Windows Server™, Mac OS X™, Unix™, Linux™, and FreeBSD™.

The operations performed by the server in the foregoing embodiment may be based on the structure of the base station shown in FIG. 46:

controlling the transceiver to receive a first bearer setup request message initiated by user equipment (UE);

controlling, based on the first bearer setup request message, the transceiver to receive a second tunnel endpoint sent by a core network device, where the second tunnel endpoint includes a second TEID and a second transport layer address, the second tunnel endpoint is allocated by the core network device, and the second tunnel endpoint is used to indicate a destination of data transmitted in an uplink data transmission path of a first bearer;

controlling the transceiver to send a first tunnel endpoint to the core network device, where the first tunnel endpoint includes a first tunnel endpoint identifier (TEID) and a first transport layer address, the first tunnel endpoint is allocated by the first base station, and the first tunnel endpoint is used to indicate a destination of data transmitted in a downlink data transmission path of the first bearer; and completing setup of the first bearer with the core network device, for transmitting the uplink data and transmitting the downlink data.

Figure 47:
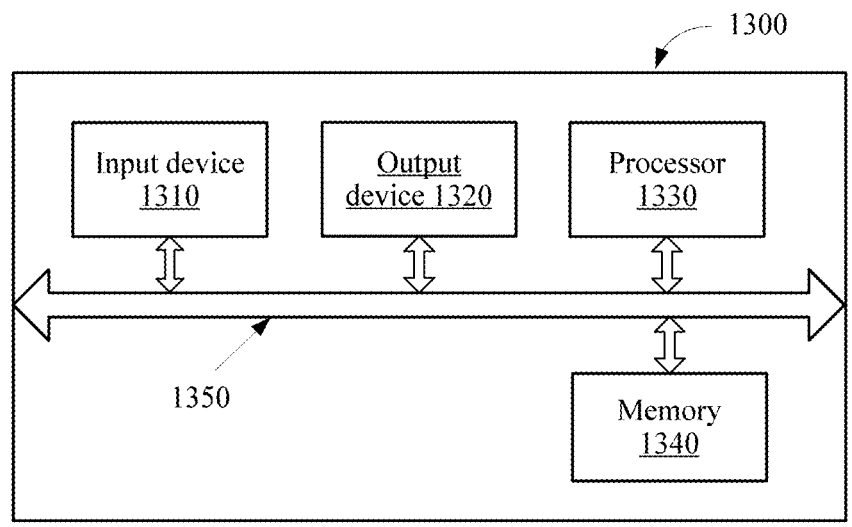
FIG. 47 is a schematic structural diagram of another embodiment of a core network device according to an embodiment of the present disclosure.

FIG. 47 is a schematic structural diagram of a core network device 1300 according to an embodiment of the present disclosure. The core network device 1300 may include an input device 1310, an output device 1320, a processor 1330, and a memory 1340. The output device in this embodiment of the present disclosure may be a display device.

The memory 1340 may include a read-only memory and a random access memory, and provide an instruction and data to the processor 1330. A part of the memory 1340 may further include a non-volatile random access memory (NVRAM for short).

The memory 1340 stores the following elements: an executable module or a data structure, or a subset thereof, or an extended set thereof:

operation instructions, including various operation instructions, used to implement various operations; and an operating system, including various system programs, used to implement various basic services and process hardware-based tasks.

The processor 1330 in this embodiment of the present disclosure is configured to:

control the transceiver to send a second tunnel endpoint to a first base station, where the second tunnel endpoint includes a second TEID and a second transport layer address, the second tunnel endpoint is allocated by the core network device, and the second tunnel endpoint is used to indicate a destination of data transmitted in an uplink data transmission path of a first bearer;

control the transceiver to receive a first tunnel endpoint sent by the first base station, where the first tunnel endpoint includes a first tunnel endpoint identifier (TEID) and a first transport layer address, the first tunnel endpoint is allocated by the first base station, and the first tunnel endpoint is used to indicate a destination of data transmitted in a downlink data transmission path of the first bearer; and complete setup of the first bearer with the first base station, for transmitting the uplink data and transmitting the downlink data.

The processor 1330 controls operations of the core network device 1300. The processor 1330 may also be referred to as a CPU. The memory 1340 may include a read-only memory and a random access memory, and provide an instruction and data to the processor 1330. A part of the memory 1340 may further include an NVRAM. During specific application, components of the core network device 1300 are coupled together by using the bus system 1350. In addition to a data bus, the bus system 1350 includes a power bus, a control bus, and a status signal bus. However, for clear description, various types of buses in the figure are marked as the bus system 1350.

The method disclosed by the foregoing embodiment of the present disclosure may be applied to the processor 1330 or implemented by the processor 1330. The processor 1330 may be an integrated circuit chip and has a signal processing capability. In an implementation process, operations in the foregoing methods can be implemented by using a hardware integrated logical circuit in the processor 1330, or by using instructions in a form of software. The processor 1330 may be a general purpose processor, a DSP, an ASIC, an FPGA or another programmable logic device, a discrete gate or transistor logic device, or a discrete hardware component. It may implement or perform the methods, the operations, and logical block diagrams that are disclosed in the embodiments of the present disclosure. The general-purpose processor may be a microprocessor, or the processor may be any conventional processor or the like. Operations of the methods disclosed with reference to the embodiments of the present disclosure may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 1340, and the processor 1330 reads information in the memory 1340 and completes the operations in the foregoing methods in combination with hardware of the processor 1330.

For descriptions about FIG. 47, refer to the related descriptions and effects in the method part in FIG. 9. Details are not described again herein.

Figure 48:
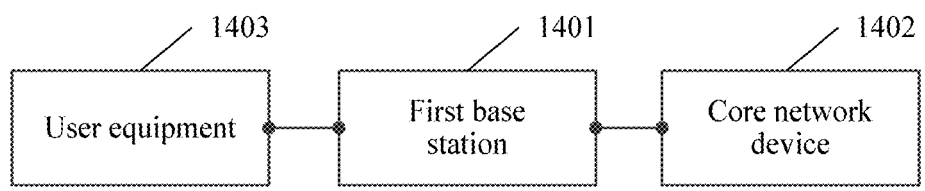
FIG. 48 is a schematic diagram of an embodiment of a bearer setup system according to an embodiment of the present disclosure.

The following describes a bearer setup system in an embodiment of the present disclosure. Referring to FIG. 48, a bearer setup system in an embodiment of the present disclosure includes:

a base station 1401, a core network device 1402, and user equipment 1403.

In this embodiment, the first base station 1401 receives a first bearer setup request message initiated by the UE 1403; the first base station 1401 sends a first tunnel endpoint to the core network device 1402 based on the first bearer setup request message, where the first tunnel endpoint includes a first TEID and a first transport layer address, the first tunnel endpoint is allocated by the first base station 1401, and the first tunnel endpoint is used to indicate a destination of data transmitted in a downlink data transmission path of a first bearer; the first base station 1401 receives a second tunnel endpoint sent by the core network device 1402, where the second tunnel endpoint includes a second TEID and a second transport layer address, the second tunnel endpoint is allocated by the core network device 1402, and the second tunnel endpoint is used to indicate a destination of data transmitted in an uplink data transmission path of the first bearer; and the first base station 1401 completes setup of the first bearer with the core network device 1402, for transmitting the uplink data and transmitting the downlink data.

In this embodiment, the core network device 1402 receives the first tunnel endpoint sent by the first base station 1401, where the first tunnel endpoint includes the first tunnel endpoint identifier (TEID) and the first transport layer address, the first tunnel endpoint is allocated by the first base station 1401, and the first tunnel endpoint is used to indicate the destination of the data transmitted in the downlink data transmission path of the first bearer; the core network device 1402 sends the second tunnel endpoint to the first base station 1401, where the second tunnel endpoint includes the second TEID and the second transport layer address, the second tunnel endpoint is allocated by the core network device 1402, and the second tunnel endpoint is used to indicate the destination of the data transmitted in the uplink data transmission path of the first bearer; and the core network device 1402 completes setup of the first bearer with the first base station 1401, for transmitting the uplink data and transmitting the downlink data.

In the technical solution provided in this embodiment of the present disclosure, a bearer setup system is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

Figure 49:
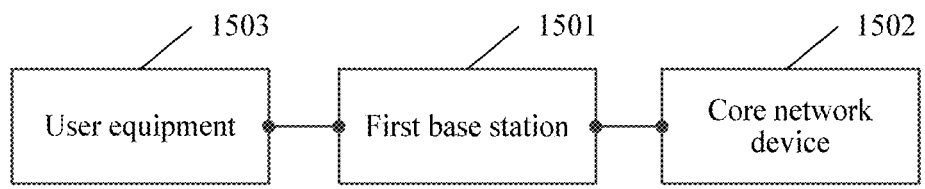
FIG. 49 is a schematic diagram of another embodiment of a bearer setup system according to an embodiment of the present disclosure.

The following describes another bearer setup system in an embodiment of the present disclosure. Referring to FIG. 49, a bearer setup system in an embodiment of the present disclosure includes:

a base station 1501, a core network device 1502, and user equipment 1503.

In this embodiment, the first base station 1501 receives a first bearer setup request message initiated by the UE 1503; the first base station 1501 receives, based on the first bearer setup request message, a second tunnel endpoint sent by the core network device 1502, where the second tunnel endpoint includes a second TEID and a second transport layer address, the second tunnel endpoint is allocated by the core network device 1502, and the second tunnel endpoint is used to indicate a destination of data transmitted in an uplink data transmission path of a first bearer; the first base station 1501 sends a first tunnel endpoint to the core network device 1502, where the first tunnel endpoint includes a first tunnel endpoint identifier (TEID) and a first transport layer address, the first tunnel endpoint is allocated by the first base station, and the first tunnel endpoint is used to indicate a destination of data transmitted in a downlink data transmission path of the first bearer; and the first base station 1501 completes setup of the first bearer with the core network device 1502, for transmitting the uplink data and transmitting the downlink data.

In this embodiment, the core network device 1502 sends the second tunnel endpoint to the first base station 1501, where the second tunnel endpoint includes the second TEID and the second transport layer address, the second tunnel endpoint is allocated by the core network device 1502, and the second tunnel endpoint is used to indicate the destination of the data transmitted in the uplink data transmission path of the first bearer; the core network device 1502 receives the first tunnel endpoint sent by the first base station 1501, where the first tunnel endpoint includes the first tunnel endpoint identifier (TEID) and the first transport layer address, the first tunnel endpoint is allocated by the first base station 1501, and the first tunnel endpoint is used to indicate the destination of the data transmitted in the downlink data transmission path of the first bearer; and the core network device 1502 completes setup of the first bearer with the first base station 1501, for transmitting the uplink data and transmitting the downlink data.

In the technical solution provided in this embodiment of the present disclosure, a bearer setup system is provided. A bearer between an NR BS and a 4G core network may be set up, and data is transmitted directly by using the bearer. There is no need to first connect to a 4G base station via the NR BS by using a new interface X5 and then connect to the 4G core network via the 4G base station. Therefore, a latency caused by the new interface X5 is shortened, and bandwidth of the new interface X5 is saved.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of the present disclosure. The foregoing storage medium includes any medium that can store program code, such as a USB flash drive, a read-only memory (English full name: Read-Only Memory, ROM for short), a random access memory (English full name: Random Access Memory, RAM for short), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from scope of the technical solutions of the embodiments of the present disclosure.

What is claimed is:

1. A first base station, comprising:
    a receiver configured to receive a first bearer setup request message initiated by user equipment (UE);
    a transmitter configured to send a first tunnel endpoint to a core network device based on the first bearer setup request message, wherein the first tunnel endpoint comprises a first tunnel endpoint identifier (TEID) and a first transport layer address, the first tunnel endpoint is allocated by the first base station to indicate a destination of data transmitted in a downlink data transmission path of a first bearer;
    wherein the receiver is further configured to receive a second tunnel endpoint from the core network device, wherein the second tunnel endpoint comprises a second TEID and a second transport layer address, the second tunnel endpoint is allocated by the core network device to indicate a destination of data transmitted in an uplink data transmission path of the first bearer; and
    a processor configured to complete setup of the first bearer with the core network device for transmitting the uplink data and the downlink data, wherein the transmitter is further configured to send a radio resource control (RRC) connection setup complete message to a second base station to instruct the second base station to send an initial UE message to the core network device, wherein the RRC connection setup complete message and the initial UE message include the first tunnel endpoint.

2. The first base station according to claim 1, wherein the receiver is further configured to receive a first RRC connection reconfiguration message from the second base station, wherein the first RRC connection reconfiguration message is sent after the second base station receives an initial context setup request from the core network device, wherein the initial context setup request and the first RRC connection reconfiguration message include the second tunnel endpoint.

3. The first base station according to claim 2, wherein the transmitter is configured to send the first RRC connection reconfiguration message to the UE after the receiver receives the second tunnel endpoint from the core network device, wherein the first RRC connection reconfiguration message is used to request the UE to configure an air interface resource; and the receiver is further configured to receive a first RRC connection reconfiguration complete message from the UE, wherein the first RRC connection reconfiguration complete message is used to indicate that the UE has completed configuration of the air interface resource.

4. The first base station according to claim 3, wherein the transmitter is configured to send the first RRC connection reconfiguration complete message to the second base station after the receiver receives the first RRC connection reconfiguration complete message from the UE, so that the second base station sends an initial context setup response message to the core network device based on the first RRC connection reconfiguration complete message, wherein the initial context setup response message is used to instruct the core network device to modify the first bearer.

* * * * *